United States Patent
Hasegawa et al.

(10) Patent No.: US 8,320,717 B2
(45) Date of Patent: Nov. 27, 2012

(54) IMAGE PROCESSOR

(75) Inventors: Tomohiko Hasegawa, Nagoya (JP); Masaki Kondo, Toyoake (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 895 days.

(21) Appl. No.: 12/414,318

(22) Filed: Mar. 30, 2009

(65) Prior Publication Data
US 2009/0245643 A1    Oct. 1, 2009

(30) Foreign Application Priority Data

Mar. 31, 2008 (JP) ................ 2008-094115
Mar. 31, 2008 (JP) ................ 2008-094138
Mar. 31, 2008 (JP) ................ 2008-094161

(51) Int. Cl.
     *G06K 9/54*      (2006.01)
     *G06K 9/32*      (2006.01)
     *G06K 15/02*      (2006.01)

(52) U.S. Cl. ............ 382/305; 382/298; 358/1.2

(58) Field of Classification Search ........ 382/190, 382/224, 305, 312, 181, 226, 282; 358/1.2, 358/1.16, 528; 345/660
See application file for complete search history.

(56) References Cited

U.S. PATENT DOCUMENTS

| | | | |
|---|---|---|---|
| 6,961,087 B1* | 11/2005 | Yoshida | 348/231.1 |
| 7,639,877 B2* | 12/2009 | Shiota et al. | 382/190 |
| 7,724,978 B2* | 5/2010 | Nonaka et al. | 382/254 |
| 7,941,031 B2* | 5/2011 | Tanikawa et al. | 386/241 |
| 2006/0050321 A1 | 3/2006 | Takahashi | |
| 2006/0274978 A1 | 12/2006 | Fukuda et al. | |

FOREIGN PATENT DOCUMENTS

| | | |
|---|---|---|
| JP | H09-322113 A | 12/1997 |
| JP | 2005-130254 A | 5/2005 |
| JP | 2006-060648 A | 3/2006 |
| JP | 2006-080652 A | 3/2006 |
| JP | 2007-041987 A | 2/2007 |
| JP | 2007-058795 A | 3/2007 |
| JP | 2007-266659 A | 10/2007 |
| JP | 2007-323698 A | 12/2007 |
| JP | 2007-329684 A | 12/2007 |
| JP | 2009-241547 A | 10/2009 |

OTHER PUBLICATIONS

Japan Patent Office; Office Action in Japanese Patent Application No. 2008-094115 mailed Apr. 13, 2010.
Japan Patent Office; Office Action in Japanese Patent Application No. 2008-094138 mailed Apr. 13, 2010.

* cited by examiner

*Primary Examiner* — Kanjibhai Patel
(74) *Attorney, Agent, or Firm* — Baker Botts L.L.P.

(57) ABSTRACT

An image processor includes a storing unit, an image determining unit, and an output unit. The storing unit stores a selecting condition. The image determining unit determines whether the image corresponding to the set of the image data satisfies the selecting condition. The output unit outputs an image list including either one of the image that is determined to satisfy the selecting condition by the image determining unit and a resized image resized from the image that is determined to satisfy the selecting condition by the image determining unit.

30 Claims, 36 Drawing Sheets

FIG.3
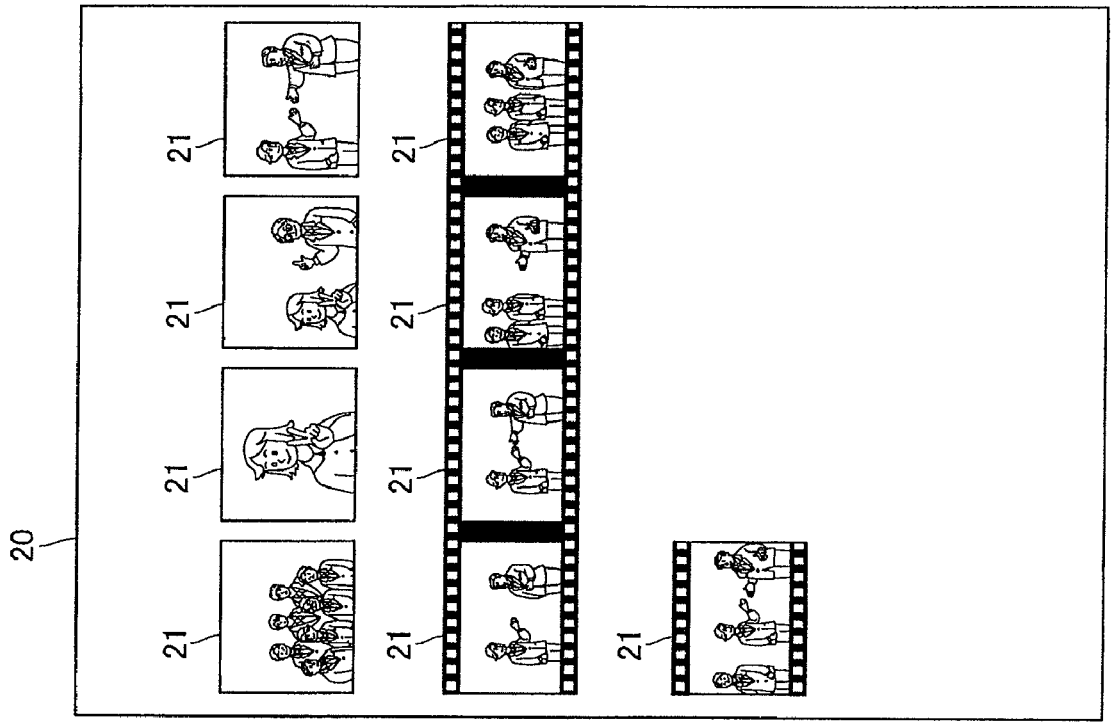
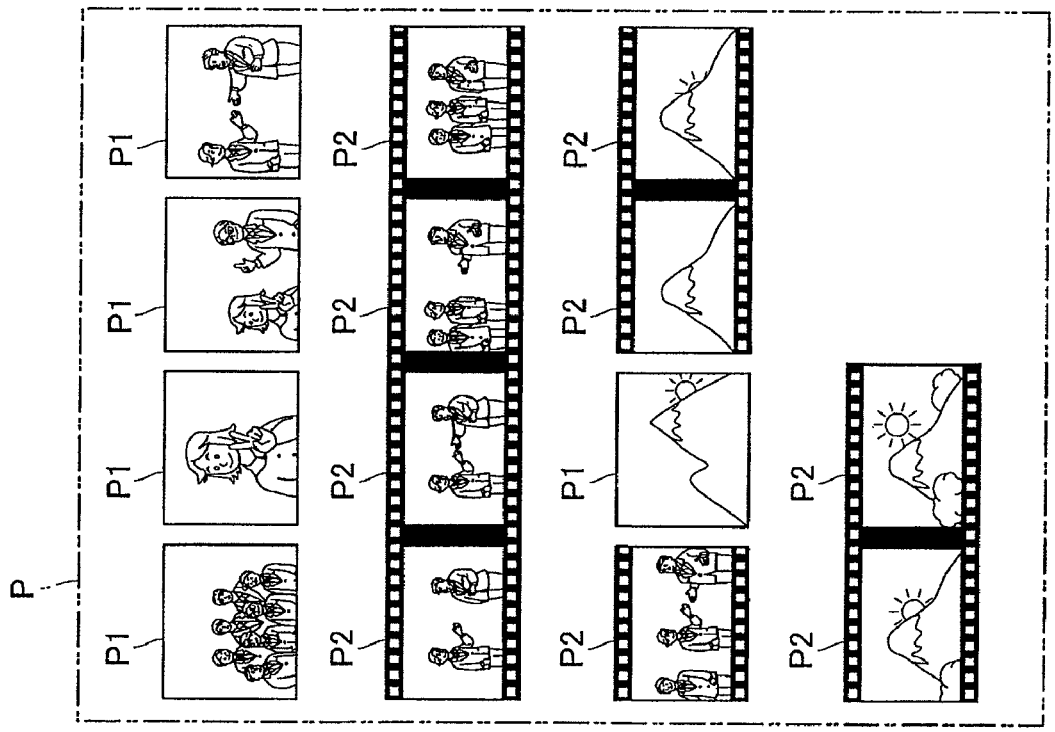

FIG.4

| 201 | 202 | 203 | 204 | 205 | 206 | 207 | 208 | 209 |
|---|---|---|---|---|---|---|---|---|
| 0 | "IMG01.jpg" | 0 | 1 | 1 | 0 | 20080115 | 125045 | 1 |
| 1 | "IMG02.avi" | 1 | 5 | 900 | 60 | 20080115 | 151320 | 1 |
| 2 | "IMG03.mov" | 2 | 5 | 1500 | 30 | 20080115 | 180632 | 0 |
| 3 | "IMG04.jpg" | 0 | 1 | 1 | 0 | 20080120 | 100516 | 1 |
| ⋮ | | | | | | | | |

| 301 | 302 | 303 | 304 | 305 | 306 |
|---|---|---|---|---|---|
| 0 | 0 | 1 | 1 | 20080115 | 125045 |
| 1 | 1 | 1 | 1 | 20080115 | 151320 |
| 2 | 1 | 35 | 2 | 20080115 | 151326 |
| 3 | 1 | 110 | 3 | 20080115 | 151332 |
| 4 | 1 | 176 | 4 | 20080115 | 151338 |
| 5 | 1 | 201 | 5 | 20080115 | 151344 |
| 6 | 2 | 1 | 1 | 20080115 | 180632 |
| 7 | 2 | 650 | 2 | 20080115 | 180636 |
| 8 | 2 | 711 | 3 | 20080115 | 180640 |
| 9 | 2 | 1000 | 4 | 20080115 | 180644 |
| 10 | 2 | 1920 | 5 | 20080115 | 180648 |
| 11 | 2 | 2500 | 6 | 20080115 | 180652 |
| 12 | 2 | 2730 | 7 | 20080115 | 180656 |
| 13 | 2 | 2829 | 8 | 20080115 | 180700 |
| 14 | 3 | 1 | 1 | 20050120 | 100516 |

| 403 | 0 | |
|---|---|---|
| 401 | 0 | 10 | 402
| | 1 | 196 |
| | 2 | 433 |
| | 3 | 518 |
| | ⋮ | ⋮ |
| | 1 | |
| | 0 | 10 |
| | 1 | 196 |
| | 2 | 433 |
| | 3 | 518 |
| | ⋮ | ⋮ |
| | 2 | |
| | 0 | 10 |
| | 1 | 196 |
| | 2 | 433 |
| | 3 | 518 |
| | ⋮ | ⋮ |

13p (PROCESS IN MFP)

(PROCESS IN MFP)

FIG.28

| 301 | 302 | 304 | 305 | 306 | 307 300 |
|---|---|---|---|---|---|
| 0 | 0 | 0 | 20080115 | 125045 | 0 |
| 1 | 1 | 0 | 20080115 | 151320 | 1 |
| 2 | 1 | 180 | 20080115 | 151326 | 1 |
| 3 | 1 | 360 | 20080115 | 151332 | 1 |
| 4 | 1 | 540 | 20080115 | 151338 | 1 |
| 5 | 1 | 720 | 20080115 | 151344 | 1 |
| 6 | 2 | 0 | 20080115 | 180632 | 2 |
| 7 | 2 | 300 | 20080115 | 180636 | 2 |
| 8 | 2 | 600 | 20080115 | 180640 | 2 |
| 9 | 2 | 900 | 20080115 | 180644 | 2 |
| 10 | 2 | 1200 | 20080115 | 180648 | 2 |
| 11 | 3 | 0 | 20080115 | 180652 | 2 |
| 12 | 4 | 0 | 20080115 | 180656 | 2 |
| 13 | 5 | 0 | 20080115 | 180700 | 2 |
| 14 | 6 | 0 | 20080120 | 100516 | 0 |

| 601 | 602 | 603 | 604 |
|---|---|---|---|
| 0 | 1 | 2 | 000045 |
| 1 | 2 | 3 | 001531 |
| 2 | 3 | 5 | 000128 |
| 3 | 5 | 6 | 000030 |
| 4 | 6 | 9 | 010510 |
| 5 | 9 | 10 | 000603 |
| 6 | 10 | 12 | 000119 |
| 7 | 12 | 13 | 000352 |

| 701 | 702 | 703 |
|---|---|---|
| 0 | 1 | 150 |
| 1 | 2 | 220 |
| 2 | 3 | 71 |
| 3 | 5 | 130 |
| 4 | 6 | 180 |
| 5 | 9 | 197 |
| 6 | 10 | 240 |
| 7 | 12 | 168 |

⁓13z

⋮

IMAGE PROCESSOR

CROSS REFERENCE TO RELATED APPLICATION

This application claims priorities from Japanese Patent Application No. 2008-094115 filed Mar. 31, 2008, Japanese Application No. 2008-094138 filed Mar. 31, 2008, and Japanese Patent Application No. 2008-094161 filed Mar. 31, 2008. The entire contents of the priority applications are incorporated herein by reference.

TECHNICAL FIELD

The disclosure relates to an image processor.

BACKGROUND

Since recent digital cameras are equipped to take both still images and moving images, the user can determine whether to take still photographs or video footage based on the scene being filmed. For example, the user would likely take a still image of a scene with no motion, such as a group photo, and would likely take video of a scene with motion, such as an activity at a sports event.

Devices have also been proposed for selectively printing out still images and video images taken with this type of digital camera or for displaying such images on a display unit (see Japanese patent application publications Nos. 2005-130254 and 9-322113, for example).

SUMMARY

However, the devices described above cannot simply arrange videos and still images together and are thus less user-friendly for browsing both videos and still images.

In order to attain the above and other objects, the invention provides an image processor accessible to a storage medium storing a set of image data corresponding to an image. The image processor includes a storing unit, an image determining unit, and an output unit. The storing unit stores a selecting condition. The image determining unit determines whether the image corresponding to the set of the image data satisfies the selecting condition. The output unit outputs an image list including either one of the image that is determined to satisfy the selecting condition by the image determining unit and a resized image resized from the image that is determined to satisfy the selecting condition by the image determining unit.

According to another aspects, the invention provides an image processor. The image processor is accessible to a storage medium storing at least one set of moving image data each including a plurality of sets of frame image data corresponding to a plurality of frame images. Each set of moving image data corresponds to a moving image. The image processor includes an extraction frame number determining unit, an extracting unit, and an output unit. The extraction frame number determining unit determines an extraction frame number for each of the at least one set of moving image data. The extracting unit extracts the extraction frame number worth of set of frame image data from the plurality of sets of frame image data included in one of the at least one set of moving image data. The output unit outputs an image list including one of a frame image corresponding to the extracted set of frame image data and a resized frame image resized from the frame image, as an index image.

BRIEF DESCRIPTION OF THE DRAWINGS

Embodiments in accordance with the invention will be described in detail with reference to the following figures wherein:

FIG. 3 shows an example of a collection of images corresponding to image files stored on a memory card, and an image list outputted by the MFP based on the image extraction reference;

FIG. 4 conceptually illustrates a structure of a file data storage area;

FIG. 5 conceptually illustrates a structure of a layout data storage area;

FIG. 6 conceptually illustrates a frame extraction data storage area;

FIG. 28 conceptually illustrates a structure of a layout data storage area according to the third embodiment;

FIG. 36 conceptually illustrates a content of a dynamic range data storage area according to a modification of the third embodiment;

DETAILED DESCRIPTION

<First Embodiment>

Figure 1:
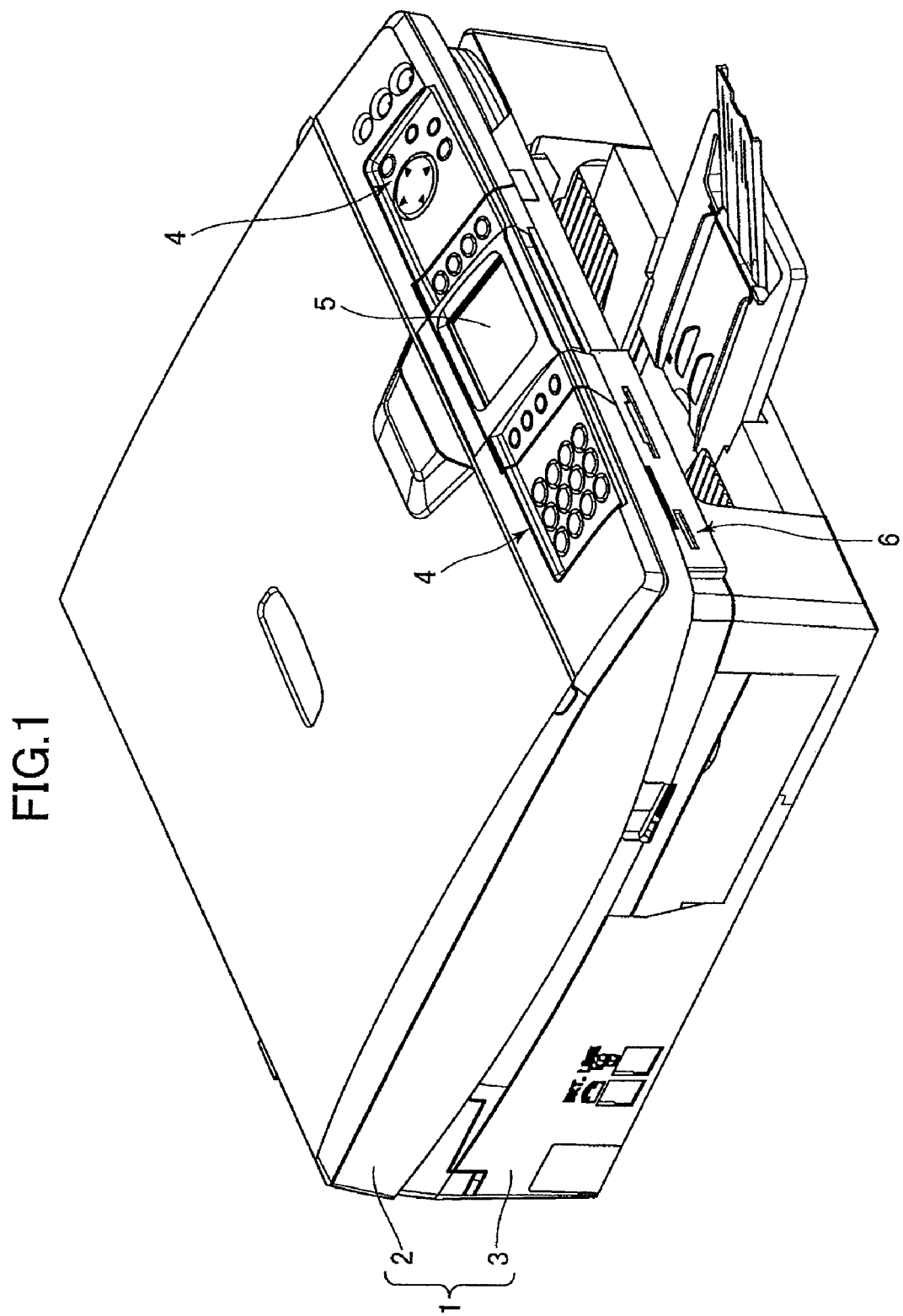
FIG. 1 is a perspective view showing an external structure of a multifunction peripheral (MFP) according to a first embodiment.

Next, a first embodiment of the invention will be described while referring to the accompanying drawings. FIG. 1 is a perspective view showing the external structure of a multifunction peripheral (hereinafter abbreviated as "MFP") 1 as the first embodiment of the image processor according to the present invention.

The MFP 1 is provided with multiple functions, including a photocapture function, a copier function, a scanner function, and a media capture function. Through the media capture function, the MFP 1 can execute processes for reading image files from a media card mounted in a slot section 6 described later and for printing out these image files, for displaying images on an LCD 5 described later corresponding to image files read from the media card, and for saving image files scanned by the scanner function on the media card.

As will be described later, a particular feature of the MFP 1 according to the first embodiment is its ability to output a list of images that can be easily browsed by a user, enabling the user to readily see what image files are stored on the media card mounted in the slot section 6.

The MFP 1 houses a scanner 2 in the upper section thereof for scanning original documents, and an inkjet printer 3 disposed beneath the scanner 2 for printing images on recording paper.

The slot section 6 is provided on the front surface of the MFP 1 and includes multiple card slots in which media cards, such as a CompactFlash (registered trademark) card and an SD card can be directly inserted.

The scanner 2 is a flatbed scanner having a document cover. Just forward of the document cover, the MFP 1 is provided with a control panel including an operating section 4 configured of a plurality of keys and the LCD 5 configured of a touch panel. The MFP 1 displays operating procedures and the status of current processes on the LCD 5 and displays data on the LCD 5 corresponding to operations performed on the operating section 4.

Figure 2:
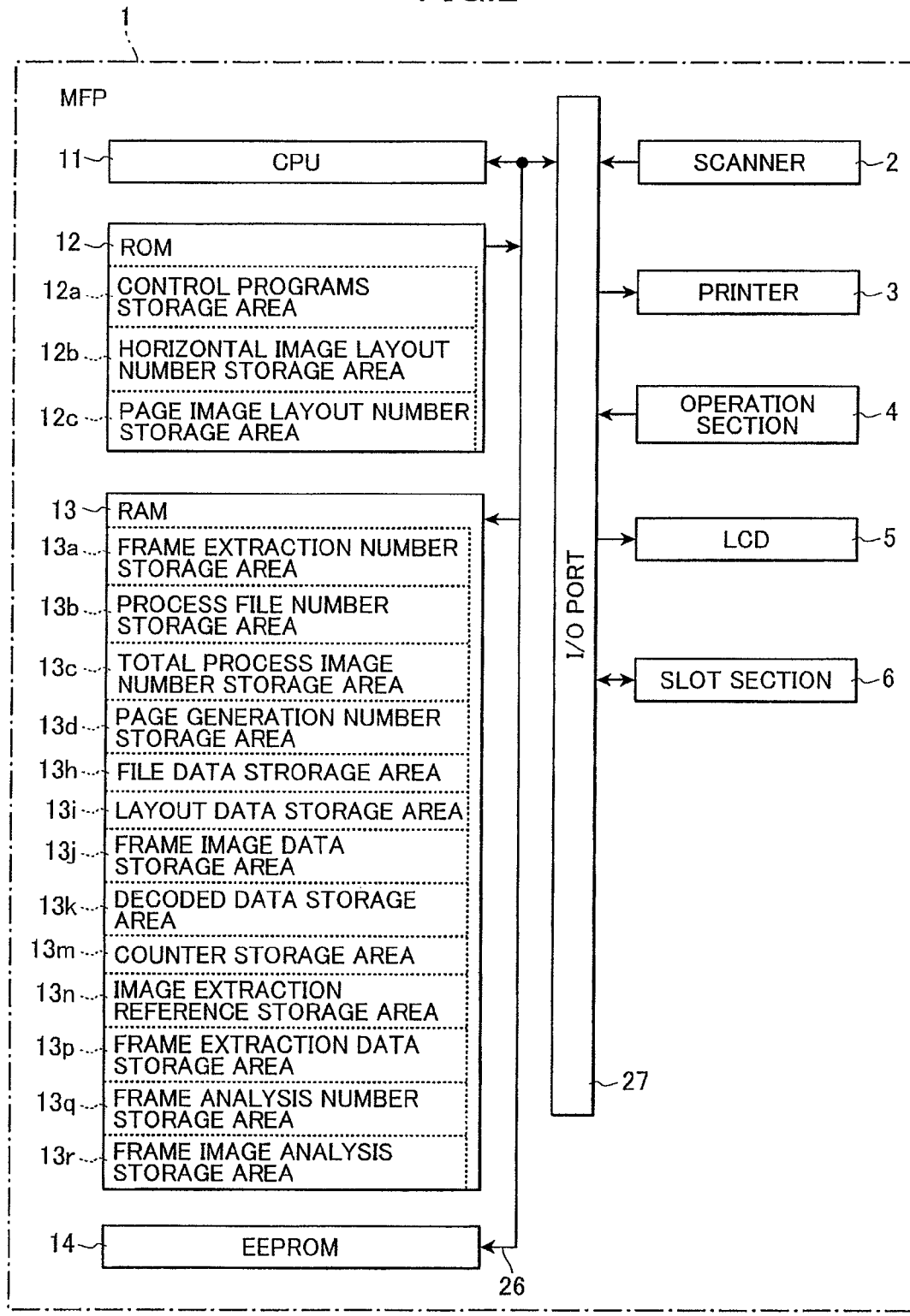
FIG. 2 is a block diagram showing an electrical structure of the MFP.

Next, the electrical structure of the MFP 1 will be described with reference to FIG. 2. FIG. 2 is a block diagram showing the electrical structure of the MFP 1. The MFP 1 primarily includes a CPU 11, a ROM 12, a RAM 13, an EEPROM 14, the scanner 2, the printer 3, the operating section 4, the LCD 5, and the slot section 6.

The CPU 11, ROM 12, RAM 13, and EEPROM 14 are interconnected via a bus line 26. The scanner 2, printer 3, operating section 4, LCD 5, slot section 6, and bus line 26 are also interconnected via an I/O port 27.

The CPU 11 controls the various functions possessed by the MFP 1 and each component connected to the I/O port 27 according to fixed values and programs stored in the ROM 12, RAM 13, and EEPROM 14.

The ROM 12 is a nonvolatile memory capable of preserving stored data even when the power is interrupted. The ROM 12 is provided with a control program storage area 12$a$ for storing the control programs executed by the CPU 11. The control programs include programs for implementing the processes described later with reference to the flowcharts in FIGS. 7 through 15.

In addition to the control program storage area 12$a$, the ROM 12 is provided with a horizontal image layout number storage area 12$b$, and a page image layout number storage area 12$c$.

The horizontal image layout number storage area 12$b$ is a memory area storing a "horizontal layout number," indicating the number of index images that can be laid out horizontally in a list of images. In the MFP 1 of the first embodiment, the horizontal image layout number storage area 12$b$ stores a plurality of horizontal layout numbers corresponding to predetermined paper sizes (L-size, A4-size, letter size, etc.) and printing modes (fine, normal, draft, etc.). When performing a layout printing process described later with reference to FIGS. 14 and 15, the MFP 1 reads and employs a suitable value from among the plurality of horizontal layout numbers.

The page image layout number storage area 12$c$ is a memory area storing a "page layout number," indicating the maximum number of index images in an image list that can be arranged on a single sheet of recording paper. The page image layout number storage area 12$c$ in the first embodiment stores a plurality of page layout numbers for predetermined paper sizes and printing modes. In the layout printing process described later with reference to FIGS. 14 and 15, the MFP 1 reads and employs a suitable value from among these page layout numbers.

The RAM 13 temporarily stores various data produced when the MFP 1 executes various operations. The RAM 13 is provided with a frame extraction number storage area 13$a$, a process file number storage area 13$b$, a total process image number storage area 13$c$, a page generation number storage area 13$d$, a file data storage area 13$h$, a layout data storage area 13$i$, a frame image data storage area 13$j$, a decoded data storage area 13$k$, a counter storage area 13$m$, an image extraction reference storage area 13$n$, a frame extraction data storage area 13$p$, a frame analysis number storage area 13$q$, and a frame image analysis storage area 13$r$.

Here, terminology used in the first embodiment will be defined. The term "video" in the first embodiment denotes a moving image reproduced by displaying a plurality of frame images in succession. A "video file" is a file containing data for playing a video, such as an AVI video file or a QuickTime video file. The video file may be of any format, provided that the file contains data that can be used to playback video images. Further, "frame image data" in the first embodiment denotes data corresponding to a single frame image of a video.

The frame extraction number storage area 13a is a memory area storing a "frame image extraction number," denoting the number of frame images for which corresponding frame image data is to be extracted per video file. If the frame image extraction number is "5", for example, the MFP 1 extracts frame image data for five frames per video file and lays out five index images per video file in an image list based on the extracted frame image data.

In the first embodiment, the MFP 1 stores an arbitrary value inputted by the user via the operating section 4 in the frame extraction number storage area 13a as the frame image extraction number. However, the frame image extraction number may also be stored in the ROM 12 or the like in advance or may be automatically set according to a predetermined relationship; for example, the frame image extraction number may be set increasingly larger for increasingly larger sizes of video files.

The process file number storage area 13b is a memory area storing a "total number of process files," denoting the total number of still image files and video files stored on the media card.

The total process image number storage area 13c is a memory area storing a "total number of process images," indicating the total number of index images to form in the image list. The page generation number storage area 13d is a memory area storing a "page generation number," denoting the total number of pages of the image list to output when executing the layout printing process described later with reference to FIGS. 14 and 15.

The file data storage area 13h and layout data storage area 13i will be described later with reference to FIGS. 4 and 5.

The frame image data storage area 13j is a memory area storing frame image data extracted from a video file. The decoded data storage area 13k is a memory area storing the results of a process to decode frame image data or the results of a process to decode a still image file. The counter storage area 13m is a memory area storing various counter values.

The image extraction reference storage area 13n is a memory area storing one of a "portrait flag" indicating a portrait image having people as the subject, and a "landscape flag" indicating a landscape image having scenery as the subject. The MFP 1 arranges in an image list 20 (see FIG. 3) index images for frame images and/or still images found to meet the image extraction reference and outputs the image list 20, as will be described later in greater detail.

The frame extraction data storage area 13p will be described later with reference to FIG. 6. The data stored in the frame analysis number storage area 13q and the frame image analysis storage area 13r will be described later with reference to FIG. 10. The EEPROM 14 is a nonvolatile writable memory.

FIG. 3 shows an example of a collection P of images corresponding to image files stored on the memory card, and an image list 20 outputted by the MFP 1 based on the image extraction reference. The collection P of images shown in FIG. 3 will be described as including still images P1 corresponding to still image files, and frame images P2 extracted from videos corresponding to video files.

The MFP 1 analyzes image files stored on the media card and determines whether each of the images P1 and P2 formed from corresponding image files meets the image extraction reference. The MFP 1 forms index images 21 from still images P1 and frame images P2 found to meet the image extraction reference by reducing or enlarging the images to a prescribed size, lays out the index images 21 in the image list 20, and outputs the image list 20.

For example, when the portrait flag is stored in the image extraction reference storage area 13n (see FIG. 2), the MFP 1 determines that images P1 and P2 containing people meet the image extraction reference, creates the index images 21 from these images and outputs the image list 20 with the index images 21 laid out therein. Accordingly, the MFP 1 can provide a useful image list 20 when the user wants to selectively browse images with human subjects.

On the other hand, if the landscape flag is stored in the image extraction reference storage area 13n, the MFP 1 outputs an image list 20 having index images 21 for images P1 and P2 in which no people have been detected. Therefore, the MFP 1 can provide a useful image list 20 when the user wishes to selectively browse landscape images.

Since a video is configured of numerous frame images, it would be difficult for a user to browse images if all frame images have been arranged in the image list 20. However, by including only index images 21 for frame images determined to meet the image extraction reference in the image list 20, the user can more easily find a desired image.

The MFP 1 also makes browsing more user-friendly by listing both frame images and still images that meet the image extraction reference in the image list 20.

As will be described later in greater detail, the MFP 1 determines a layout order for arranging index images in the image list 20 based only: on the capture date and time of each image, not on whether the index image is based on a still image file or a video file.

Although FIG. 3 is merely one example of the image list 20, the MFP 1 determines the layout order of the index images 21 so that one row of index images 21 having the earliest capture dates and times are arranged from left-to-right in the image list 20, and thereafter a row of index images 21 having the next earliest capture dates and times is arranged below the previous row. That is, the index images 21 are arranged in the ascending order from left-to-right and up-to-down.

Hence, even if the user cannot remember whether the image is a still image or video, for example, the user can quickly find the desired image based on the capture date and time, i.e., whether the image was taken some time ago or fairly recently.

FIG. 4 conceptually illustrates the structure of the file data storage area 13h. As shown in FIG. 4, the file data storage area 13h includes a file ID storage area 201 storing file IDs, a file name storage area 202 storing filenames, a file type storage area 203 storing file types, a frame extraction number storage area 204 storing frame image extraction numbers, a total frame number storage area 205 storing total frame numbers, an fps data storage area 206 storing frames per second data, a file date data storage area 207 storing file date data, a file time data storage area 208 storing file time data, and an adjunctive file data storage area 209. File data records 200 are each configured of a filename, file type, frame extraction number, fps data, file date data, file time data, and adjunctive file data. The file data records 200 are stored in association with file IDs for managing the file data records 200. That is, the file data 200 corresponds to each line of the file data storage area 13h shown in FIG. 4. The MFP 1 creates a file data record 200 for each still image file and video file stored on the media card and stores the file data record 200 in the file data storage area 13h as a preparatory process for determining the layout order of the index images 21 in the image list 20 (see FIG. 3).

The file ID storage area 201 is an address area storing a file ID, and the file name storage area 202 is a memory area storing the filename of a still image file or a video file. As shown in FIG. 4, an extension is appended to each filename. Examples of extensions appended to filenames are "jpg" for JPEG image files, "avi" for AVI video files, and "mov" for QuickTime video files.

The file type storage area 203 is a memory area storing a value that indicates the type (format) of image file. The type of the image file can be determined from the extension appended to the filename, for example. In the first embodiment, the value "0" is stored in the file type storage area 203 when the image file is in the JPEG file format (jpg extension), the value "1" is stored in the file type storage area 203 when the image file is in the AVI video file format (avi extension), and the value "2" is stored in the file type storage area 203 when the image file is in the QuickTime video file format (mov extension).

The MFP 1 can determine the type of image file based on data stored in a few bytes at the beginning of the image file. For example, if the first two bytes at the start of an image file are "0xFFD8," the MFP 1 can detect that the file is a JPEG file. If the first two bytes are "0x424D," the MFP 1 can detect that the file contains bitmap data. Hence, it is possible to determine the type of image file based on this data.

The frame extraction number storage area 204 stores a value indicating the number of frame images for which corresponding frame image data is to be extracted from the image file. A "1" is stored in the frame extraction number storage area 204 when the file is a still image file. The value in the frame extraction number storage area 13a is stored (copied) in the frame extraction number storage area 204 when the record 200 is newly inputted.

The total frame number storage area 205 stores the total number of frames in the corresponding image file. Hence, when the file is a video file, the total frame number storage area 205 stores the total number of frames in that video file. If the file is a still image file, then the total frame number storage area 205 always stores the value "1".

The fps data storage area 206 stores fps (frames per second) data for the image file. In the case of a video file, the fps data storage area 206 stores a value such as "60" or "30"-indicating that the video is played at a rate of 60 frames per second or 30 frame per second, respectively. A "0" is stored in the fps data storage area 206 when the file is a still image file.

The file date data storage area 207 stores file date data representing the date that the image file was captured; for example, the capture date "Jan. 15, 2008" is represented with the file date data "20080115."

The file time data storage area 208 stores file time data indicating the time that the image file was captured; for example, the capture time "12:50:45," where "12" indicates the hour, "50" the minutes, and "45" the seconds, is expressed with the file time data "125045." If the image file is a video file, data indicating the start time for video capture is stored as the file time data.

In the following description, it will be assumed that the total frame number, fps data, file date data, and file time data are acquired by extracting data from the header of the image file, but this data may be acquired by other means.

The data stored in the adjunctive file data storage area 209 will be described later with reference to FIGS. 9 and 10.

FIG. 5 conceptually illustrates the structure of the layout data storage area 13i. As shown in FIG. 5, the layout data storage area 13i stores layout data records 300, each including a file ID, frame extraction position, frame extraction ordinal number, image date data, and image time data; and a layout order number associated with each layout data record 300.

Specifically, the layout data storage area 13i is provided with a layout order storage area 301, a file ID storage area 302, a frame extraction position storage area 303, a frame extraction ordinal number storage area 304, an image date data storage area 305, and an image time data storage area 306.

The layout order storage area 301 stores layout order numbers. In the layout printing process described later with reference to FIGS. 14 and 15, the MFP 1 reads layout data records 300 in an order based on these layout order numbers and arranges index images 21 in the image list 20 for frame images and still images identified by the layout data records 300 based on this layout order.

The file ID storage area 302 stores file IDs. Since a file ID is stored for each filename in the file data storage area 13h, as described above with reference to FIG. 4, each image file can be identified from the file ID.

The frame extraction position storage area 303 stores a "frame extraction position" indicating the position of the frame image for which frame image data is to be extracted. Specifically, the frame extraction position is a number indicating how many frames from the start of the video file the target frame image is located. The data stored in the frame extraction position storage area 303 will be described later with reference to FIG. 9.

The frame extraction ordinal number storage area 304 stores a "frame extraction ordinal number" designating the place of the frame image among the number of frame images to be extracted from one video. In other words, the numbers "1", "2", and "3" stored in the extraction frame number storage area 304 respectively indicate the $1^{st}$, $2^{nd}$, and $3^{rd}$ frame images to be extracted from the video file at the frame extraction position indicated in the corresponding extraction frame position storage area 303.

The image date data storage area 305 stores image date data expressing the day that the image file identified by the file ID stored in the file ID storage area 302 was captured. The image time data storage area 306 stores the image time data representing the time that the file was captured. For still image files, the file time data stored in the corresponding memory area of the file data storage area 13h is copied to this image time data storage area 306.

However, for video files, the MFP 1 acquires image time data expressing the captured time for each frame image data and stores this image time data in the image time data storage area 306. Specific examples for calculating the image time data for each frame image data will be described later with reference to the flowchart in FIG. 12.

In the layout printing process described later 15, with reference to FIGS. 14 and 15, the MFP 1 prints the image list 20 (see FIG. 3) having index images 21 arranged in order of the capture date and time based on the layout data records 300 stored in the layout data storage area 13i.

FIG. 6 conceptually illustrates the frame extraction data storage area 13p. As shown in FIG. 6, the frame extraction data storage area 13p includes a frame extraction ordinal number storage area 401, a frame extraction position storage area 402, and a file ID storage area 403. The frame extraction position storage area 402 stores frame extraction positions for identifying frame images that meet the image extraction reference. The frame extraction ordinal number storage area 401 stores control numbers for managing the frame extraction positions stored in the frame extraction position storage area 402. The file ID storage area 403 stores file IDs corresponding to values in the file ID storage area 201.

Figure 7:
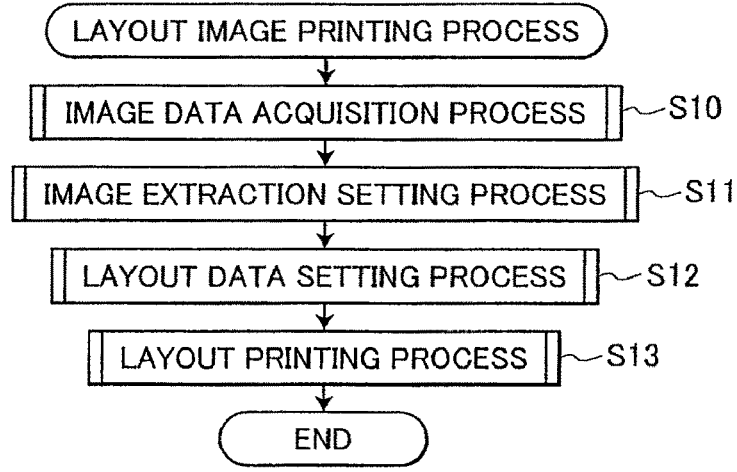
FIG. 7 is a flowchart illustrating steps in a layout image printing process executed on the MFP.

FIG. 7 is a flowchart illustrating steps in a layout image printing process executed on the MFP 1. The MFP 1 executes the layout image printing process when the user inputs a command to begin printing the image list 20.

In S10 at the beginning of the layout image printing process, the CPU 11 of the MFP 1 executes an image data acquisition process for creating and storing a part of the file data records 200 in the file data storage area 13h (see FIG. 4). The image data acquisition process of S10 will be described later with reference to FIG. 8.

Next, in S11 the CPU 11 executes an image extraction setting process for setting images that meet the image extraction reference. The image extraction setting process of S11 will be described later with reference to FIG. 9.

In S12 the CPU 11 executes a layout data setting process for creating and storing the layout data records 300 in the layout data storage area 13i (see FIG. 5) and a part of the file data records 200 in the file data storage area 13h. The layout data setting process of S12 will be described later with reference to FIG. 12.

In S13 the CPU 11 executes the layout printing process for printing out the image list 20 based on the layout data records 300 set in S12. The layout printing process of S13 will be described later with reference to FIGS. 14 and 15. By executing the layout image printing process of FIG. 7, the MFP 1 can output the image list 20 described above with reference to FIG. 3.

Figure 8:
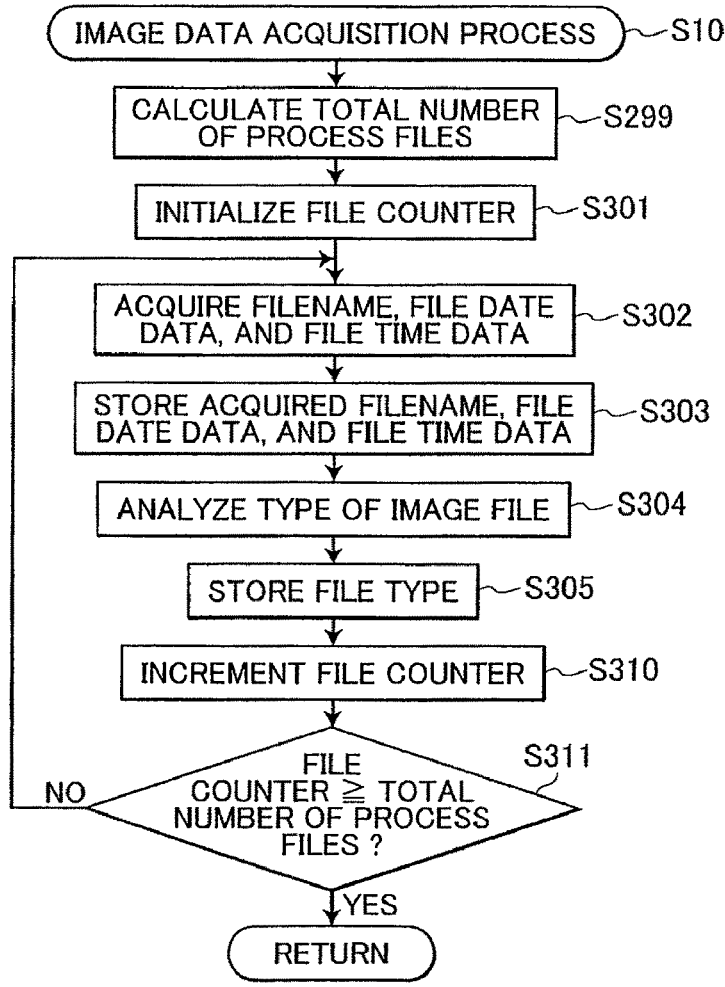
FIG. 8 is a flowchart illustrating steps in an image data acquisition process.

FIG. 8 is a flowchart illustrating steps in the image data acquisition process of S10. The image data acquisition process is performed to create the file data records 200 shown in FIG. 4.

In S299 at the beginning of the image data acquisition process, the CPU 11 calculates the total number of process files stored on the media card and stores this number in the process file number storage area 13b. In S301 the CPU 11 initializes a file counter for counting the number of files that have been processed in this image data acquisition process to "0". The file counter is stored in the counter storage area 13m shown in FIG. 2.

In S302 the CPU 11 selects one of the image files stored on the media card as the process target and acquires the filename, file date data, and file time data for the image file. In S303 the CPU 11 stores the acquired filename, file date data, and file time data in memory areas associated with the file ID equivalent to the file counter. Specifically, the filename is stored in the file name storage area 202, the file date data in the file date data storage area 207, and the file time data in the file time data storage area 208 (see FIG. 5).

In S304 the CPU 11 analyzes the type of the selected image file. For example, the CPU 11 analyzes the extension appended to the filename to determine the file type. In S305 the CPU 11 stores the determined file type in the file type storage area 203 shown in FIG. 5 associated with the file ID equivalent to the file counter. In S310 the CPU 11 increments the file counter by 1 and in S311 determines whether the file counter exceeds the total number of process files stored in the process file number storage area 13b.

The CPU 11 returns to S302 and repeats the above process if the file counter is less than the total number of process files (S311: NO), and ends the image data acquisition process of S10 when determining that the file counter is greater than or equal to the total number of process files (S311: YES). After completing the image data acquisition process, the CPU 11 advances to the process shown in FIG. 9.

Figure 9:
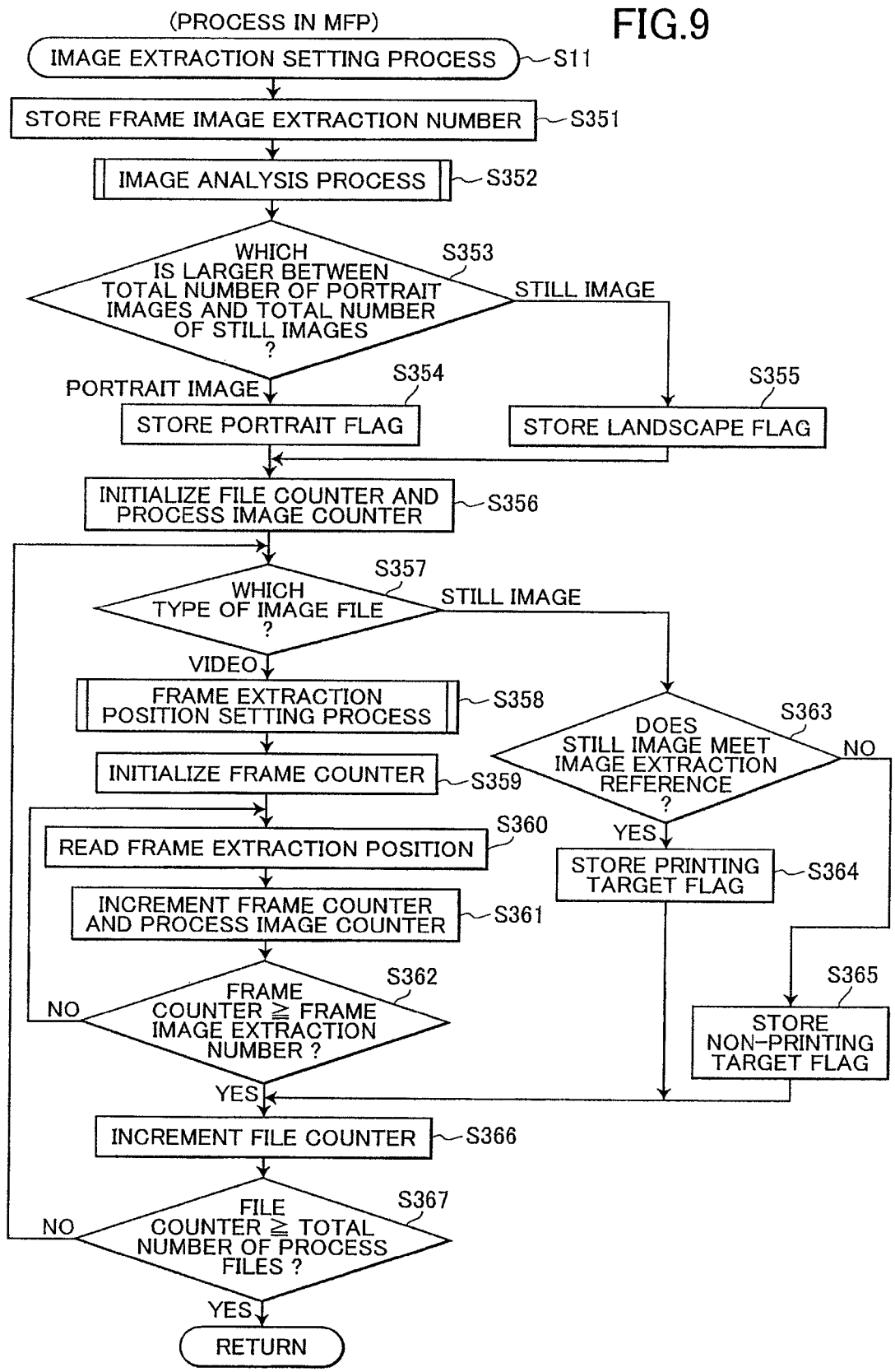
FIG. 9 is a flowchart illustrating steps in an image extraction setting process.

FIG. 9 is a flowchart illustrating steps in the image extraction setting process of S11. This image extraction setting process is performed to select images to be laid out in the image list 20.

In S351 the CPU 11 stores a value inputted by the user via the operating section 4 in the frame extraction number storage area 13a as the frame image extraction number. In S352 the CPU 11 executes an image analysis process for analyzing each video file and still image file stored on the media card to determine whether the files are portrait images containing people or landscape images containing scenery. The image analysis process of S352 will be described later with reference to FIG. 10.

In S353 the CPU 11 determines whether there are more still image files and video files sorted as portrait images or still image files and video files sorted as landscape images. That is, the CPU 11 determines which is larger between the total number of the portrait images and total number of landscape images. If the CPU 11 determines that there are more portrait images than the landscape images (S353: portrait images), in S354 the CPU 11 stores a portrait flag in the image extraction reference storage area 13n shown in FIG. 2. However, if the CPU 11 determines that there are more landscape images than portrait images (S353: landscape images), in S355 the CPU 11 stores a landscape flag in the image extraction reference storage area 13n. Hence, the CPU 11 classifies image files as portrait images and landscape images through the image analysis process of S352, determines which is greater between the total number of still image files and video files classified as portrait images and the total number classified as landscape images, and stores a flag indicating which type of image is more prevalent as the image extraction reference.

In S356 the CPU 11 initializes the file counter and process image counter to "0". In S357 the CPU 11 determines the file type of the image file identified by the file ID having the value of the file counter among the file data records 200 in the file data storage area 13h. If the CPU 11 determines that the file type is a video file (S357: video), in S358 the CPU 11 executes a frame extraction position setting process for setting positions of frame images that meet the image extraction reference. The frame extraction position setting process of S358 will be described later with reference to FIG. 11.

In S359 the CPU 11 initializes a frame counter to "0". In S360 the CPU 11 reads the frame extraction position from the frame extraction position storage area 402 associated with the file ID equivalent to the file counter and the frame extraction number equivalent to the frame counter and stores this frame extraction position in the frame extraction position storage area 303 shown in FIG. 5 in association with the layout order number equivalent to the process image counter.

In S361 the CPU 11 increments the frame counter and the process image counter by "1". In S362 the CPU 11 determines whether the frame counter is greater than or equal to the frame image extraction number stored in the frame extraction number storage area 13a and repeats the process from S360 when the frame counter is less than the frame image extraction number (S362: NO).

The CPU 11 repeats the process described above until determining in S362 that the frame counter is greater than or equal to the frame image extraction number (S362: YES), and subsequently advances to S366.

However, if the CPU 11 determines in S357 that the file type is a still image file (S357: still image), in S363 the CPU 11 determines whether the value stored in the adjunctive file data storage area 209 shown in FIG. 4 is equivalent to the value stored in the image extraction reference storage area 13n shown in FIG. 2. As will be described later, the adjunctive file data storage area 209 stores either a portrait flag indicating that the still image is a portrait image, or a landscape flag indicating that the still image is a landscape image. Hence, in the process of S363 the CPU 11 determines whether the still image meets the image extraction reference.

If the still image does meet the image extraction reference (S363: YES), in S364 the CPU 11 stores a printing target flag in the adjunctive file data storage area 209 in association with the file ID equivalent to the file counter. However, if the still image does not meet the image extraction reference (S363: NO), in S365 the CPU 11 stores a non-printing target flag in the adjunctive file data storage area 209. After completing the process in S364 or S365, the CPU 11 advances to S366.

In S366 the CPU 11 increments the file counter by "1" and in S367 determines whether the file counter is greater than or equal to the total number of process files stored in the process file number storage area 13b. The CPU 11 repeats the process from S357 while the file counter is less than the total number of process files (S367: NO) When the CPU 11 determines that the file counter is greater than or equal to the total number of process files after repeatedly performing the above process (S367: YES), the CPU 11 ends the image extraction setting process of S11 and advances to the layout data setting process of S12. The layout data setting process will be described later with reference to FIG. 12.

Through the image extraction setting process of S11 the MFP 1 determines whether there are more landscape images or portrait images and stores data indicating the file type represented in the majority of images as the image extraction reference. Through processes described later, the MFP 1 can output an image list 20 including a layout of index images 21 for images that meet the image extraction reference.

Hence, the MFP 1 can output an image list 20 that more closely matches the user's preferences by outputting an image list 20 with landscape images when the majority of images on the media card are images taken of scenery, and by outputting an image list 20 with portrait images when the majority of images on the media card are images taken of people.

Figure 10:
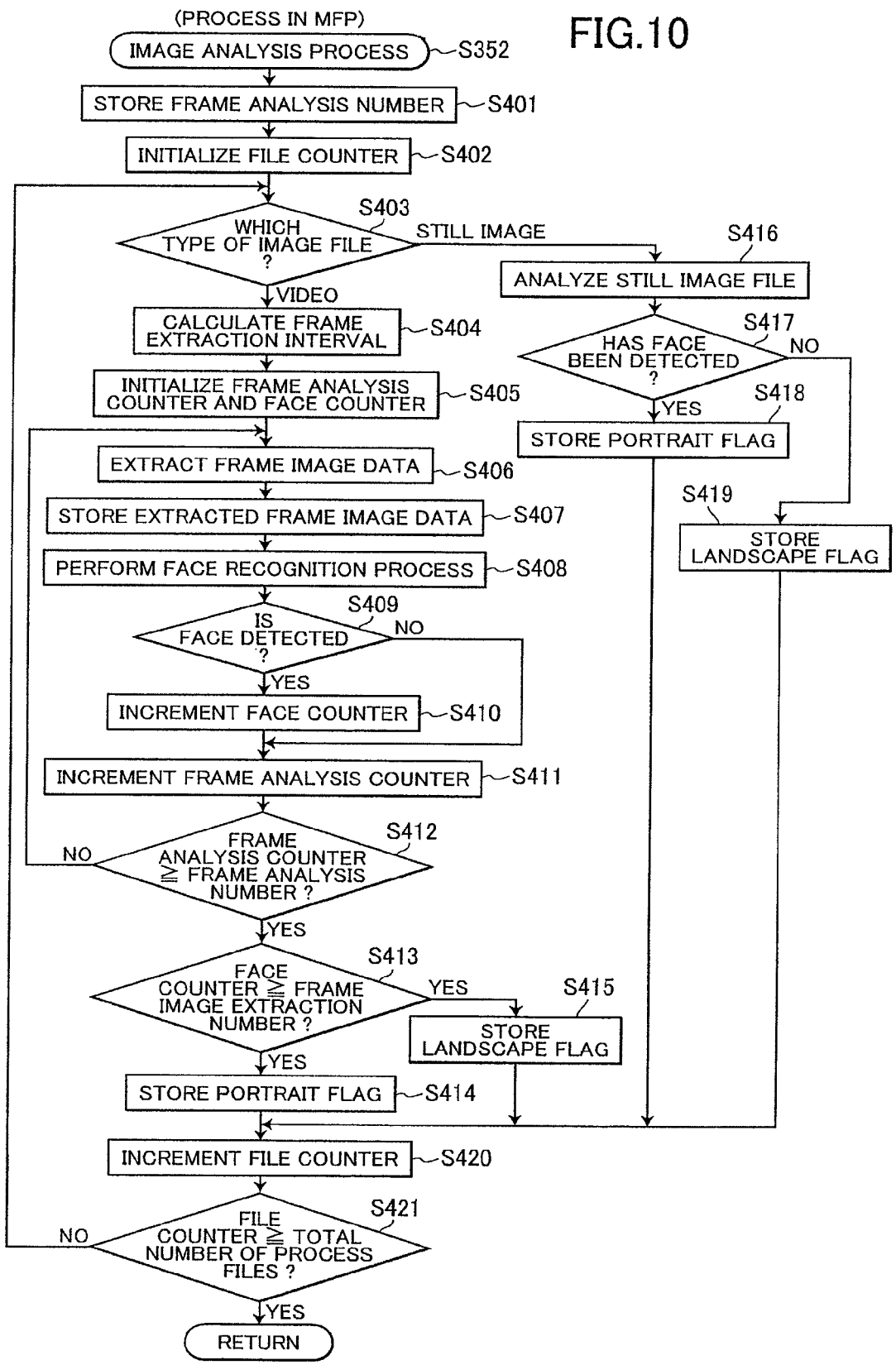
FIG. 10 is a flowchart illustrating steps in an image analysis process.

FIG. 10 is a flowchart illustrating steps in the image analysis process of S352. The image analysis process is executed to determine whether each image file is a portrait image or a landscape image.

In S401 at the beginning of the image analysis process, the CPU 11 stores a value inputted by the user via the operating section 4 in the frame analysis number storage area 13q shown in FIG. 2 as a frame analysis number. The user may input the frame analysis number before executing the layout image printing process or during the layout image printing process. In S402 the CPU 11 initializes the file counter to "0".

In S403 the CPU 11 determines the type of image file identified by the file ID equivalent to the file counter. If the CPU 11 determines that the file is a video file (S403: video), in S404 the CPU 11 calculates a frame extraction interval by dividing the total number of frames in the video file by the frame image extraction number.

In S405 the CPU 11 initializes a frame analysis counter and a face counter to "0". These counters are stored in the counter storage area 13m.

In S406 the CPU 11 multiplies the value of the frame analysis counter by the frame extraction interval, counts a number of frames from the beginning frame equivalent to the product found above, and extracts frame image data for this frame. In S407 the CPU 11 stores the extracted frame image data in the frame image analysis storage area 13r shown in FIG. 2.

In S408 the CPU 11 performs a face recognition process for analyzing the frame image data stored in the frame image analysis storage area 13r to detect faces in the frame image corresponding to the frame image data. The face recognition process may be implemented with a well-known technique employing Haar-like features and AdaBoost classifiers or any other technique well known in the art. In the embodiment, people in an image are detected by detecting faces in the image.

In S409 the CPU 11 determines whether a face has been detected. The CPU 11 increments the face counter by "1" in S410 when a face has been detected (S409: YES) or skips the process in S410 when a face has not been detected (S409: NO).

In S411 the CPU 11 increments the frame analysis counter by "1" and in S412 determines whether the frame analysis counter is greater than or equal to the frame analysis number. The CPU 11 repeats the process from S406 when the frame analysis counter is less than the frame analysis number (S412: NO).

When the frame analysis counter is greater than or equal to the frame analysis number (S412: YES), in S413 the CPU 11 determines whether the value of the face counter is greater than or equal to the frame image extraction number stored in the frame extraction number storage area 13a. If so (S413: YES), in S414 the CPU 11 stores a portrait flag in the adjunctive file data storage area 209 in association with the file ID equivalent to the file counter. If not (S413: NO), in S415 the CPU 11 stores a landscape flag in the adjunctive file data storage area 209.

Hence, through the above process, the MFP 1 determines whether a frame image satisfies the conditions of a portrait image containing people or a landscape image containing scenery according to whether the number of faces detected in the frame image is a prescribed number or greater. Based on these results, the CPU 11 stores either a portrait flag or a landscape flag in the adjunctive file data storage area 209 so that video files can be sorted into a group having the characteristics of portrait images and a group having the characteristics of landscape images.

In order to avoid redundancy in this description, the group of portrait images will simply be referred to as "portrait images," while the group of landscape images will simply be referred to as "landscape images." Further, as shown in FIG. 4, the adjunctive file data storage area 209 stores either a "1" as a portrait flag or a "0" as a landscape flag.

In S420 the CPU 11 increments the file counter by "1" and in S421 determines whether the file counter is greater than or equal to the total number of process files stored in the process file number storage area 13b. If the file counter is less than the total number of process files (S421: NO), the CPU 11 returns to S403 and repeats the process described above.

When the CPU 11 determines in S403 that the file type is a still image file (S403: still image), in S416 the CPU 11 acquires and analyzes the still image file identified by the file ID equivalent to the file counter and detects whether the still image corresponding to the still image file includes faces. This process is identical to that described for S408 and will not be repeated here.

In S417 the CPU 11 determines whether faces have been detected. If faces have been detected (S417: YES), in S418 the CPU 11 stores a portrait flag in the adjunctive file data storage area 209 in association with the file ID equivalent to the file counter. However, if faces have not been detected (S417: NO), in S419 the CPU 11 stores a landscape flag in the adjunctive file data storage area 209 in association with the file ID equivalent to the file counter. In this way, the CPU 11 stores either a portrait flag or a landscape flag in the adjunctive file data storage area 209 based on whether the still image corresponding to the still image file satisfies the characteristics of a portrait image or the characteristics of a landscape image, thereby classifying still image files as portrait images or landscape images. Subsequently, the CPU 11 advances to S420 described earlier.

When the CPU 11 determines in S421 that the file counter is greater than or equal to the total number of process files after repeatedly performing the above process (S421: YES), the CPU 11 ends the image analysis process and returns to S353 described with reference to FIG. 9.

Figure 11:
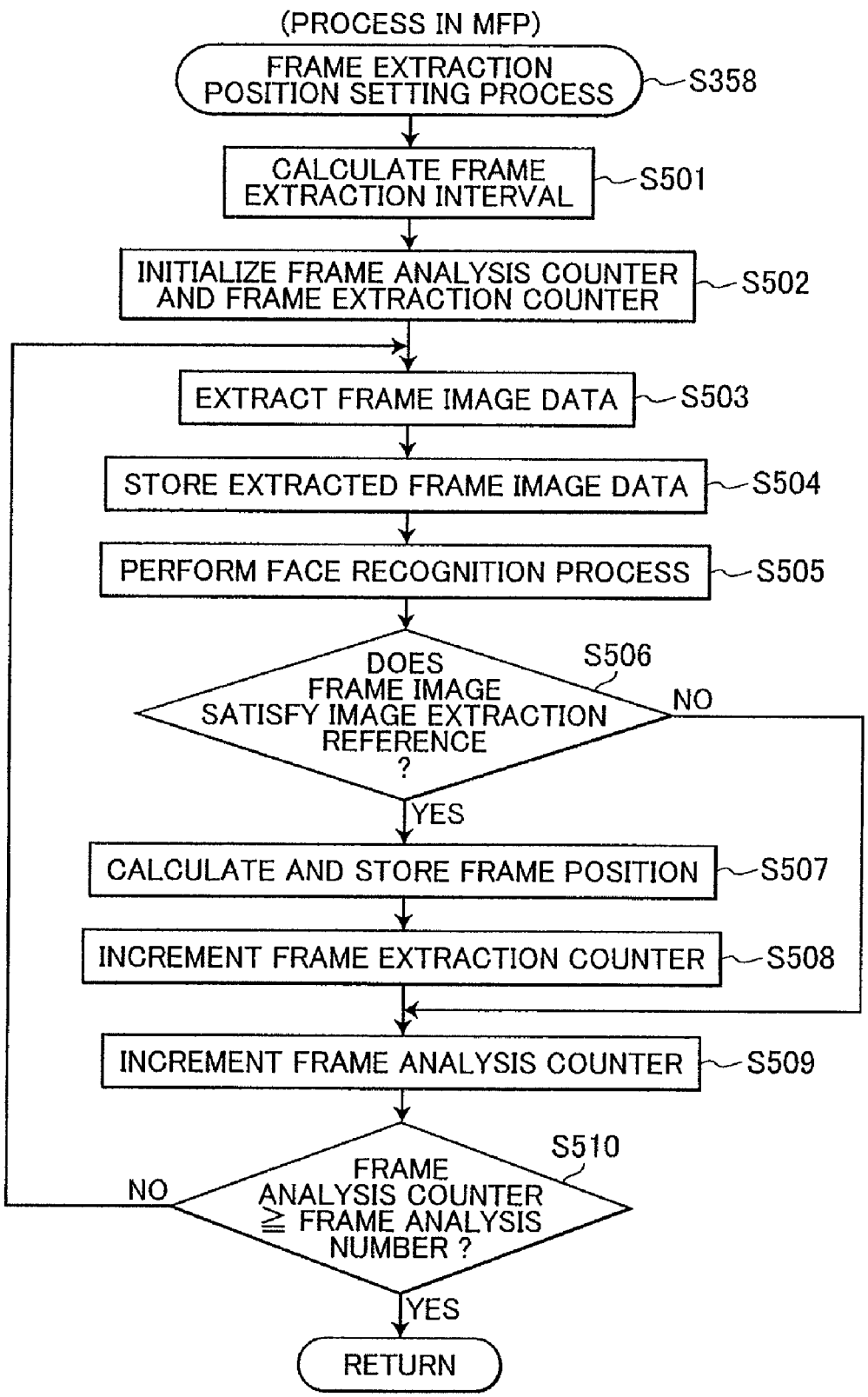
FIG. 11 is a flowchart illustrating steps in a frame extraction position setting process.

FIG. 11 is a flowchart illustrating steps in the frame extraction position setting process of S358. This process is performed to set a frame position for identifying frame image data satisfying the image extraction reference.

In S501 at the beginning of the frame extraction position setting process, the CPU 11 calculates a frame extraction interval by dividing the total number of frames in the targeted video file by the frame image extraction number stored in the frame extraction number storage area 13a. In S502 the CPU 11 initializes a frame analysis counter and a frame extraction counter to "0". Here, the frame extraction counter is stored in the counter storage area 13m.

In S503 the CPU 11 multiplies the value of the frame analysis counter by the frame extraction interval, counts a number of frames equivalent to this product from the initial frame, and extracts the frame image data for this frame. In S504 the CPU 11 stores the extracted frame image data in the frame image analysis storage area 13r shown in FIG. 2.

In S505 the CPU 11 performs the same face recognition process described in S408 for analyzing the frame image data stored in the frame image analysis storage area 13r to detect faces in the frame image corresponding to this frame image data.

In S506 the CPU 11 determines whether the frame image satisfies the image extraction reference. Specifically, the CPU 11 determines that a frame image in which faces have been detected satisfies the image extraction reference when a portrait flag is stored in the image extraction reference storage area 13n. On the other hand, the CPU 11 determines that a frame image in which faces have been detected does not satisfy the image extraction reference when a landscape flag is stored in the image extraction reference storage area 13n.

Further, the CPU 11 determines that a frame image in which faces have not been detected does not satisfy the image extraction reference when a portrait flag is stored in the image extraction reference storage area 13n. On the other hand, the CPU 11 determines that a frame image in which faces have not been detected does satisfy the image extraction reference when a landscape flag is stored in the image extraction reference storage area 13n.

If the CPU 11 determines that the image extraction reference has been satisfied (S506: YES), in S507 the CPU 11 calculates the frame position by multiplying the value of the frame analysis counter by the frame extraction interval and stores this frame position in the frame extraction position storage area 402 shown in FIG. 6 in association with the file ID equivalent to the file counter and the frame extraction number equivalent to the frame extraction counter. In S508 the CPU 11 increments the frame extraction counter by "1". However, the CPU 11 skips S507 and S508 when determining that the image extraction reference has not been satisfied (S506: NO).

In S509 the CPU 11 increments the frame analysis counter by "1" and in S510 determines whether the frame analysis counter is greater than or equal to the frame analysis number stored in the frame analysis number storage area 13q. The CPU 11 repeats the process from S503 while the frame analysis counter is less than the frame analysis number (S510: NO).

By repeatedly performing the above process, the MFP 1 can determine whether frame images satisfy the image extraction reference for frame images at prescribed intervals from the initial frame in the order that a series of frame images constituting a video are played back. In this way, a specified number of frame images from among the total frames constituting a single video can be extracted and analyzed without bias.

When the CPU 11 determines in S510 that the frame analysis counter is greater than or equal to the frame analysis number after repeatedly performing the above process (S510: YES), the CPU 11 ends the frame extraction position setting process of S358.

Figure 12:
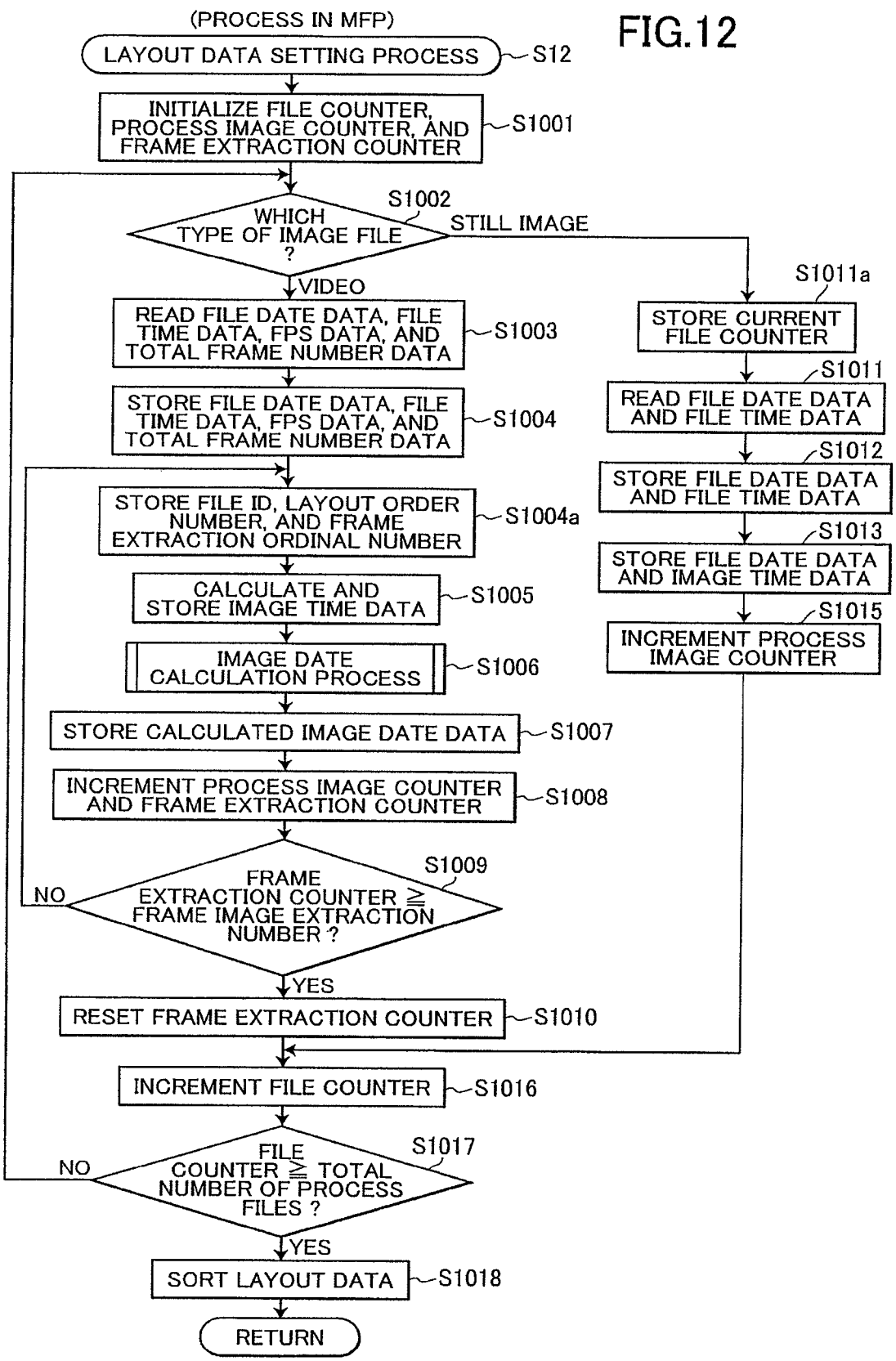
FIG. 12 is a flowchart illustrating steps in a layout data setting process.

FIG. 12 is a flowchart illustrating steps in the layout data setting process of S12. In S1001 at the beginning of the layout data setting process, the CPU 11 initializes a file counter for counting the number of processed files, a process image counter for counting the number of processed images, and a frame extraction counter for counting the number of extracted frame images to "0". These counters are all stored in the counter storage area 13m shown in FIG. 2.

In S1002 the CPU 11 determines the type of the image file corresponding to the image ID equivalent to the file counter. Since the file counter is initially "0", the CPU 11 determines the type of the image file having file ID "0".

If the CPU 11 determines that the file type is a video (S1002: video), in S1003 the CPU 11 reads the file date data indicating the capture date of the video file, the file time data indicating the capture start time of the video file, the fps data indicating the frames per second of the video file, and the total frame number data indicating the total number of frames in the video file from the header of the video file.

In S1004 the CPU 11 stores the file date data in the file date data storage area 207, the file time data in the file time data storage area 208, the fps data in the fps data storage area 206, and the total frame number data in the total frame number storage area 205 in correspondence with the file ID equivalent to the file counter.

In S1004a the CPU 11 performs a process to create layout data for the targeted image file and to store this layout data in the layout data storage area 13i shown in FIG. 5. More specifically, the CPU 11 stores the value of the current file counter as the file ID in the file ID storage area 302 shown in FIG. 5 in correspondence with the layout order number equivalent to the process image counter. In addition, the CPU 11 estimates the frame extraction ordinal number from the current value of the frame extraction counter and stores this frame extraction ordinal number in the frame extraction ordinal number storage area 304 shown in FIG. 5.

In S1005 the CPU 11 calculates image time data for the frame image data corresponding to the frame extraction ordinal number and stores this image time data in the image time data storage area 306 in correspondence with the layout order number equivalent to the process image counter. The following is an example of a method used in the embodiment for calculating the image time data.

In the following calculations, VideoTime is the file time data representing the capture start time of the video file, FPS is the frames per second data, FrameTime is the image time data representing the capture time of the frame image data, and N is the frame extraction position (the value stored in the frame extraction position storage area 303) for the targeted frame image data. That is, the CPU 11 finds N from Equation 1-5 below, where N is a value indicating the position of a frame image corresponding to frame image data targeted for extraction in terms of number of frames from the first frame in the video. In Equation 1-5, PickFrame represents the total number of frames to be extracted from one video (i.e., the value stored in the frame extraction number storage area 204), and PickNo represents the number of the frame to be extracted from among PickFrame.

$$N=(\text{TotalFrame}/\text{PickFrame}) \times \text{PickNo} \quad \text{(Equation 1-5)}$$

Using Equations 1-6 below, the file time data VideoTime is divided into video hour data VT_Hour, video minute data VT_Minute, and video second data VT_Second.

$$\text{VT\_Hour}=[\text{VideoTime}/10000]$$

$$\text{VT\_Minute}=[(\text{VideoTime}-\text{VT\_Hour}\times 10000)/100]$$

$$\text{VT\_Second}=\text{VideoTime}-\text{VT\_Hour}\times 10000+ \text{VT\_Minute}\times 100) \quad \text{(Equations 1-6)}$$

Here, "[ ]" represents the Gaussian symbol, where [a] indicates the maximum integer not greater than a.

Next, frame hour data Frame_Hour, frame minute data Frame_Minute, and frame second data Frame_Second are calculated using Equations 1-7 below, where Cal_Second, Cal_Minute, and Cal_Hour are temporary variables for achieving these calculations, and A mod B represents the remainder after dividing A by B.

$$\text{Cal\_Second}=\text{VT\_Second}+[N/\text{FPS}]$$

$$\text{Cal\_Minute}=\text{VT\_Minute}+[\text{Cal\_Second}/60]$$

$$\text{Cal\_Hour}=\text{VT\_Hour}+[\text{Cal\_Minute}/60]$$

$$\text{Frame\_second}=\text{Cal\_Second} \bmod 60$$

$$\text{Frame\_Minute}=\text{Cal\_Minute} \bmod 60$$

$$\text{Frame\_Hour}=\text{Cal\_Hour} \bmod 24 \quad \text{(Equations 1-7)}$$

The image time data FrameTime indicating the capture time of the frame image data can then be calculated by substituting the above results into Equation 1-8 below.

$$\text{FrameTime}=\text{Frame\_Hour}\times 10000+\text{Frame\_Minute}\times 100+\text{Frame\_Second} \quad \text{(Equation 1-8)}$$

Next, in S1006 the CPU 11 executes an image date calculation process. This process is performed to calculate frame year data Frame_Year, frame month data Frame_Month, and frame day data Frame_Day.

Figure 13:
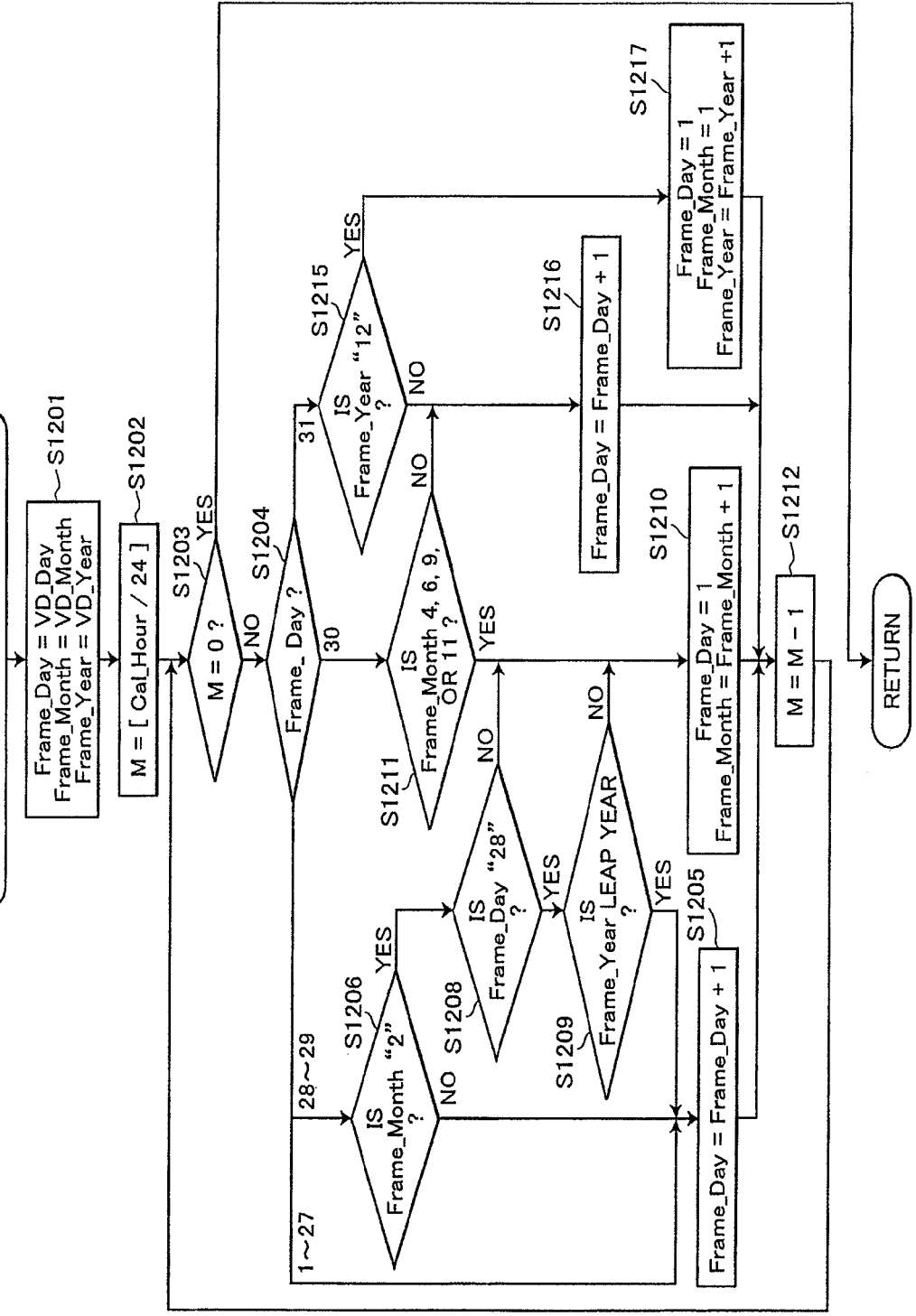
FIG. 13 is a flowchart illustrating steps in an image date calculation process.

FIG. 13 is a flowchart illustrating steps in the image date calculation process of S1006. In the flowchart of FIG. 13, a variable M denotes the number of days prior to the capture time of the frame image data. That is, the variable M denotes the number of days between the capture start time of the video file and the capture time of the frame image data.

In S1201 of the image date calculation process, the CPU 11 sets the frame year data Frame_Year, the frame month data Frame_Month, and the frame day data Frame_Day to video year data VD_Year, video month data VD_Month, and video day data VD_Day, respectively. Where video year data VD_Year, video month data VD_Month, and video day data VD_Day are temporary variables for achieving these calculations. In S1202 the CPU 11 sets the variable M to the value Cal_Hour/24. In S1203 the CPU 11 determines whether M is "0." If M is "0" (S1203: YES), the CPU 11 ends the current process.

However, if M is not "0" (S1203: NO), in S1204 the CPU 11 determines the frame day data Frame_Day. If the frame day data Frame_Day is between "1" and "27" (S1204: 1-27), in S1205 the CPU 11 increments Frame_Day by "1".

However, if the CPU 11 determines in S1204 that the frame day data Frame_Day is "28" or "29" (S1204: 28 or 29), in S1206 the CPU 11 determines whether the frame month data Frame_Month is "2". If Frame_Month is not "2" (S1206: NO), the CPU 11 advances to S1205.

However, if Frame_Month is "2" (S1206: YES), in S1208 the CPU 11 determines whether the frame day data Frame_Day is "28". If Frame_Day is not "28" (S1208: NO), then in S1210 the CPU 11 sets Frame_Day to "1" and increments Frame_Month by "1".

However, if the CPU 11 determines in S1208 that Frame_Day is "28" (S1208: YES), in S1209 the CPU 11 determines whether the year indicated by the frame year data Frame_Year is a leap year. The CPU 11 advances to S1205 if the data indicates a leap year (S1209: YES) and advances to S1210 if the data does not indicate a leap year (S1209: NO).

If the CPU 11 determines in S1204 that Frame_Day is "30" (S1204: 30), in S1211 the CPU 11 determines whether Frame_Month is one of "4", "6", "9", or "11". If so (S1211: YES), the CPU 11 advances to S1210.

However, if Frame_Month is not one of "4", "6", "9", or "11" (S1211: NO), in S1216 the CPU 11 increments Frame_Day by "1". Further, if the CPU 11 determines in S1204 that Frame_Day is "31" (S1204: 31), in S1215 the CPU 11 determines whether Frame_Year is "12". If not (S1215: NO), the CPU 11 advances to S1216 described above.

However, if Frame_Year is "12" (S1215: YES), in S1217 the CPU 11 sets Frame_Day to "1", sets Frame_Month to "1", and increments Frame_Year by "1".

After performing any of the processes in S1205, S1210, S1216, and S1217, in S1212 the CPU 11 decrements the variable M by "1" and returns to S1203. When the CPU 11 determines in S1203 that M is "0" (S1203: YES), the CPU 11 ends the image date calculation process.

Returning to FIG. 12, the CPU 11 substitutes the value found in the process of FIG. 13 in Equation 1-11 below, for example, to find image date data FrameDate representing the capture date of the frame image data. In S1007 the CPU 11 stores this calculated image date data FrameDate in the image date data storage area 305 in association with the layout order number equivalent to the process image counter.

$$\text{FrameDate}=\text{Frame\_Year}\times 10000+\text{Frame\_Month}\times 100+\text{Frame\_Day} \quad \text{(Equation 1-11)}$$

After layout data is created for one frame image extracted from the video file and stored in the layout data storage area 13*i*, in S1008 the CPU 11 increments each of the process image counter and the frame extraction counter in the counter storage area 13*m* by "1".

In S1009 the CPU 11 determines whether the value of the frame extraction counter is greater than or equal to the frame image extraction number stored in the frame extraction number storage area 13*a*. If not (S1009: NO), the CPU 11 returns to S1004*a* and repeats the process described above.

However, if the frame extraction counter is greater than or equal to the frame image extraction number (S1009: YES), then in S1010 the CPU 11 resets the frame extraction counter to "0" and in S1016 increments the file counter by "1". In S1017 the CPU 11 determines whether the file counter is greater than or equal to the total number of process files stored in the process file number storage area 13*b* denoting the total number of still image files and video files stored on the media card. If not (S1017: NO), the CPU 11 returns to S1002, selects the next image file corresponding to the file ID equivalent to the file counter and repeats the process described above.

Next, the process performed by the CPU 11 when the CPU 11 determines in S1002 that the targeted image file is a still image file (S1002: still image) will be described. In the case of a still image file as well, the CPU 11 creates file data related to the still image file and stores this data in the file data storage area 13h shown in FIG. 4, and the layout data storage area 13i shown in FIG. 5.

Specifically, in S1011a, the CPU 11 stores the current file counter in the file ID storage area 302 shown in FIG. 5 and "1" in the frame extraction position storage area 303 and the frame extraction ordinal number storage area 304 shown in FIG. 5 in correspondence with the layout order number equivalent to the process image counter. In S1011 the CPU 11 reads the file date data representing the capture date of the targeted still image file and the file time data indicating the capture time. In S1012 the CPU 11 stores the file date data and the file time data in regions of the file data storage area 13h associated with the file ID equivalent to the file counter. The CPU 11 also stores a "0" in the corresponding fps data storage area 206.

In S1013 the CPU 11 stores the file date data and the file time data for the targeted still image file corresponding to the file ID equivalent to the file counter in the image date data storage area 305 and the image time data storage area 306 shown in FIG. 5 in association with the layout order number equivalent to the process image counter. In S1015 the CPU 11 increments the process image counter by "1" and advances to S1016.

When the CPU 11 determines that the file counter is greater that or equal to the total number of process files while repeating the above process (S1017: YES), in S1018 the CPU 11 sorts the layout data in order of the smallest image time data, and subsequently ends the layout data setting process of S12. Hence, through the layout data setting process, the MFP 1 sets the layout order for each index image 21 identified by the layout data.

Figure 14:
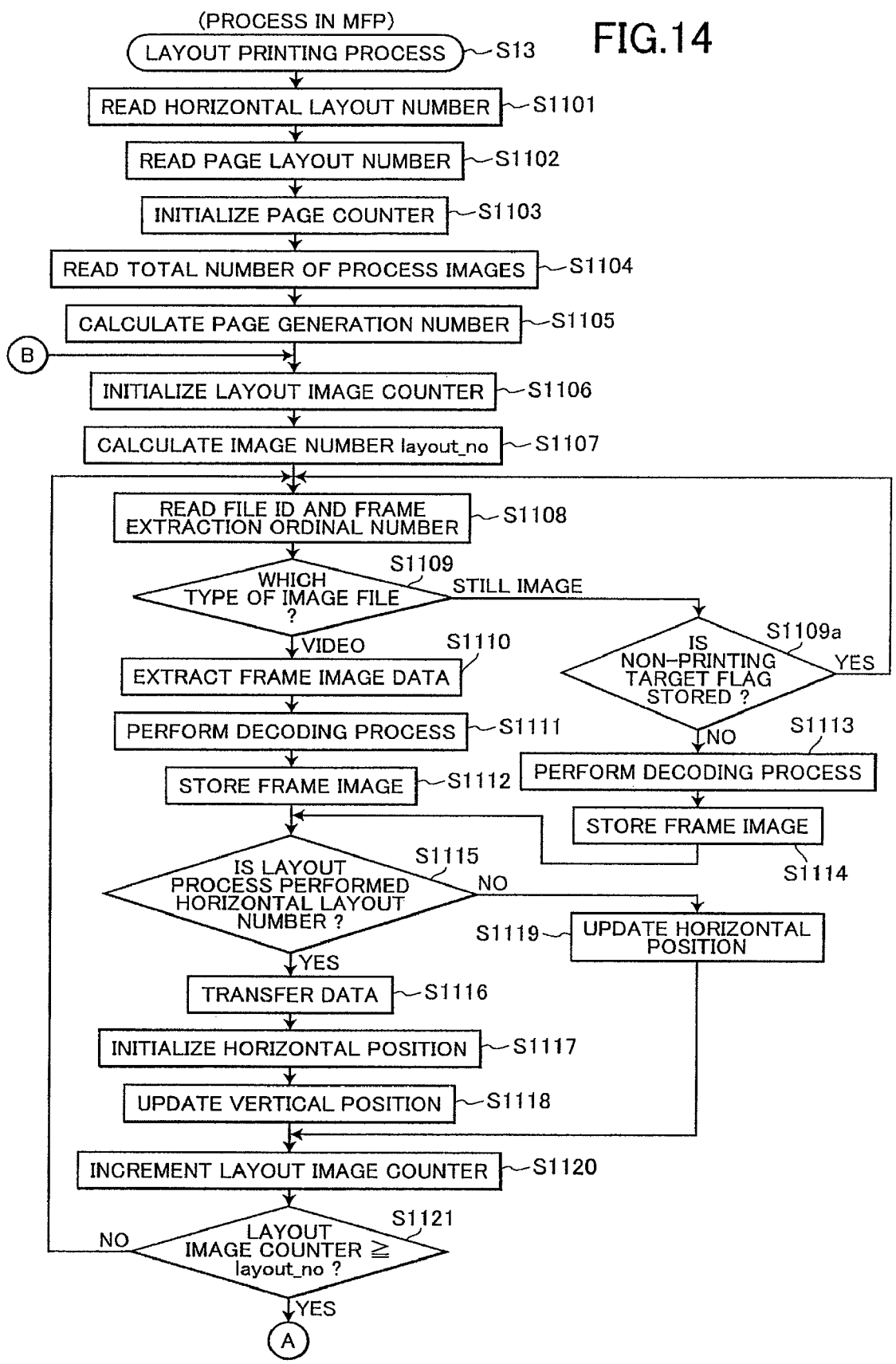
FIG. 14 is a flowchart illustrating a part of steps in a layout printing process.

FIG. 14 is a flowchart illustrating steps in the layout printing process of S13. The layout printing process is performed to print on recording paper the image list 20 having index images 21 laid out in the order set according to the layout data setting process of S12.

In S1101 at the beginning of the layout printing process, the CPU 11 reads the horizontal layout number indicating the number of index images 21 arranged in a row of the image list 20 from the horizontal image layout number storage area 12b. In S1102 the CPU 11 reads the page layout number indicating the number of index images 21 that can be laid out on a single page of the image list 20 from the page image layout number storage area 12c.

In S1103 the CPU 11 initializes the page counter to "1". Further, the CPU 11 initializes a horizontal position indicating the horizontal layout position and a vertical position indicating the vertical layout position. The horizontal position and the vertical position are stored in the layout buffer (RAM 13). In S1104 the CPU 11 reads the total number of process images indicating the total number of still image files and the total number of extracted frame images from the total process image number storage area 13c (see FIG. 2). The page counter is stored in the counter storage area 13m.

In S1105 the CPU 11 calculates a page generation number indicating the number of pages of the image list 20 to print out based on the total number of process images and the page layout number, and stores this page generation number in the page generation number storage area 13d (see FIG. 2).

In the embodiment, the page generation number page_no is calculated according to Equation 1-12 below, where TotalImageNo is the total number of process images and LAYOUT_NUM is the page layout number.

$$\text{page\_no} = [\text{TotalImageNo/LAYOUT\_NUM}] + 1 \quad \text{(Equation 1-12)}$$

In S1106 the CPU 11 initializes a layout image counter to "0" and in S1107 calculates an image number layout_no indicating the number of images to be laid out on one sheet of recording paper. In the embodiment, the image number layout_no is calculated according to Equation 1-13 below. The layout image counter is stored in the counter storage area 13m.

When (page counter)<page generation number, layout_no=(page layout number)

When (page counter)≧page generation number, layout_no=(group image number)−{(page layout number)×(page counter)−1} (Equation 1-13)

Here, "group image number" indicates a total number of frame images and still images that satisfy the image extraction reference. In this case, the group image number is equal to TotalImageNo. In S1108 the CPU 11 reads the file ID and the frame extraction ordinal number corresponding to the layout order from the layout data storage area 13i (FIG. 5). In S1109 the CPU 11 determines whether the image file corresponding to the file ID read in S1108 is a video file or a still image file.

If the CPU 11 determines that the image file is a video file (S1109: video), then in S1110 the CPU 11 extracts frame image data for one frame corresponding to the frame extraction ordinal number from the video file.

In S1111 the CPU 11 performs a decoding process on the extracted frame image data and stores the decoded data storage area 13k. In S1112 the CPU 11 reduces or enlarges the decoded frame image data to the prescribed size for the index image 21 and stores the new frame image data in a prescribed position of a layout buffer (RAM 13).

However, if the CPU 11 determines that the image file is a still image file (S1109: still image), in S1109a the CPU 11 references the adjunctive file data storage area 209 corresponding to the still image file to determine whether a non-printing target flag has been stored therein.

If the CPU 11 determines that a non-printing target flag has not been stored (S1109a: NO), then in S1113 the CPU 11 extracts the still image file identified by the file ID corresponding to the layout order and performs a decoding process on this file and stores the decoded file in the decoded data storage area 13k. In S1114 the CPU 11 reduces or enlarges the decoded still image file to the prescribed size of the index image 21 and lays out the new image file in a prescribed position of the layout buffer.

However, if the CPU 11 determines in S1109a that a non-printing target flag has been stored (S1109a: YES), the CPU 11 returns to S1108 and reads the file ID and frame extraction ordinal number corresponding to the next layout order number. In other words, a still image file to which a non-printing target flag has been assigned is not targeted for extraction and, hence, an index image 21 is not formed for this still image file.

After performing processes to decode either frame image data or a still image file and to layout the decoded data in the layout buffer, in S1115 the CPU 11 determines whether the layout process has been performed a number of times equivalent to the horizontal layout number, which is the upper limit of the number of images that can be laid out in a row. If not (S1115: NO), in S1119 the CPU 11 updates a horizontal position indicating the next layout position for data in the layout buffer.

In S1120 the CPU 11 increments the layout image counter by "1" and in S1121 determines whether the value of the layout image counter is greater than or equal to the image number layout_no of index images 21 to be arranged on the current sheet of recording paper. If not (S1121: NO), the CPU 11 returns to S1108 and processes layout data corresponding to the next layout order number.

When the above layout process has been executed a number of times equivalent to the horizontal layout number (S1115: YES), in S1116 the CPU 11 transfers data from the layout buffer to the printer 3 (see FIG. 2), thereby providing data from the layout buffer for a printing process performed on the printer 3. Here, data is not printed for areas in the layout buffer in which no images are arranged.

In S1117 the CPU 11 initializes the horizontal position indicating the horizontal layout position in the layout buffer for the next data and in S1118 updates the vertical position indicating the vertical layout position in the layout buffer for the next data. Based on the horizontal layout position and the vertical layout position, the CPU 11 sets the layout position for the next data in the layout buffer so that the next index images 21 are arranged in the next row of the image list 20 beginning from the left end thereof. Subsequently, the CPU 11 executes the processes in S1120 and S1121 described above.

By repeatedly performing the above process, the MFP 1 forms index images 21 based on frame image data extracted from video files that corresponds to frame images determined to meet the image extraction reference, and forms index images 21 based on extracted still image files determined to meet the image extraction reference.

After completing a printing process for all index images 21 laid out in the targeted page of recording paper, the CPU 11 determines in S1121 that the layout image counter is greater than or equal to the image number layout_no (S1121: YES) and advances to S1122 in FIG. 15.

Figure 15:
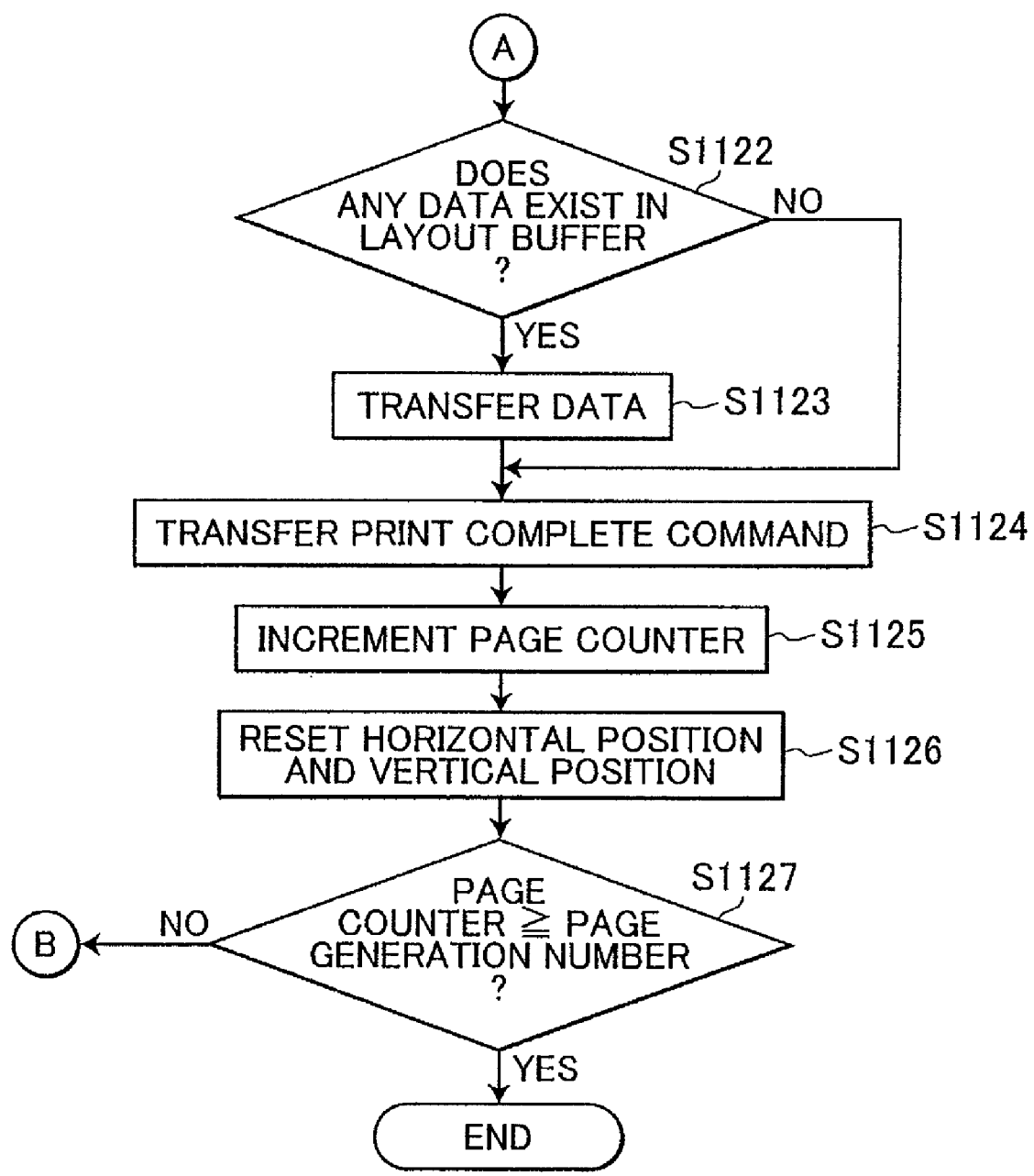
FIG. 15 is a flowchart illustrating remaining steps in the layout printing process of FIG. 14.

FIG. 15 is a flowchart illustrating continuing steps in the layout printing process of FIG. 14. The steps in FIG. 15 are executed after a YES determination is made in S1121 of FIG. 14.

In S1122 of FIG. 15 the CPU 11 determines whether any data exists in the layout buffer that has not yet been printed. If so (S1122: YES), in S1123 the CPU 11 transfers the remaining data to the printer 3 for printing and subsequently advances to S1124. However, if there remains no data to be printed in the layout buffer (S1122: NO), the CPU 11 skips S1123 and advances directly to S1124.

In S1124 the CPU 11 transfers a print complete command to the printer 3 indicating that the output of one page worth of data is complete. In S1125 the CPU 11 increments the page counter by "1". In S1126 the CPU 11 resets the horizontal position and the vertical position indicating the layout position in the layout buffer for the next data. In S1127 the CPU 11 determines whether the value of the page counter is greater than the page generation number. If not (S1127: NO), the CPU 11 returns to S1106 of FIG. 14 and begins processing the next page.

However, if the page counter is greater than the page generation number (S1127: YES), the CPU 11 ends the layout printing process. Through this process, the MFP 1 outputs the image list 20 described with reference to FIG. 3.

In the first embodiment described above, people are detected in images by detecting faces in the image. However, it is possible to detect people by detecting eyes in the faces or body contours.

In the first embodiment described above, video files are classified as portrait images when faces are detected in a prescribed number of frame images. However, the MFP may check all frames in the video and classify the video data based on a special condition met by the majority of frame images.

Further, while the image extraction reference is selected from among two types in the first embodiment, i.e., portrait images and landscape images, the image extraction reference may be selected from among three or more types.

In the first embodiment described above, the MFP determines whether the still image corresponding to the still image file is a portrait image or a landscape image by detecting faces in the still image. However, the MFP may determine whether each still image is a portrait image or a landscape image based on the photography mode included in the header data of the still image file.

The invention is not limited to laying out in the image list 20 only index images for images that meet the image extraction reference. For example, a single index image 21 may be laid out for each still image file and video file, and frame image data meeting the image extraction reference may be further extracted and laid out in the remaining space of the image list 20.

In this way, the user not only can browse all image files, but also can output an image list 20 that emphasizes either portrait images or landscape images.

In the first embodiment described above, the MFP determines whether an image is a portrait image or a landscape image by detecting faces. However, the MFP may extract frame images and count a number of faces detected in each frame image. The MFP sorts the extracted frame images in a descending order with respect to the number of faces. The MFP selects a prescribed number of frame images from a first image files among the sorted frame images, as frame images satisfying the image extraction reference.

In this way, the invention can provide the user with a useful image list 20 when the user wishes to selectively browse frame images having the most number of faces within a video, for example.

The MFP may extract frame image and detect a face in the extracted frame image. Then, the MFP calculates an area of face in the extracted image. The MFP sorts the extracted frame image in a descending order with respect to the area of face. The MFP selects a prescribed number of frame images among the sorted frame images, as frame images satisfying the image extraction reference.

In this way, the invention can provide the user with a useful image list 20 when the user wishes to selectively browse frame images with close-ups of people within a video, for example.

In the first embodiment described above, the MFP determines whether an images meets the image extraction reference based on whether the image includes faces, but the MFP may instead detect colors in each image and determine whether the image meets the image extraction reference based on the detected colors.

For example, the MFP may determine that an image is a landscape image if the color detecting means detects blue or green as the predominant pixel color in the image and may determine that the image is a profile image if the color detecting means detects pixels of flesh tones exceeding a prescribed surface area.

<Second Embodiment>

Next, a multifunction peripheral (MFP) 2001 according to a second embodiment will be described, wherein like parts and components are designated with the same reference numerals to avoid duplicating description.

Figure 16:
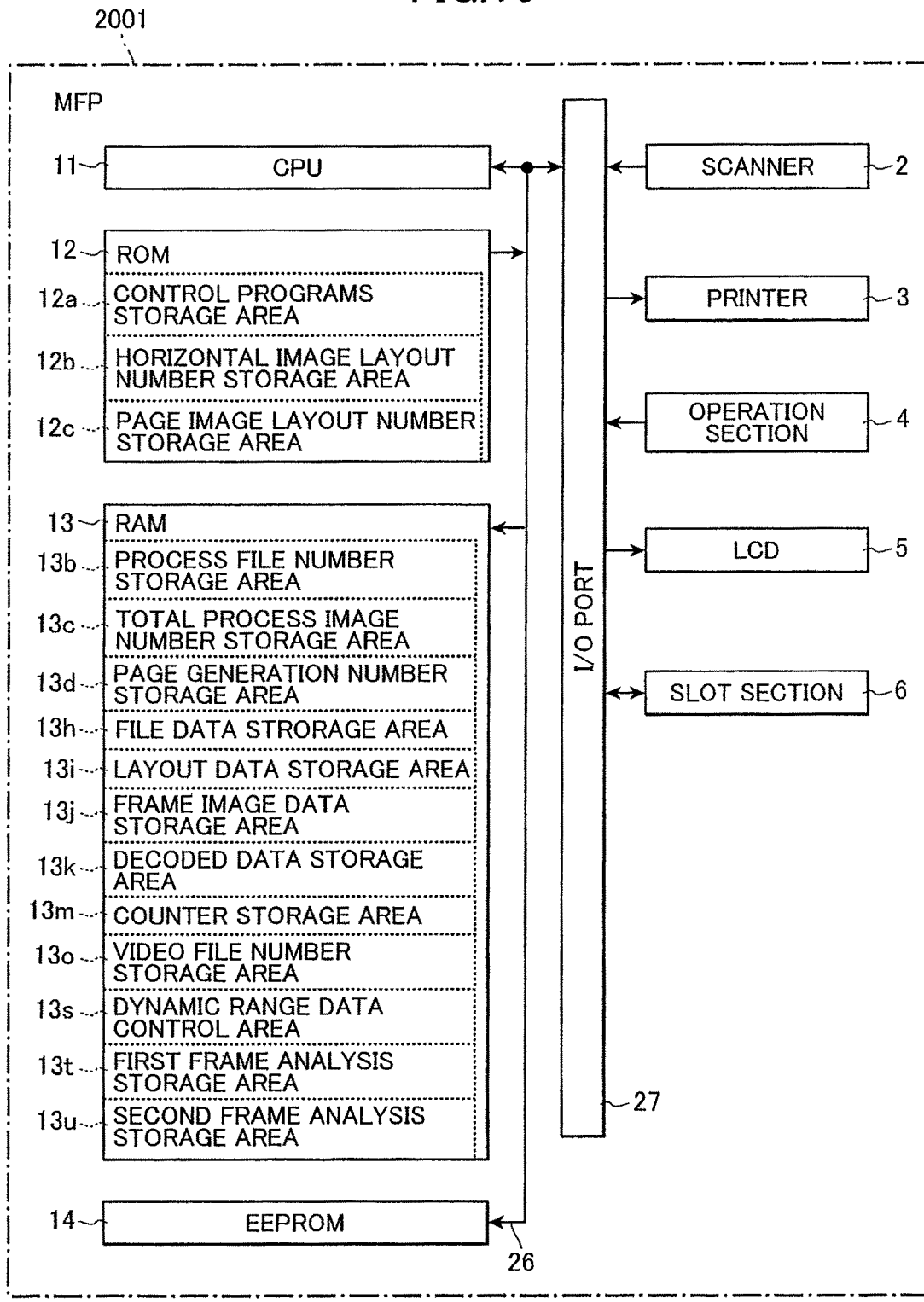
FIG. 16 is a block diagram showing an electrical structure of an MFP according to the second embodiment.

The electrical structure of the MFP 2001 is the same with that of the MFP 1 except the RAM 13. That is, as shown in FIG. 16, the RAM 13 in the MFP 2001 includes the process file number storage area 13b, the total process image number storage area 13c, the page generation number storage area 13d, the file data storage area 13h, the layout data storage area 13i, the frame image data storage area 13j, the decoded data storage area 13k, the counter storage area 13m, a video file number storage area 13o, a dynamic range data control area 13s, a first frame analysis storage area 13t, and a second frame analysis storage area 13u. The RAM 13 in the MFP 2001 does not includes the frame extraction number storage area 13a, the image extraction reference storage area 13n, the frame extraction data storage area 13p, the frame analysis number storage area 13q, and the frame image analysis storage area 13r.

The video file number storage area 13o stores the number of video files on the media card.

Since the dynamic range data control area 13s, first frame analysis storage area 13t, and second frame analysis storage area 13u are used in a modification of the second embodiment described later but need not be used in the MFP 2001 according to the second embodiment, a description of these components will not be given here. The EEPROM 14 is a nonvolatile writable memory.

Figure 17:
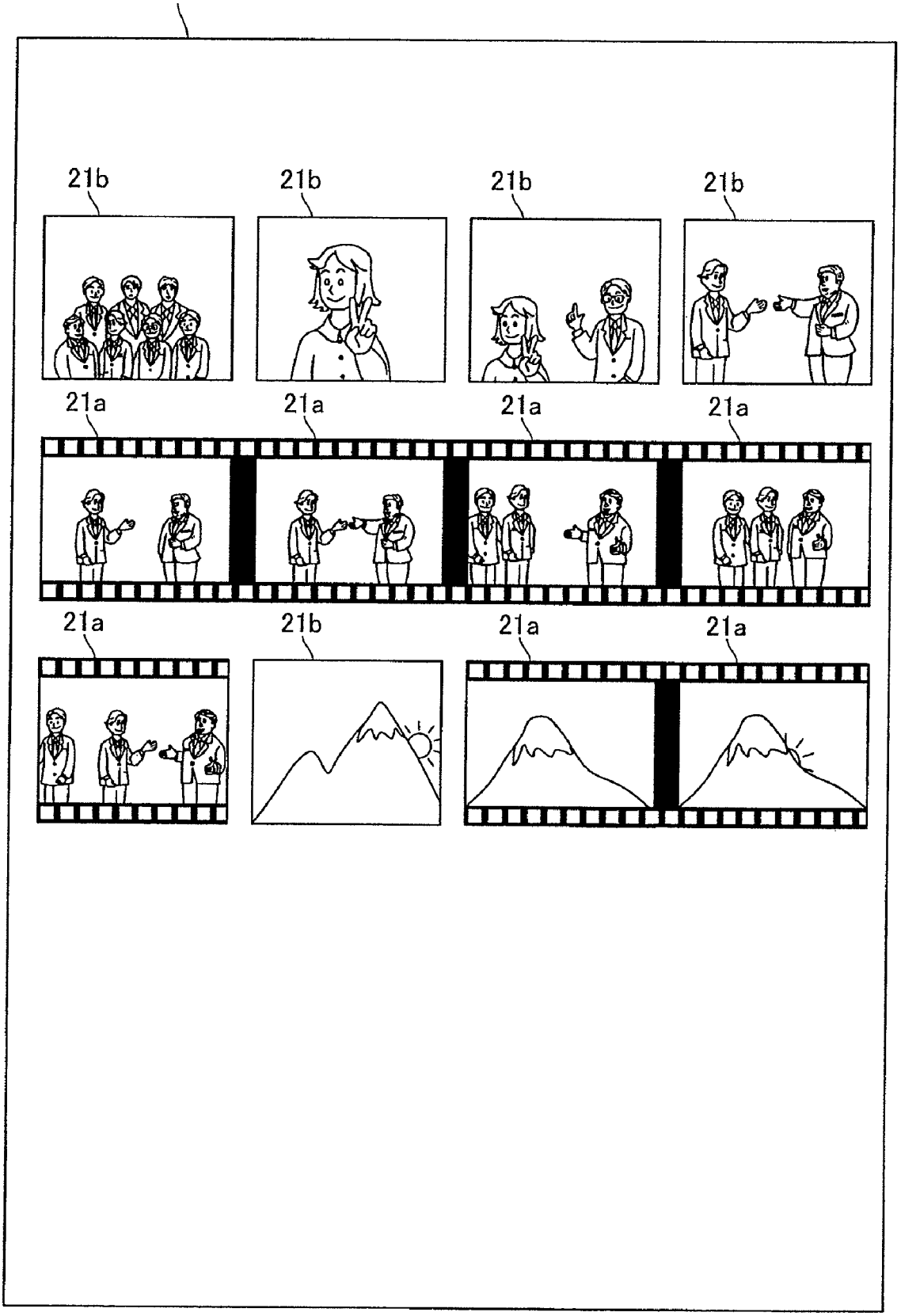
FIG. 17 shows an example of an image list outputted by the MFP according to the second embodiment.

FIG. 17 shows an example of an image list 2020 outputted by the MFP 1 based on the image extraction reference. As shown in FIG. 17, in the second embodiment, the index image 21 is classified into one of a video index image 21a indicating the content of video file and a still image index image 21b indicating the content of still image file, for purpose of explanation. The video index images 21a and the still image index images 21b are laid out in the image list 20.

As will be described later with reference to FIG. 18, the MFP 2001 individually sets the number of frame images to be extracted from a video for each video file stored on the media card.

The MFP 2001 extracts (acquires) frame image data corresponding to frame images of the set number from the respective video files, reduces or enlarges the frame images corresponding to the extracted frame image data to a prescribed size, and lays out the new frame images in the image list 20 as video index images 21a.

Hence, the MFP 2001 can output an image list 20 having a suitable number of video index images 21a for each video laid out therein so as to make browsing more user-friendly.

When still image files for outputting still images are stored on the media card, the MFP 2001 reduces or enlarges the still images corresponding to the still image files to a prescribed size and lays out the images in the image list 20 together with the video index images 21a as still image index images 21b.

Hence, even if the media card stores a combination of still image files and video files, the MFP 2001 can output an image list 20 that makes browsing more user-friendly by visually combining the contents of the still image files and video files.

The MFP 2001 also determines a layout order for each index image in the group of index images 21a and 21b so that the images are arranged in ascending or descending order according to the capture date and time (one example of a creation date) and prints out the image list 20 having the index images 21a and 21b arranged according to this predetermined layout order.

Although FIG. 17 is merely one example of the image list 20, the MFP 2001 determines the layout order of the index images 21a, 21b so that one row of index images 21a and 21b having the most recent capture dates and times are arranged from left-to-right in the image list 20, and thereafter a row of index images 21a and 21b having the next most recent capture dates and times is arranged below the previous row. The MFP 2001 can output a list of images that make browsing more user-friendly by arranging the index images 21a and 21b in order of their capture date and time.

When a plurality of video index images 21a taken from the same video file are arranged adjacent to one another, the MFP 2001 can print out the video index images 21a as a set of linked images resembling a filmstrip, for example, as shown in FIG. 17. In this way, the user can view a collection of video index images 21a derived from the same video file and can distinguish still image index images 21b corresponding to still image files and video index images 21a corresponding to frame image data at a glance. Hence, the MFP 2001 makes browsing more user-friendly.

Figure 18:
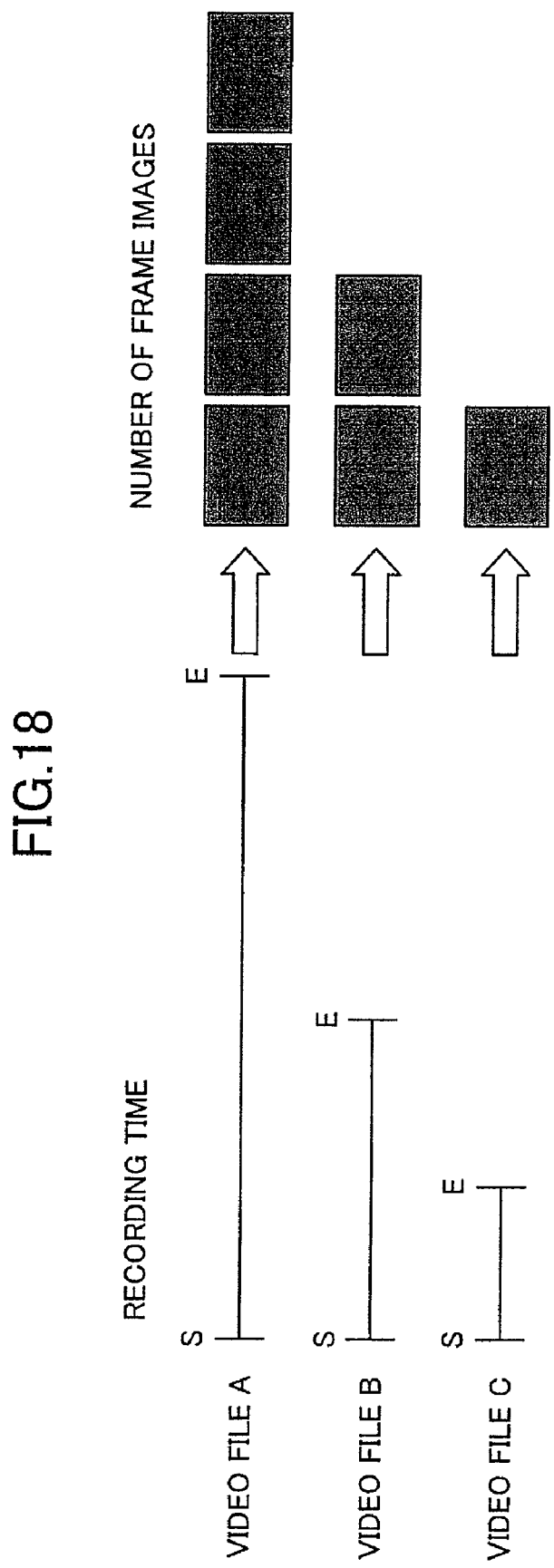
FIG. 18 conceptually illustrates relationships between lengths of recording time and numbers of frame images extracted from a video according to the second embodiment.

FIG. 18 conceptually illustrates relationships between lengths of recording time and numbers of frame images extracted from a video as determined by the MFP 2001 according to the second embodiment.

As shown in FIG. 18, the MFP 2001 sets the number of frame images to be extracted from a video individually for each video file so that a larger number of frame images is extracted the larger the length of recording time (i.e., the time from a recording start S to a recording end E). Specifically, the MFP 2001 sets the number of frame images to be extracted from each video in proportion to the length of recording time, whereby a larger number of frames is extracted from videos having a longer recording time.

In this way, a larger number of video index images 21a are arranged in the image list 20 for video data having a longer recording time. Since it is conceivable that a larger number of scenes have been captured in a video file having a longer recording time, the user can more accurately grasp the content of the video file when the MFP 2001 arranges a larger number of video index images 21a in the image list 20.

Similarly to the first embodiment, a "1" is stored in the frame extraction number storage area 204 when the file is a still image file. In the case of a video file, in the second embodiment, the frame extraction number storage area 204 stores frame image extraction numbers determined in a frame extraction number setting process described later with reference to FIG. 21.

In the second embodiment, the adjunctive file data storage area 209 stores additional unique data for each image file. The adjunctive file data storage area 209 stores recording length data indicating the length of recording time for a video file. Values in the adjunctive file data storage area 209 shown in FIG. 4 are in units of seconds. The value "1" is stored in the adjunctive file data storage area 209 for all still image files.

Figure 19:
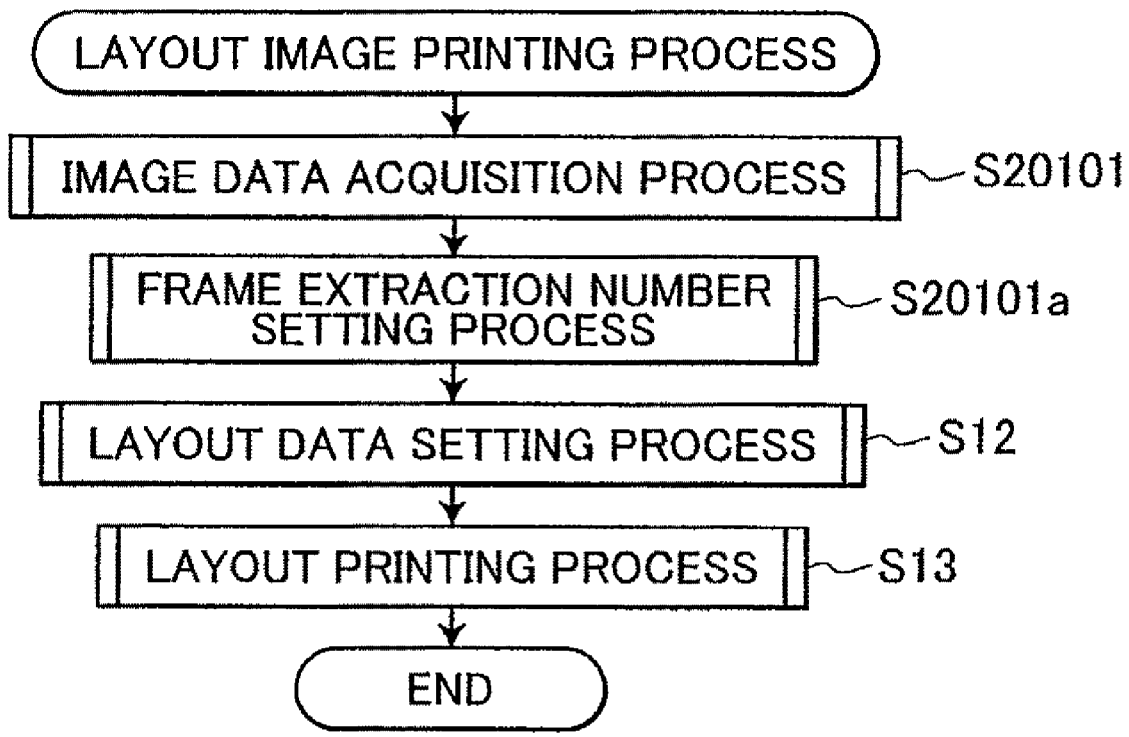
FIG. 19 is a flowchart illustrating steps in a layout image printing process according to the second embodiment.

FIG. 19 is a flowchart illustrating steps in a layout image printing process executed on the MFP 2001. The MFP 2001 executes the layout image printing process when the user inputs a command to begin printing the image list 20.

In S20101 at the beginning of the layout image printing process shown in FIG. 19, the CPU 11 executes an image data acquisition process for creating file data records 200 and storing the file data records 200 in the file data storage area 13h (see FIG. 4). The image data acquisition process of S20101 will be described later with reference to FIG. 20.

In S20101a the CPU 11 executes a frame extraction number setting process for setting the number of frame images to be extracted from each video. The frame extraction number setting process will be described later with reference to FIG. 21.

Subsequently in S12 the CPU 11 executes a layout data setting process and in S13 the CPU 11 executes a layout printing process. The layout data setting process S12 and the layout printing process in S13 in the second embodiment are the same with the layout data setting process and the layout printing process of the first embodiment. Thus, the detailed explanations are omitted here.

Figure 20:
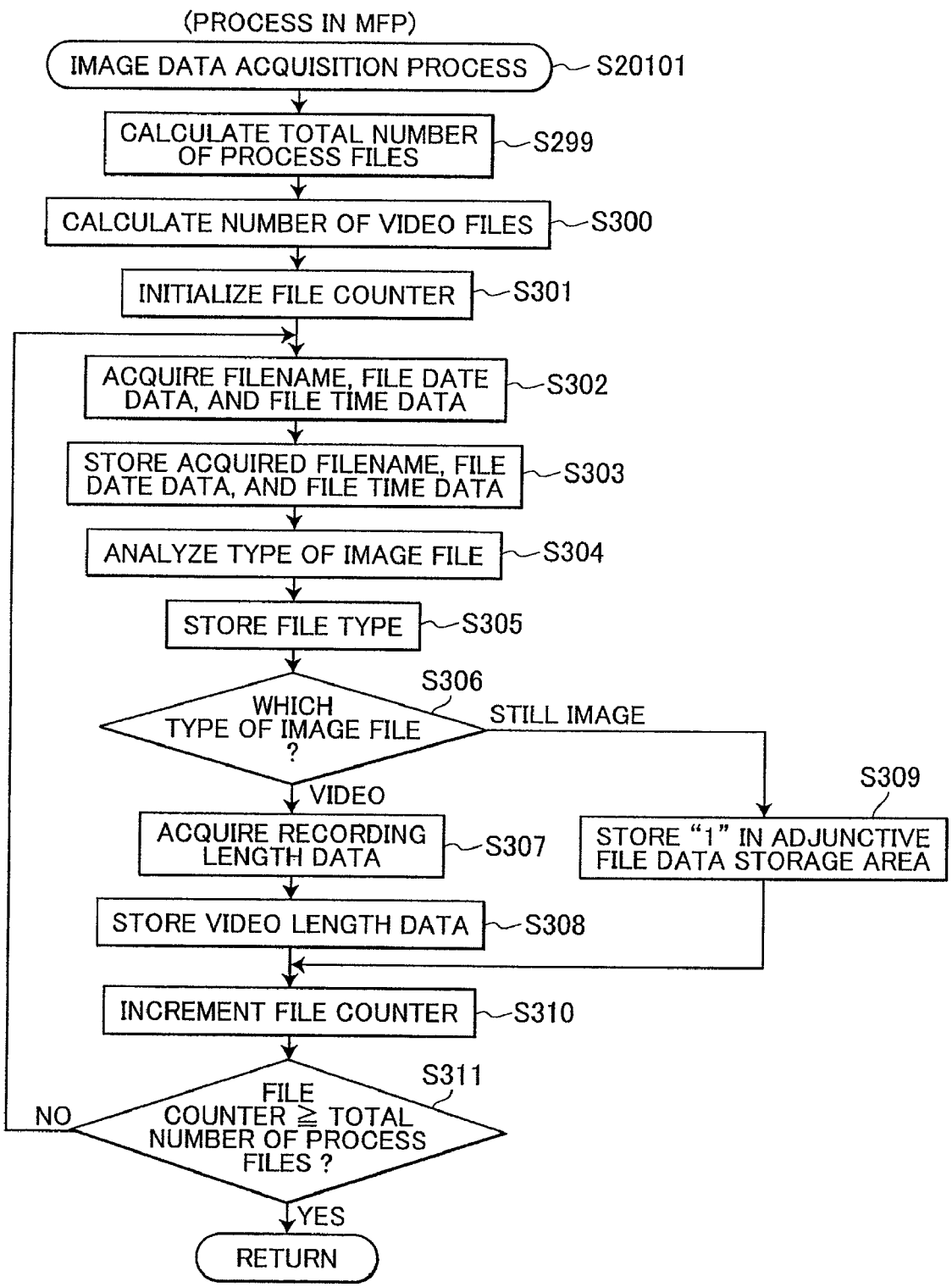
FIG. 20 is a flowchart illustrating steps in an image data acquisition process according to the second embodiment.

FIG. 20 is a flowchart illustrating steps in the image data acquisition process of S20101. In the image data acquisition process of the second embodiment, steps S299, S301-S305, S310, and, S311 are the same with steps S299, S301-S305, S310, and, S311 in the image data acquisition process of the first embodiment. Thus, the detailed explanation for steps S299, S301-S305, S310, and, S311 are omitted here.

In S300 the CPU 11 calculates the number of video files stored on the media card and stores this number in the video file number storage area 13o.

In S306 the CPU 11 determines whether the selected image file is a video file or a still image file based on the file type acquired in S304.

If the CPU 11 determines that the file type is a video file (S306: video), in S307 the CPU 11 acquires the recording length data indicating the length of recording time for the video file. In the embodiment, the recording length data is acquired from header data in the video file. However, the recording length data may be acquired by other means, such as by dividing the total frame number included in header data of the video file by the fps data. In this case, the CPU 11 reads the total frame number and the fps data before executing S307.

In S308 the CPU 11 stores the acquired video (recording) length data in the adjunctive file data storage area 209 shown in FIG. 4 in association with the file ID equivalent to the file counter.

However, if the CPU 11 determines in S306 that the file type is a still image file (S306: still image), in S309 the CPU 11 stores a "1" in the adjunctive file data storage area 209.

After completing one of the processes in S308 or S309 described above, in S310 the CPU 11 increments the file counter by "1" and in S311 determines whether the file counter exceeds the total number of process files.

Figure 21:
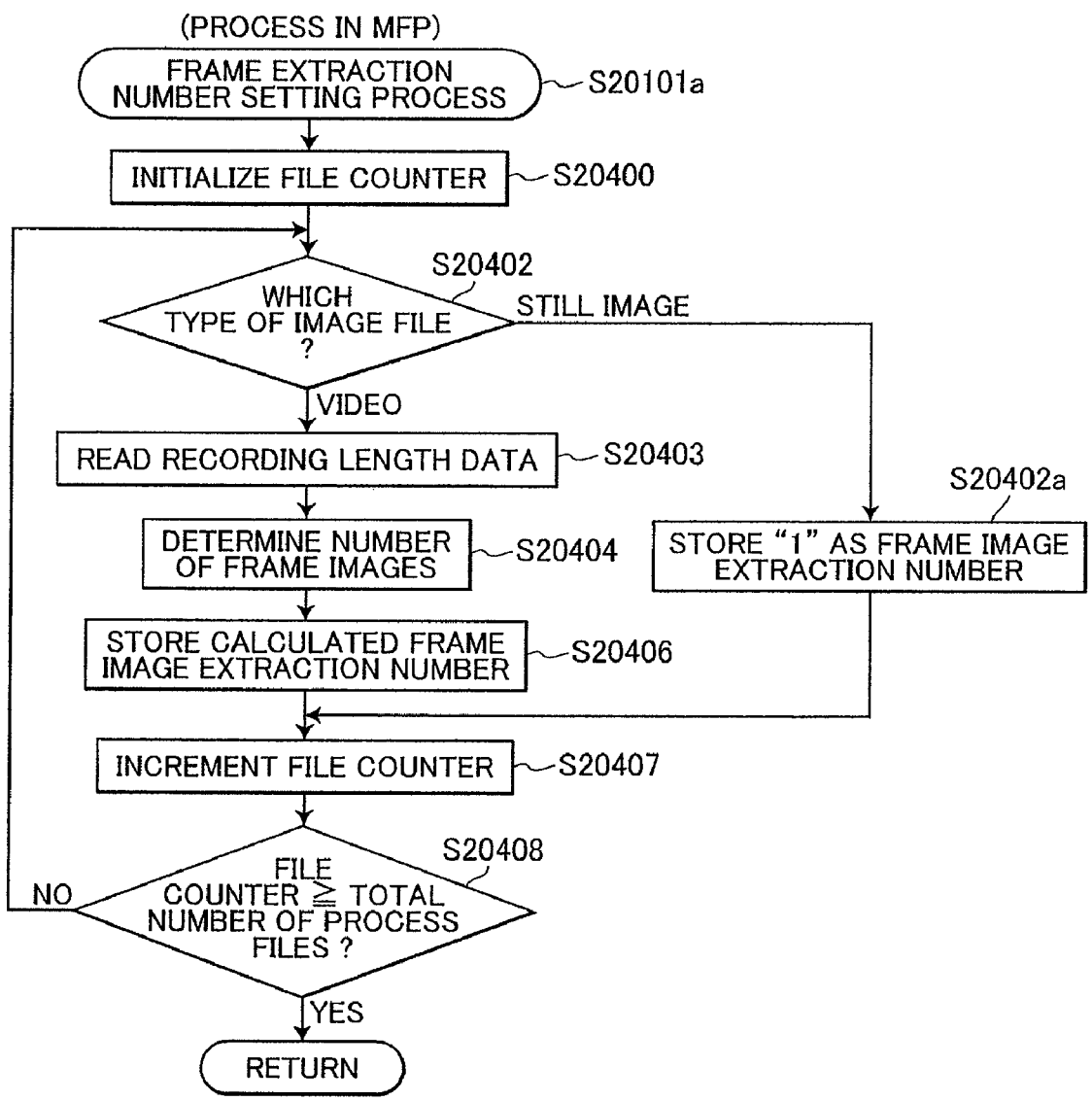
FIG. 21 is a flowchart illustrating steps in a frame extraction number setting process.

FIG. 21 is a flowchart illustrating steps in the frame extraction number setting process of S20101a. The frame extraction number setting process is performed to set the number of frame images to be extracted from a video for each video file stored on the media card.

In S20400 at the beginning of the process in FIG. 21, the CPU 11 initializes the file counter to "0". In S20402 the CPU 11 references the file type storage area 203 associated with the file ID equivalent to the file counter to determine whether the file type is a video or still image.

If the file type is determined to be a still image (S20402: still image), in S20402a the CPU 11 stores a "1" as the frame image extraction number in the frame extraction number storage area 204 shown in FIG. 4 in association with the file ID equivalent to the file counter and in S20407 increments the file counter by "1". In S20408 the CPU 11 determines whether the file counter is greater than or equal to the total number of process files. If not (S20408: NO), the CPU 11 returns to S20402 and repeats the process described above.

However, if the CPU 11 determines in S20402 that the file type is a video file (S20402: video), in 520403 the CPU 11 reads the recording length data for the targeted video file from the adjunctive file data storage area 209 shown in FIG. 4. In S20404 the CPU 11 determines a number of frame images to be extracted (frame image extraction number) by dividing the recording length data by a predetermined unit of time. The frame image extraction number is set to an integer of 1 or greater through this calculation. The unit of time may be a value that the user inputs via the operating section 4.

The specific method of calculating the frame image extraction number is not limited to the example given above, but may be a different method. For example, the frame image extraction number may be calculated according to Equation 2-4 below using an "average recording time" that is an average of the recording length data for all video files, and a prescribed reference extraction number.

$$\text{Frame image extraction number} = (\text{recording length data}/\text{average recording time}) \times \text{reference extraction number} \quad \text{(Equation 2-4)}$$

In S20406 the CPU 11 stores the calculated frame image extraction number in the frame extraction number storage area 204 shown in FIG. 4 in association with the file ID equivalent to the file counter.

In S20407 the CPU 11 increments the file counter by "1" and repeats the process from S20402 while the file counter remains less than the total number of process files (S20408: NO). When the CPU 11 determines in S20408 that the file counter is greater than or equal to the total number of process files after repeatedly performing the above process (S20408: YES), the CPU 11 ends the frame extraction number setting process.

Through the process described above, the MFP 2001 sets a suitable frame image extraction number for each video file.

In the layout printing process of S13, the MFP 2001 may also form the filmstrip design linking video index images 21a, as shown in FIG. 17, when printing video index images 21a derived from the same video file and arranged adjacent to one another in the image list 20, but a detailed description of this process will not be given here.

The MFP 2001 according to the second embodiment described above can thus output an image list 20 that facilitates browsing for the user, as described with reference to FIG. 17.

<First Modification of Second Embodiment>

Next, the MFP 2001 according to a first modification of the second embodiment will be described. Since the external structure and electrical configuration of the MFP 2001 according to the first modification of the second embodiment is identical to the MFP 2001 according to the second embodiment, only differences in the frame extraction number setting process performed on the MFP 2001 according to the second embodiment will be described.

Figure 22:
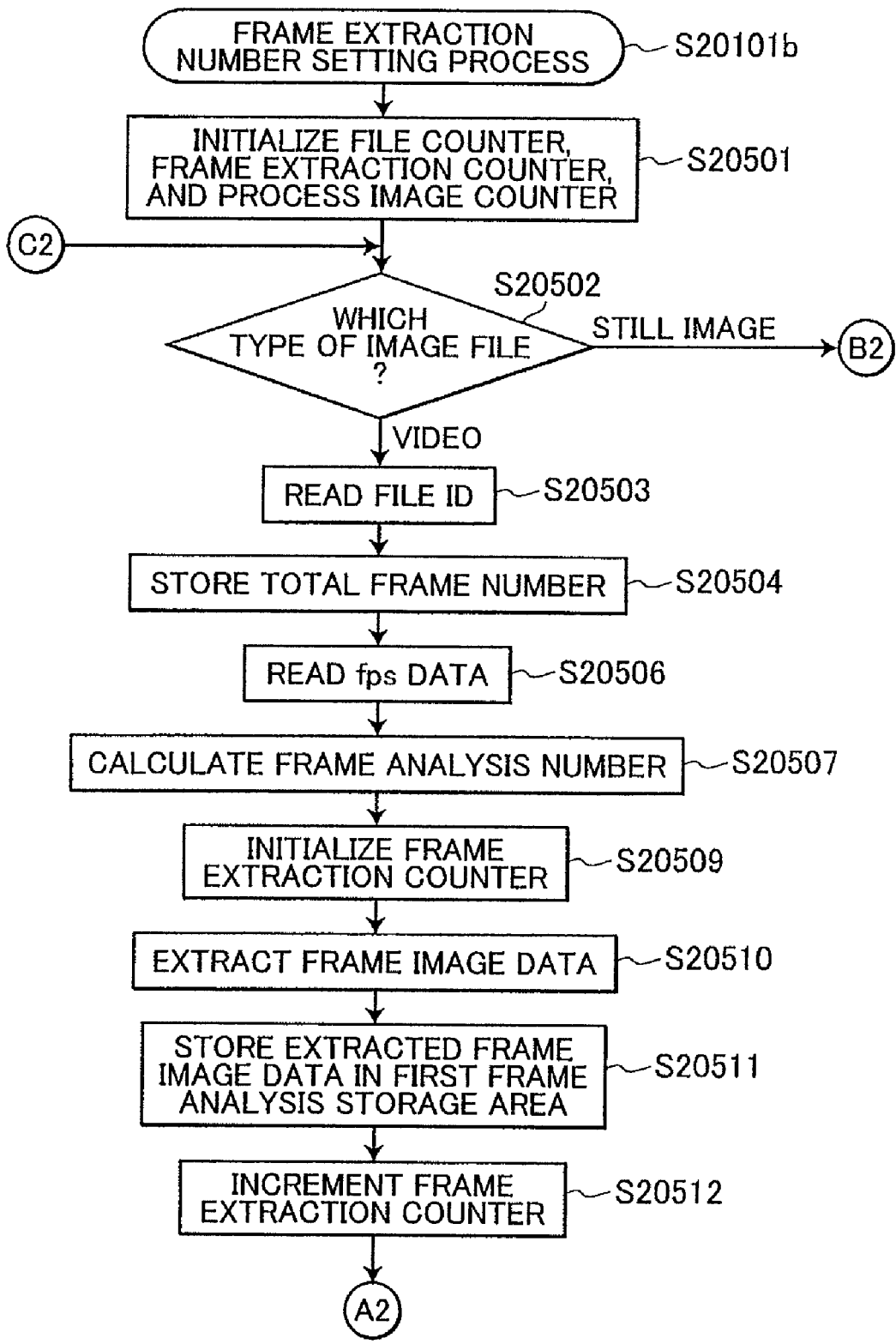
FIG. 22 is a flowchart illustrating a part of steps in a frame extraction number setting process according to a first modification of the second embodiment.
Figure 23:
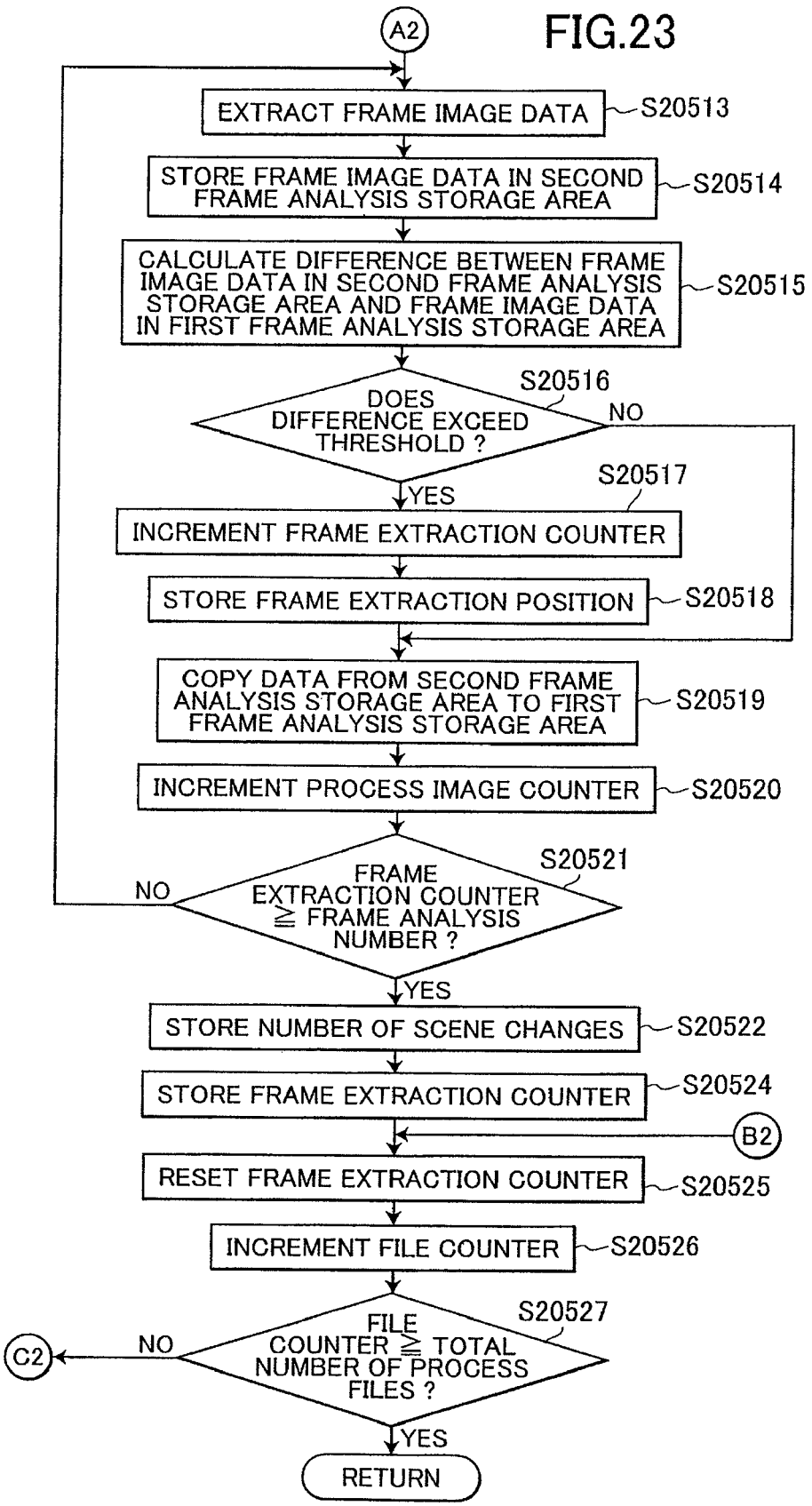
FIG. 23 is a flowchart illustrating a remaining part of steps in the frame extraction number setting process shown in FIG. 22.

FIGS. 22 and 23 are flowcharts illustrating steps in the frame extraction number setting process of S20101b executed by the MFP 2001 according to the first modification of the second embodiment. The frame extraction number setting process of S20101b is executed in place of the frame extraction number setting process of S20101a described in the second embodiment.

The frame extraction number setting process according to the first modification of the second embodiment is performed to set a frame image extraction number for each video file so that the number of frame images to be extracted from a video increases as the number of scene changes in the video increases.

In S20501 of the frame extraction number setting process, the CPU 11 initializes the file counter, the frame extraction counter, and the process image counter to "0".

In S20502 the CPU 11 references the file type storage area 203 shown in FIG. 4 associated with the file ID equivalent to the file counter to determine whether the file type is a video file or a still image file. If the CPU 11 determines that the file type is a still image file (S20502: still image), the CPU 11 advances to S20525 shown in FIG. 23.

However, if the CPU 11 determines that the file type is a video file (S20502: video), in S20503 the CPU 11 reads the file ID from the file ID storage area 201 equivalent to the file counter. In S20504 the CPU 11 reads the total frame number from the video file associated with this file ID and stores the total frame number in the total frame number storage area 205 in association with the file ID.

In S20506 the CPU 11 reads fps data associated with the file counter from the fps data storage area 206 and calculates a frame extraction interval based on this fps data. The frame extraction interval may be calculated according to Equation 2-15 below, for example.

Frame extraction interval=(fps data/interval coefficient) (Equation 2-15)

The interval coefficient in Equation 2-15 may be a predetermined constant or may be a value set by the user via the operating section 4.

In S20507 the CPU 11 calculates a frame analysis number from the total frame number and the frame extraction interval. The frame analysis number may be calculated according to Equation 2-16 below, for example.

Frame analysis number=[total frame number/frame extraction interval] (Equation 2-16)

In S20509 the CPU 11 initializes the frame extraction counter to "0". In S20510 the CPU 11 sets a frame extraction position to the value obtained by multiplying the frame extraction interval by the frame extraction counter and extracts frame image data identified by this frame extraction position.

In S20511 the CPU 11 stores the extracted frame image data in the first frame analysis storage area 13t shown in FIG. 16. In S20512 the CPU 11 increments the frame extraction counter by "1" and advances to S20515 shown in FIG. 23.

FIG. 23 is a continuation of the second half of the frame extraction number setting process of S20101b. In S20513 the CPU 11 sets the frame extraction position to a value obtained by multiplying the frame extraction interval by the frame extraction counter and extracts the frame image data identified by this frame extraction position.

In S20514 the CPU 11 stores the frame image data extracted in S20513 in the second frame analysis storage area 13u shown in FIG. 16. In S20515 the CPU 11 calculates the difference between the frame image data stored in the second frame analysis storage area 13u and the frame image data stored in the first frame analysis storage area 13t.

Specifically, the CPU 11 calculates the difference between pixel values for each pixel of the frame image data and sets the total difference for all pixels as the difference between the two sets of frame image data. However, in the interest of improving processing speed, the CPU 11 may also calculate the pixel value difference for only a predetermined number of points and may set the difference between the two sets of frame image data to this total difference.

In S20516 the CPU 11 determines whether the calculated difference exceeds a threshold. The threshold, for example, is a predetermined constant for detecting whether the scene of the image changes between the previously extracted frame image data and the currently extracted frame image data, but may also be a value inputted by the user via the operating section 4.

If the calculated difference is less than the threshold (S20516: NO), the CPU 11 jumps to S20519. However, if the calculated difference exceeds the threshold (S20516: YES), indicating that a scene change has been detected in the video, in S20517 the CPU 11 increments the frame extraction counter by "1".

In S20518 the CPU 11 then stores the frame extraction position calculated in S20513 in the frame extraction position storage area 303 shown in FIG. 5 corresponding to the layout order number equivalent to the process image counter, and stores the frame extraction counter at the current point in time in the frame extraction ordinal number storage area 304.

In S20519 the CPU 11 copies the data from the second frame analysis storage area 13u to the first frame analysis storage area 13t and in S20520 increments the process image counter by "1".

In S20521 the CPU 11 determines whether the frame extraction counter is greater than or equal to the frame analysis number. If not (S20521: NO), the CPU 11 returns to S20513 and repeats the process described above.

Hence, by repeating S20513-20521, the CPU 11 stores a frame extraction position in the frame extraction position storage area 303 so that the frame image data can be extracted in the layout printing process executed later when the difference in pixel values from the previously extracted frame image data exceeds the threshold.

As a result, if a video targeted for processing includes a plurality of scenes, the MFP 2001 can set frame extraction positions so that at least one frame image is extracted from each scene in the video file and laid out in the image list 20 as a video index image 21a.

If the CPU 11 determines in S20521 that the file counter is greater than or equal to the frame analysis number (S20521: YES), in S20522 the CPU 11 stores the number of scene changes in the adjunctive file data storage area 209 shown in FIG. 4 in association with the file counter. Here, in this example, the number of scene changes is equivalent the current value of the frame extraction counter.

In S20524 the CPU 11 sets the current value of the frame extraction counter as the number of frame images to be extracted from the targeted video and stores this number in the frame extraction number storage area 204 corresponding to the file ID equivalent to the file counter. In S20525 the CPU 11 resets the frame extraction counter to "0" and in S20526 increments the file counter by "1".

In S20527 the CPU 11 determines whether the file counter is greater than or equal to the total number of process files. If not (S20527: NO), the CPU 11 returns to S20502 and repeats the process described above.

When the CPU 11 eventually determines in S20527 that the file counter is greater than or equal to the total number of process files after repeatedly performing the above process (S20527:YES), the CPU 11 ends the frame extraction number setting process of S20101b.

As with the MFP 2001 described in the first modification of the second embodiment, in the subsequently executed layout printing process of S20103, the MFP 2001, according to the first modification of the second embodiment, extracts frame image data corresponding to the number of frame images set in the frame extraction number setting process and outputs this frame image data as video index images 21a.

Hence, according to the first modification of the second embodiment, the MFP 2001 lays out a larger number of video index images 21a in the image list 20 for video files having a greater number of scene changes. In so doing, the MFP 2001 can facilitate the user in accurately understanding the content of the video files.

Further, since the MFP 2001 can layout at least one video index image 21a in the image list 20 for each scene of a video when the video has a plurality of scenes, the user can get a more accurate understanding of each scene recorded in a video file.

<Second Modification of Second Embodiment>

Next, the MFP 2001 according to a second modification of the second embodiment will be described. Since the external structure and the electrical configuration of the MFP 2001 according to the second modification of the second embodiment is identical to the MFP 2001 according to the second embodiment, only differences in the frame extraction number setting process executed on the MFP 2001 according to the second modification of the second embodiment will be described.

Figure 24:
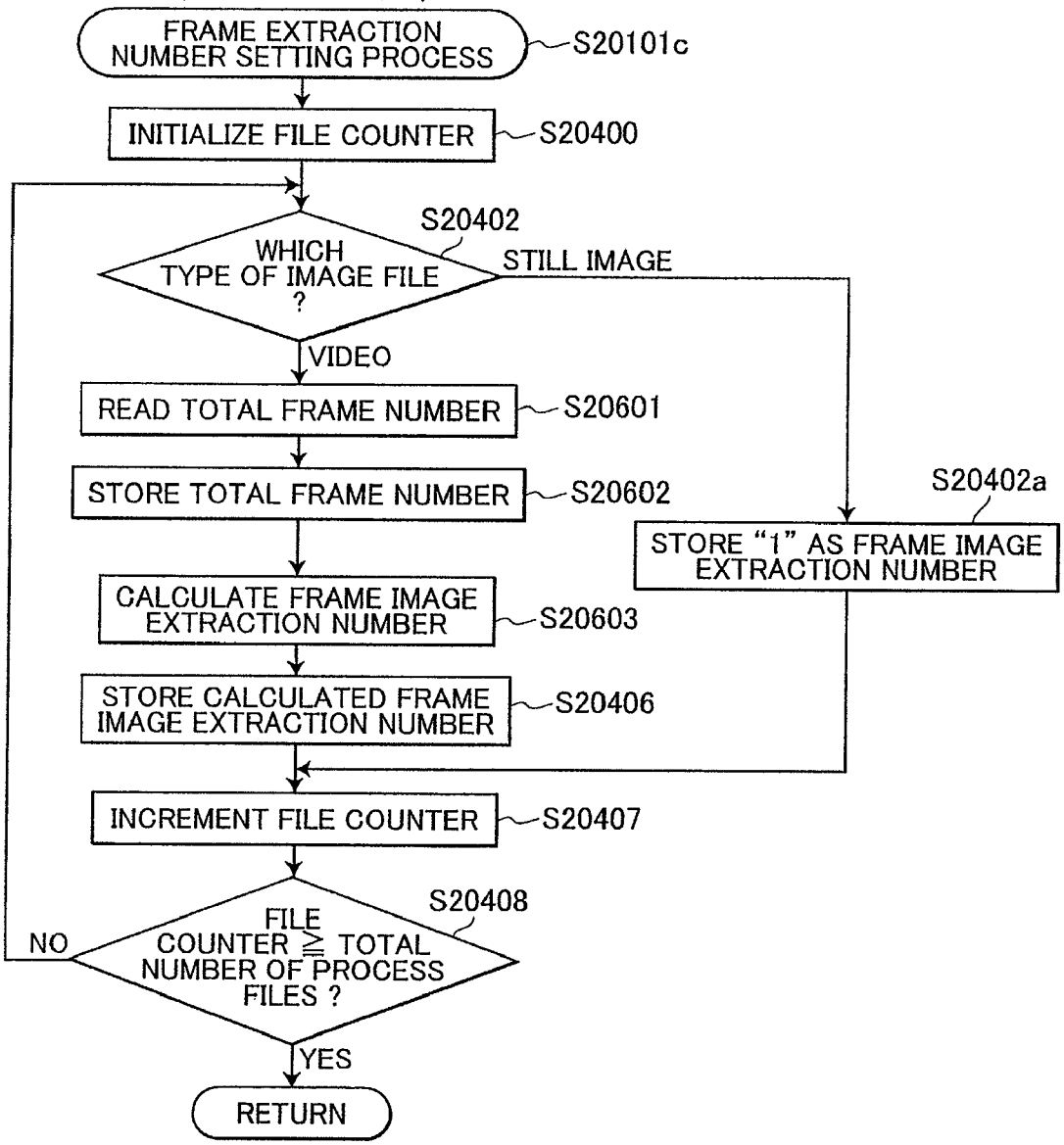
FIG. 24 is a flowchart illustrating steps in a frame extraction number setting process according to a second modification of the second embodiment.

FIG. 24 is a flowchart illustrating steps in the frame extraction number setting process of S20101c executed on the MFP 2001 according to the second modification of the second embodiment. The frame extraction number setting process of S20101c is executed in place of the process of S20101a described in the second embodiment, differing from the second embodiment only in that steps S20601-S20603 are performed in place of steps S20403 and S20404. Since the remaining steps are identical, the same step numbers have been used to avoid duplicating description.

In S20601 of the frame extraction number setting process of S20101c according to the second modification of the second embodiment, the CPU 11 reads the total frame number in the targeted video file and in S20602 stores this number in the total frame number storage area 205 shown in FIG. 4. In S20603 the CPU 11 calculates the frame image extraction number from the total frame number using either Equation 2-A or Equation 2-B below, for example.

Frame image extraction number=total frame number/
unit frame number (Equation 2-A)

Here, the unit frame number may be a predetermined value or a value inputted by the user via the operating section 4.

Frame image extraction number=(total frame number/
average total frame number)×reference extraction
number (Equation 2-B)

Here, the average total frame number is the average of total frame numbers for all video files. The reference extraction number may be a predetermined value or a value inputted by the user via the operating section 4.

According to the second modification of the second embodiment, the MFP 2001 sets a larger frame image extraction number for video files corresponding to videos including a larger number of frame images, thereby laying out a larger number of video index images 21a in the image list 20. This is done because it is conceivable that a larger number of scenes are included in videos configured of a larger number of frame images. Hence, arranging a larger number of video index images 21a in the image list 20 can facilitate the user in more accurately understanding the content of the video file.

<Other Modifications of Second Embodiment>

As a variation to the frame extraction number setting process (S20101a, S20101b, S20101c) described above, the MFP 2001 may be configured to set the frame image extraction number based on the number of still image index images 21b arranged in the image list 20, for example.

In the frame extraction number setting process of S20101a described in the second embodiment, for example, the MFP 2001 would first calculate the number of still image files stored on the media card. If the calculated number is "10" (i.e., ten still image index images 21b are to be laid out in the image list 20), for example, the MFP 2001 would set a maximum extraction number for the video having the longest recording time to ten frames (same frames as the calculated number) or twenty frames (twice the calculated number), for example, based on this number of still image index images 21b.

For video files having a shorter recording time than the video having the longest recording time, the MFP 2001 would set the frame image extraction number to a value obtained by multiplying the maximum extraction number calculated above by the ratio of the recording time of the shorter video file to the maximum recording time. In this way, the MFP 2001 can set a frame image extraction number based on the number of still image index images 21b.

Maximum extraction numbers for videos may be prestored in a table in association with numbers of still image index images 21b or may be set equivalent to the number of still image index images 21b. Alternatively, the maximum extraction number may be derived from a specific equation employing the number of still image index images 21b.

The following is another example of a modification that could be used to set the frame image extraction number based on the number of still image index images 21b. In this variation, the MFP 2001 calculates the frame image extraction number by substituting the number of still image index images 21b for the reference extraction number in Equation 2-A or Equation 2-B given above. In this way, the MFP 2001 can set the frame image extraction number based on the number of still image index images 21b (i.e., the frame image extraction number has a specific relationship to the number of still image index images 21b).

With this modification, the MFP 2001 can provide the user with an image list 20 that facilitates browsing since the frame image extraction number is set based on the number of still image index images 21b. For example, if one each of a still image file and a video file is stored in a storage medium and a hundred frames is extracted from the video file, the still image index image 21b would get lost among the one hundred video index images 21a. If the image list 20 were printed in this case, the user would have greater difficulty finding where the still image index image 21b was printed, making it difficult to confirm what the still image looks like. By studying the number of still images equivalent to the reference extraction number for frames in this modification, for example, it is possible to maintain a balance between the number of still images and the number of frame images so as to reduce confusion.

Further, the MFP 2001 may be configured to set a frame image extraction number based on a condition other than that described in the embodiments. For example, the MFP may include voice analyzing means for analyzing voice data included in video data, and detecting means for detecting the number of times or duration in which the voice level exceeds a threshold based on analysis by the voice analyzing means. In this case, the MFP 2001 may set the number of frame images to be extracted from a video to be larger when the number or duration of detections by the detecting means is larger. Further, the MFP may set the frame extraction position to a position corresponding to the scene in which voice is recorded at a high volume.

Alternatively, the MFP may be configured to detect the number of times or duration in which voice is detected only at a prescribed frequency.

<Third Embodiment>

Next, a multifunction peripheral (MFP) 3001 according to a second embodiment will be described, wherein like parts and components are designated with the same reference numerals to avoid duplicating description.

The MFP 3001 prints an image list having index images arranged so that the user can view the content of image files stored on a media card mounted in the slot section 6. In particular, the MFP 3001 according to the third embodiment ensures that the image list does not exceed a predetermined upper limit on the number of pages when printed. This aspect of the MFP 3001 will be described later in greater detail.

Figure 26:
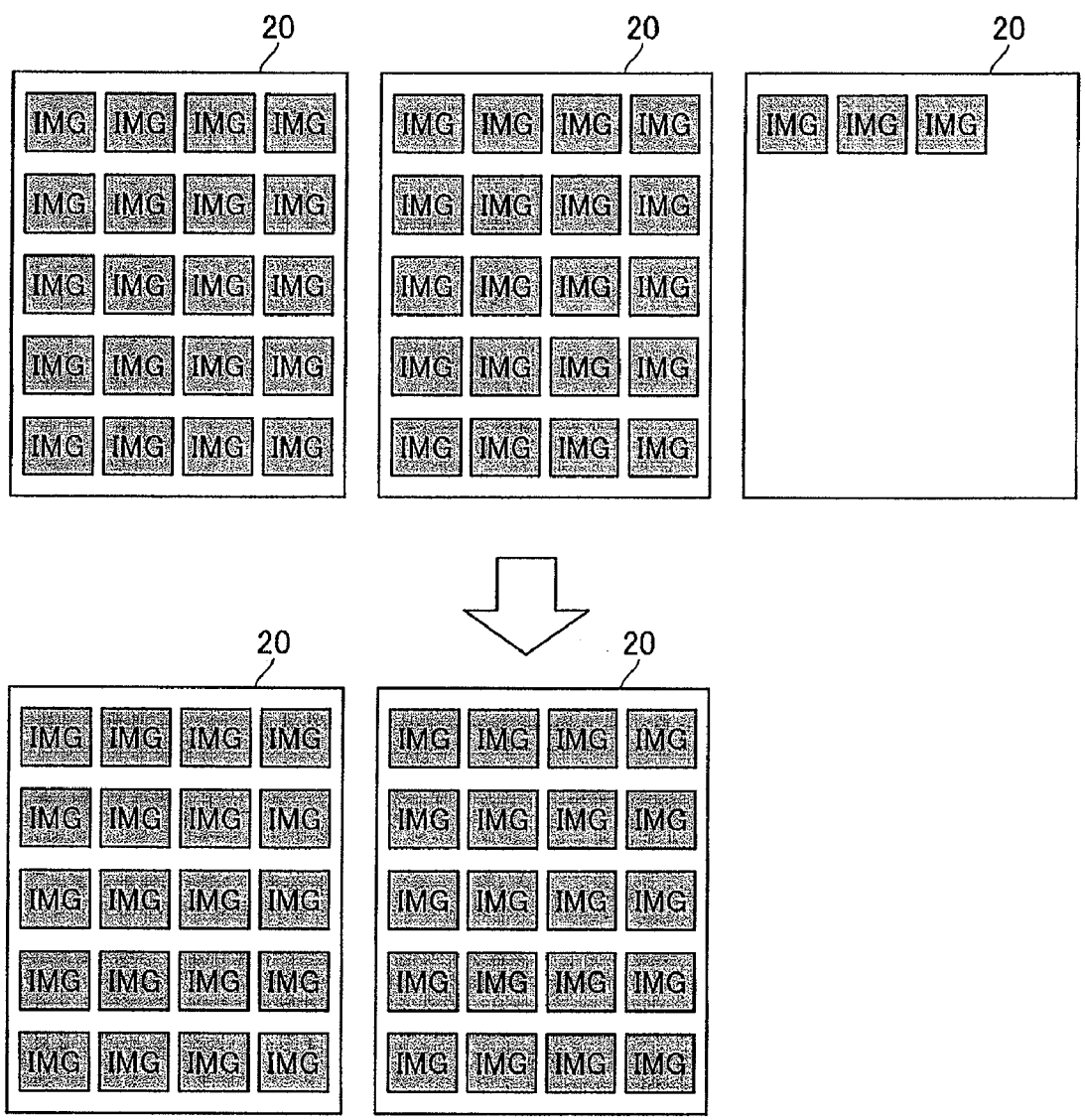
FIG. 26 conceptually illustrates a process executed by the MFP according to the third embodiment.

The electrical structure of the MFP 3001 is the same with that of the MFP 1 except the RAM 13. That is, as shown in FIG. 26, the RAM 13 is provided with the frame extraction number storage area 13a, the process file number storage area 13$b$, the total process image number storage area 13$c$, the page generation number storage area 13$d$, the file data storage area 13$h$, the layout data storage area 13$i$, the frame image data storage area 13$j$, the decoded data storage area 13$k$, the counter storage area 13$m$, a maximum printing page number storage area 13$v$, a video file number storage area 13$w$, a total frame extraction number storage area 13$x$, a capture interval storage area 13$y$, and a dynamic range data storage area 13$z$. The RAM 13 in the MFP 3001 does not includes the image extraction reference storage area 13$n$, the frame extraction data storage area 13$p$, the frame analysis number storage area 13$q$, and the frame image analysis storage area 13$r$. Here, the dynamic range data storage area 13$z$ is not used in the third embodiment, but is used in a modification of the third embodiment. Thus, the RAM 13 may not include the dynamic range data storage area 13$z$ in the third embodiment.

As the first embodiment, the frame extraction number storage area 13$a$ stores a frame image extraction number. The MFP 3001 according to the third embodiment sets the frame image extraction number for each video file based on the recording length of the video file. This process is described later with reference to FIG. 33.

The maximum printing page number storage area 13$v$ stores a predetermined maximum printing page number determined prior to printing the image list. In the third embodiment, the maximum printing page number is an arbitrary value inputted by the user via the operating section 4 and stored in the maximum printing page-number storage area 13$v$.

The video file number storage area 13$w$ stores the number of video files included on the media card.

The total frame extraction number storage area 13$x$ stores the total number of frame images to be extracted for each video file.

The capture interval storage area 13$y$ stores differences in capture dates and times among still image files. The capture interval storage area 13$y$ will be described later in greater detail with reference to FIG. 29.

FIG. 26 conceptually illustrates the process executed on the MFP 3001 according to the third embodiment. In this example, the total number of pages for the image list 20 is set to an upper limit of "2". As shown in FIG. 26, the MFP 3001 executes a process to adjust the number of index images in the image list 20 so that the total number of pages printed for the image list 20 is less than or equal to this upper limit of "2". This process will be described in greater detail below.

By holding the number of pages printed for the image list 20 to a number less than or equal to the upper limit, the MFP 3001 according to the third embodiment can prevent excessive consumption of paper and ink required for outputting the image list 20 and can avoid printing out an image list 20 that is so large that the user cannot look through all images when numerous image files are stored on the media card. Further, the MFP 3001 can output the image list 20 more quickly.

Figure 27:
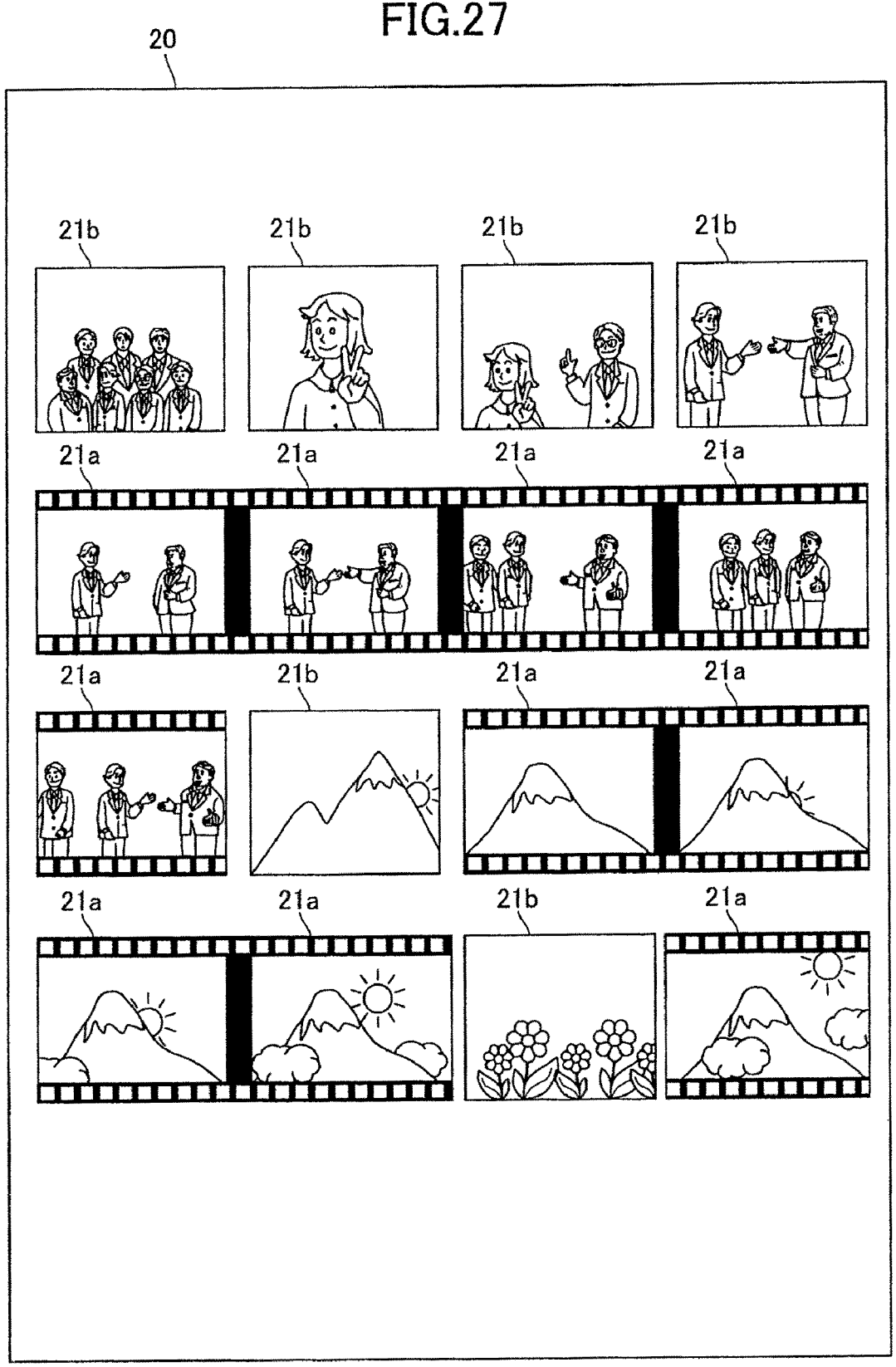
FIG. 27 shows an example of an image list outputted by the MFP according to the third embodiment.

FIG. 27 shows one sample page of the image list 20 printed by the MFP 3001. As shown in FIG. 27, in the second embodiment, the index image 21 is classified into one of a video index image 21$a$ indicating the content of video file and a still image index image 21$b$ indicating the content of still image file, for purpose of explanation. Video index images 21 corresponding to frame image data extracted from video files and still image index images 21$b$ corresponding to still image files are laid out in the image list 20 based on a prescribed ordering condition.

When a combination of still image files and video files is stored on a media card, the MFP 3001 prints out an image list 20 such as that shown in FIG. 27 having a combination of the Video index images 21$a$ and the still image index images 21$b$. In this way, the user can view at a glance the Video index images 21$a$ indicating content of video files and the still image index images 21$b$ indicating content of still image files together in a single page of the image list 20, making browsing more user-friendly.

The MFP 3001 also determines a layout order for each index image in the group of index images 21$a$ and 21$b$ so that the images are arranged in ascending or descending order according to the capture date and time (one example of a creation date) and prints out the image list 20 having the index images 21$a$ and 21$b$ arranged according to this predetermined layout order.

As will be described later in greater detail, the MFP 3001 determines a layout order for arranging the index images 21$a$ and 21$b$ in the image list 20 based only on the capture date and time, not on whether the index image is based on a still image file or a video file. Hence, even if the user cannot remember whether the image is a still image or a video, for example, the user can quickly find the desired image based on the capture date and time, i.e., whether the image was taken some time ago or fairly recently.

The MFP 3001 sets a frame image extraction number associated with recording length data based on unique data for each image file stored in the file data storage area 13$h$ and sets the layout order for the index images 21$a$ and 21$b$ to an order based on the capture dates and times. Data indicating the layout order is stored in the layout data storage area 13$i$ shown in FIG. 28.

FIG. 28 conceptually illustrates the structure of the layout data storage area 13$i$ according to the third embodiment. As shown in FIG. 5, the layout data storage area 13$i$ stores layout data records 300, each including a file ID, frame extraction ordinal number, image date data, and image time data; and a layout order number associated with each layout data record 300.

Specifically, the layout data storage area 13$i$ is provided with the layout order storage area 301, the file ID storage area 302, a frame extraction ordinal number storage area 304, an image date data storage area 305, an image time data storage area 306 and an adjunctive image data storage area 307. In the third embodiment, the layout data storage area 13$i$ does not includes the frame extraction position storage area 303.

The frame extraction ordinal number storage area 304 stores a "frame extraction ordinal number" indicating the location of frame image data to be extracted. The frame extraction ordinal number designates the place of a frame image among all frame images in one video in order from the first frame. Therefore, the extraction frame number storage area 304 is used differently from the first embodiment. The frame extraction ordinal number, in the first embodiment, designates the location of a frame image among only those images being extracted, rather than among all frame images in the video.

This frame extraction ordinal number can be calculated using the following equation, for example, with the total frame number for the video file stored in the total frame number storage area 205, the frame extraction number stored in the frame extraction number storage area 204, and the frame image counter indicating the ordinal number of the frame image being extracted from the video.

(Frame extraction ordinal number)=[(frame image counter−1)×(total frame number)÷(frame extraction number)]

On the other hand, since a plurality of sets of frame image data is extracted from a video file, the MFP 3001 acquires image time data expressing the capture time of each frame image and stores these capture times in the image time data storage area 306. Specific examples for calculating the image time data for each frame image data is the same with the first embodiment (FIG. 12). The adjunctive image data storage area 307 stores additional data related to the image.

Figures 29, 30:
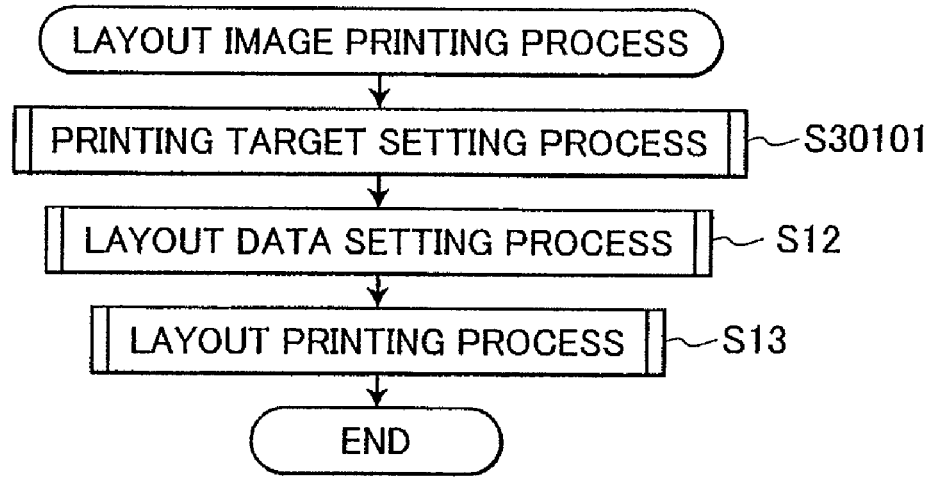
FIG. 29 conceptually illustrates a content of a capture interval storage area according to the third embodiment.
FIG. 30 is a flowchart illustrating steps in a layout image printing process according to the third embodiment.

FIG. 29 conceptually illustrates the content of the capture interval storage area 13y. As shown in FIG. 29, the capture interval storage area 13y is provided with an interval control number storage area 601, a first still image file ID storage area 602, a second still image file ID storage area 603, and a capture time interval data storage area 604.

The interval control number storage area 601 stores an interval control number. The MFP 3001 treats a first still image file ID, a second still image file ID, and capture time interval data managed by the same interval control number as one unit of interval data.

A file ID is stored in each of the first and second still image file ID storage areas 602 and 603. Capture time interval data is stored in the capture time interval data storage area 604 managed by the same interval control number. The capture time interval data indicates the difference in capture date and time between a still image file identified by the file ID stored in the first still image file ID storage area 602 and a still image file identified by the file ID stored in the second still image file ID storage area 603.

As will be described later in greater detail with reference to FIG. 34, the MFP 3001 sets still image files not to be targeted for printing based on the capture time interval data.

FIG. 30 is a flowchart illustrating steps in a layout image printing process executed on the MFP 3001. The MFP 3001 executes the layout image printing process when the user inputs a command to begin printing the image list 20. Prior to executing the layout image printing process, it will be assumed that the user has inputted a maximum printing page number (i.e., the upper limit on the total number of pages in the image list) via the operating section 4 and the CPU 11 receives the maximum printing page number.

In S30101 of the layout image printing process, the CPU 11 executes a printing target setting process for setting the video files and still image files stored on the media card for which index images 21a and 21b will be laid out in the image list 20. This process will be described later in greater detail with reference to FIGS. 31 through 35.

In S12 the CPU 11 executes a layout data setting process for setting the layout data indicating the layout order for the index images 21a and 21b. This process is the same with the layout data setting process S12 in the first embodiment. The detailed explanation is omitted here.

In S13 the CPU 11 executes the layout printing process for laying out index images 21a and 21b based on preset frame image data and still image files. This process is the same with the layout printing process in S13 according to the first embodiment. So, the detailed explanation is omitted here.

Through the layout data setting process, the MFP 3001 adjusts the number of index images 21a and 21b so that the number of pages to be printed for the image list 20 is within the maximum printing page number preset by the user (the upper limit of the total page number for the image list) before printing out the image list 20.

Figure 31:
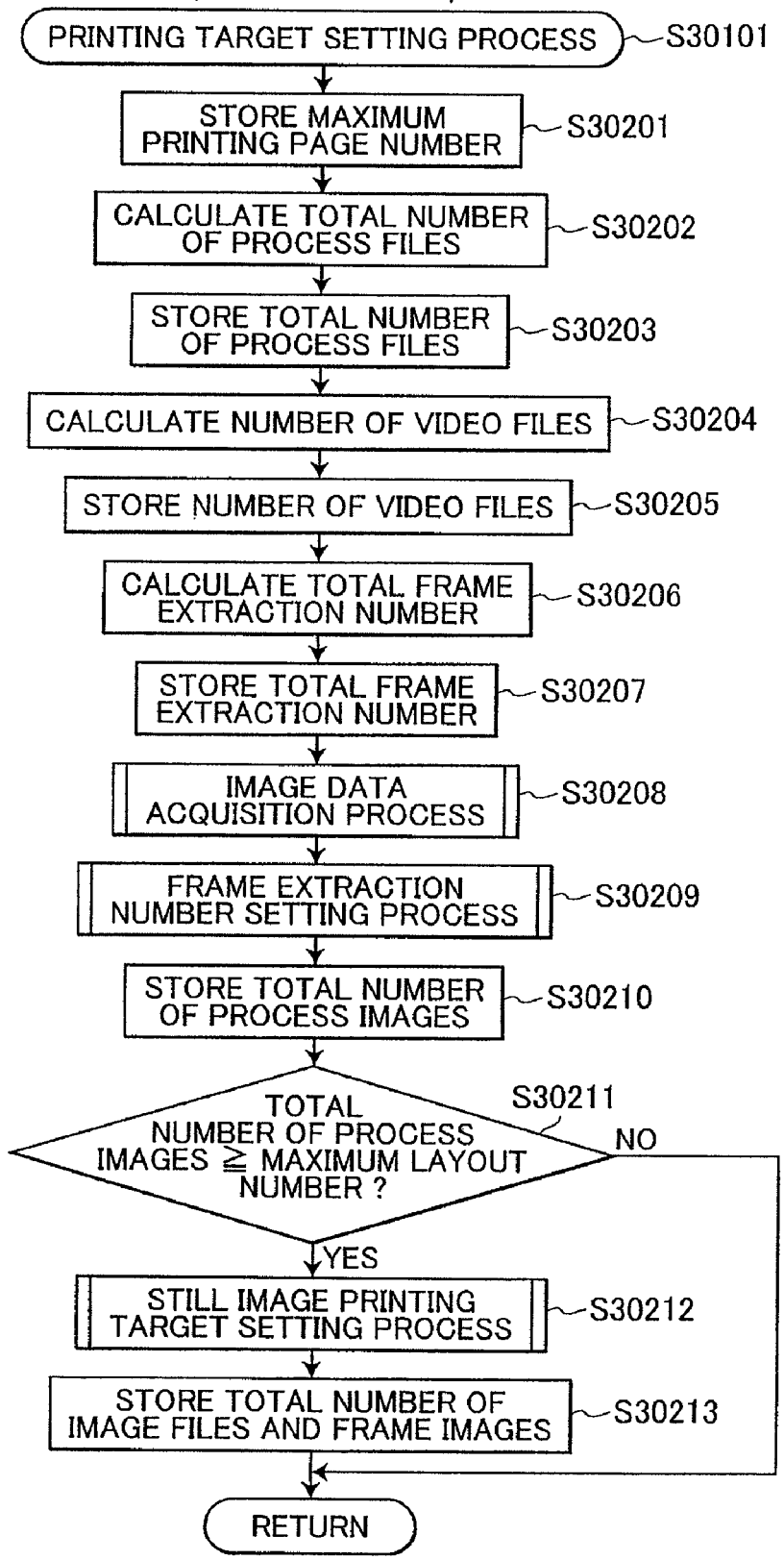
FIG. 31 is a flowchart illustrating steps in a printing target setting process according to the third embodiment.

FIG. 31 is a flowchart illustrating steps in the printing target setting process. In S30201 at the beginning of this process, the CPU 11 acquires the maximum printing page number preset by the user via the operating section 4 and stores this number in the maximum printing page number storage area 13v. In S30202 the CPU 11 calculates the total number of process files indicating the total number of still image files and video files stored on the media card and in S30203 stores this total number in the process file number storage area 13b shown in FIG. 25.

Figure 25:
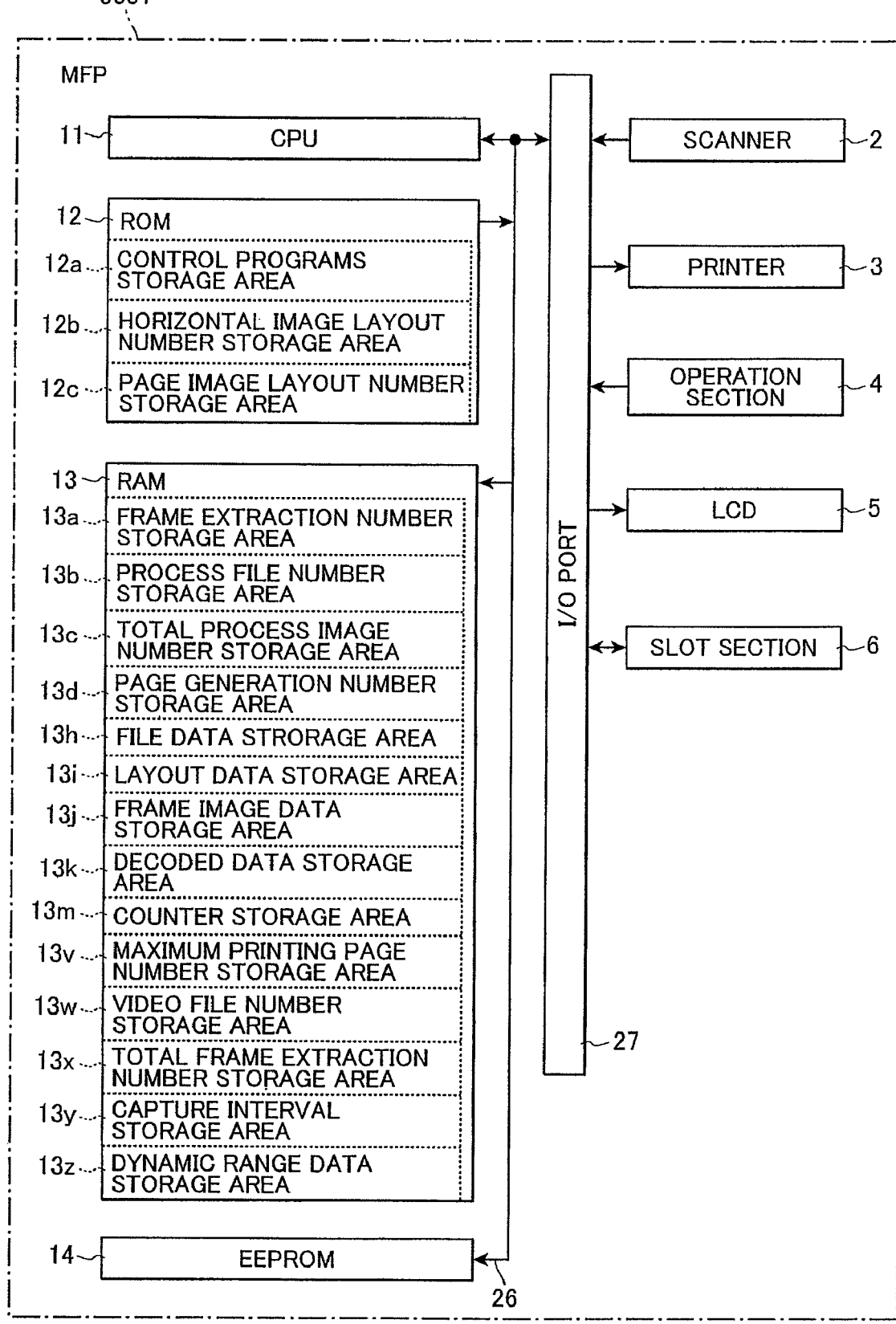
FIG. 25 is a block diagram showing an electrical structure of an MFP according to a third embodiment.

In S30204 the CPU 11 calculates the number of video files stored on the media card and in S30205 stores this number in the video file number storage area 13w shown in FIG. 25.

In S30206 the CPU 11 calculates a total frame extraction number according to Equation 3-1 below, for example. In the following equation, the "page layout number" is a value read from among various page layout numbers stored in the page image layout number storage area 12c based on the recording paper size and printing mode. Further, "maximum printing page number" is the value stored in the maximum printing page number storage area 13v; "total number of process files" is the value stored in the process file number storage area 13b; and "video file number" is the value stored in the video file number storage area 13w.

$$\text{Total frame extraction number} = (\text{maximum printing page number} \times \text{page layout number}) - (\text{total number of process files} - \text{video file number}) \quad \text{(Equation 3-1)}$$

Here, the number of still image files is obtained from (total number of process files−number of video files). The maximum layout number indicates the number of index images 21a and 21b that can be laid out in an image list 20 having the maximum printing page number. Thus, the maximum layout number is obtained from (maximum printing page number× page layout number). Hence, the MFP 3001 finds the total frame extraction number by subtracting the number of still image files from the maximum layout number. Assuming that one index image 21b is laid out for each still image file stored on the media card, the total frame extraction number found above indicates how many Video index images 21a can be laid out.

In S30207 the CPU 11 stores the total frame extraction number calculated in S30206 in the total frame extraction number storage area 13x shown in FIG. 25.

In S30208 the CPU 11 executes an image data acquisition process to create file data for each image file stored on the media card and to store this file data in the file data storage area 13h (FIG. 5). The image data acquisition process of S30208 will be described later with reference to FIG. 32.

In S30209 the CPU 11 executes a frame extraction number setting process for setting the number of frame images to be extracted from each video file. The frame extraction number setting process of S30209 will be described later with reference to FIG. 33.

In S30210 the CPU 11 calculates the total number of process images by adding the total number of still image files and the total number of frame image extraction numbers set for each video file in S30209 and stores this total number of process images in the total process image number storage area 13c shown in FIG. 25.

In S30211 the CPU 11 multiplies the maximum printing page number by the page layout number to find the maximum layout number. The maximum layout number indicates the number of index images 21a and 21b that can be laid out in an image list 20 having the maximum printing page number. The CPU 11 determines whether the total number of process images is greater than the maximum layout number.

If the total number of process images is not greater than the maximum layout number (S30211: NO), the CPU 11 ends the printing target setting process. However, if the total number of process images is greater than the maximum layout number (S30211: YES), in S30212 the CPU 11 executes a still image printing target setting process. The still image printing target setting process will be described later with reference to FIG. 34.

After completing the process in S30212, in S30213 the CPU 11 adds the number of still image files set in S30212 as sources for forming still image index images 21b and the frame image extraction numbers set in S30209 and stores this sum in the total process image number storage area 13c. Subsequently, the CPU 11 ends the printing image setting process and returns to the layout image printing process of FIG. 30.

Through the printing target setting process of S30101, the MFP 3001 can determine the video files and still image files stored on the media card for which index images 21a and 21b are to be laid out in the image list 20.

Figure 32:
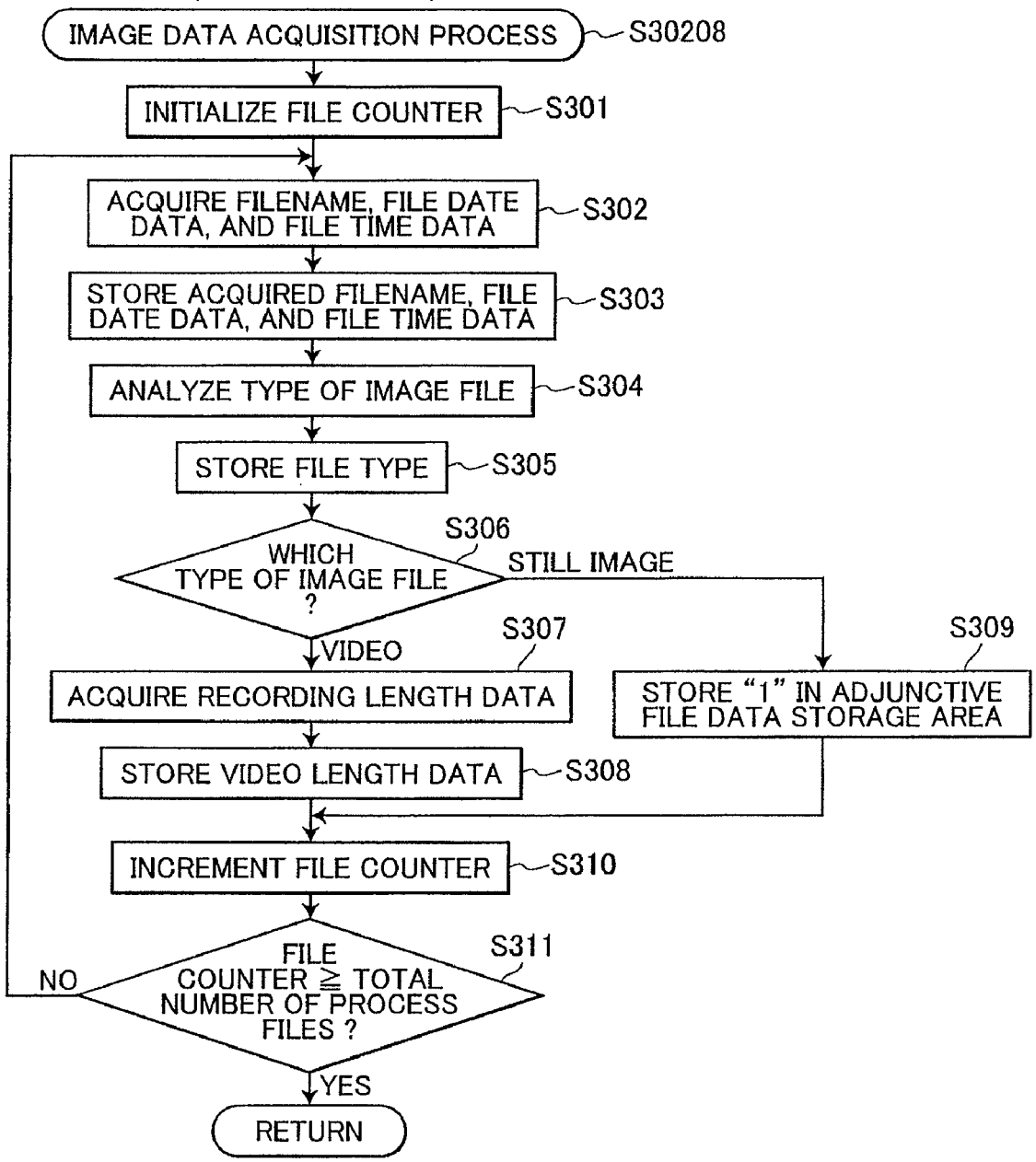
FIG. 32 is a flowchart illustrating steps in an image data acquisition process according to the third embodiment.

FIG. 32 is a flowchart illustrating steps in the image data acquisition process of S30208. The image data acquisition process is performed to create a file data record 200 for each video file and still image file stored on the media card and to store the file data records 200 in the file data storage area 13h (FIG. 4).

In the image data acquisition process of the third embodiment, steps S301-S305, S310, and, S311 are the same with steps S301-S305, S310, and, S311 in the image data acquisition process of the first embodiment. Further, steps S307-S309 are the same with steps S307-S309 in the image data acquisition process of the second embodiment. Thus, the detailed explanation for the image data acquisition process of the third embodiment are omitted here.

Figure 33:
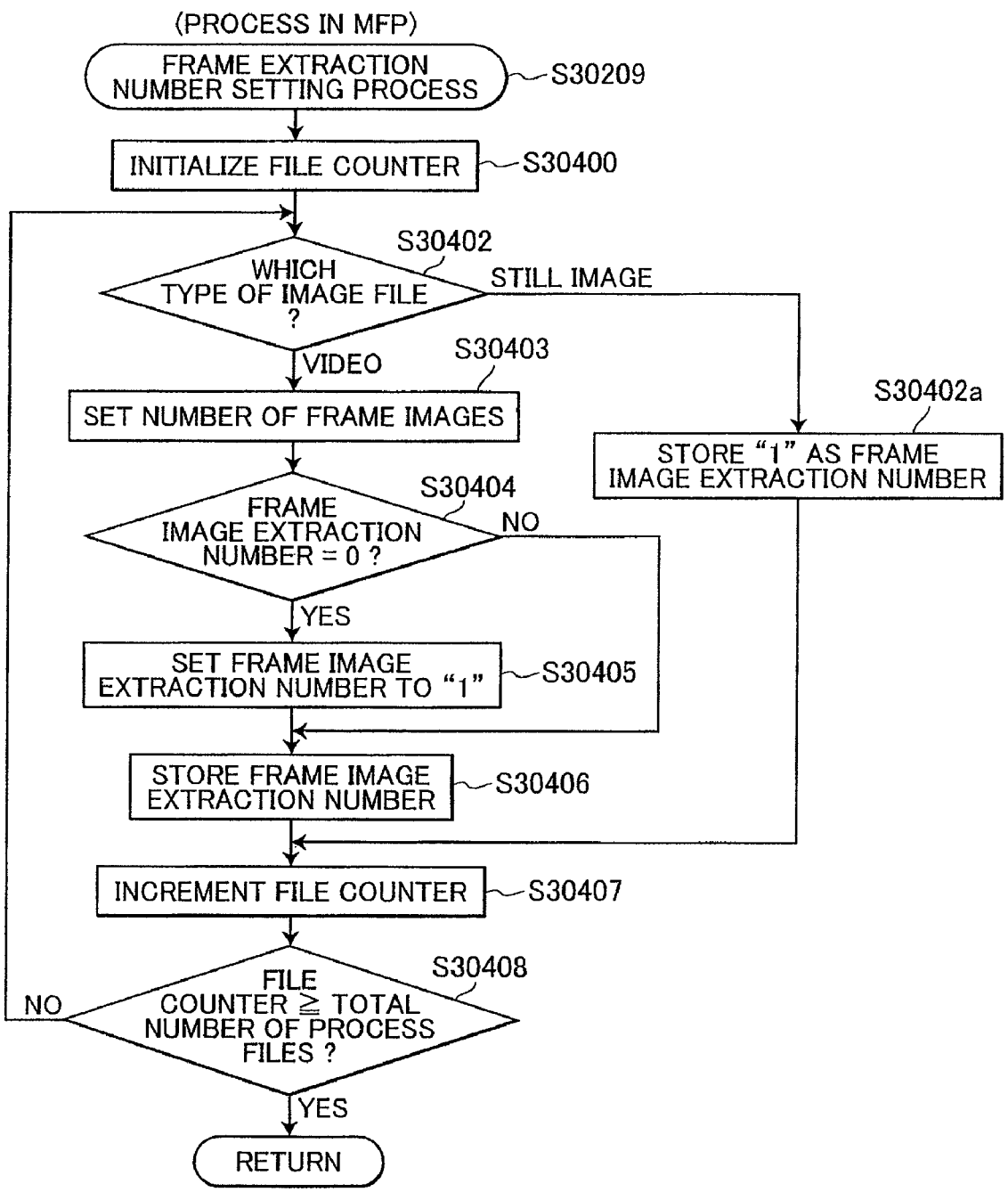
FIG. 33 is a flowchart illustrating steps in a frame extraction number setting process according to the third embodiment.

FIG. 33 is a flowchart illustrating steps in the frame extraction number setting process of S30209. The frame extraction number setting process is performed to set the number of frame images to be extracted from each video file stored on the media card so that frame image data for a larger number of frame images is extracted from video files having a greater length of recording time.

In S30400 the CPU 11 initializes the file counter to "0". In S30402 the CPU 11 references the file type storage area 203 associated with the file ID equivalent to the file counter to determine whether the file type is a video or still image.

If the file type is determined to be a still image (S30402: still image), in S30402a the CPU 11 stores a "1" as the frame image extraction number in the frame extraction number storage area 204 shown in FIG. 4 in association with the file ID equivalent to the file counter and in S30407 increments the file counter by "1". In S30408 the CPU 11 determines whether the file counter is greater than or equal to the total number of process files. If not (S30408: NO), the CPU 11 returns to S30402 and repeats the process described above.

However, if the CPU 11 determines in S30402 that the file type is a video file (S30402: video), in S30403 the CPU 11 sets the number of frame images to be extracted based on the recording length data for the targeted video file. For example, if video files A, B, and C are stored on the media card and have respective recording length data Time_A, Time_B, and Time_C, then the CPU 11 calculates a total recording time TotalRecTime for video files A, B, and C using Equation 3-2 below.

$$\text{TotalRecTime} = \text{Time}\_A + \text{Time}\_B + \text{Time}\_C \quad \text{(Equation 3-2)}$$

That is, the total recording time is calculated by summing the recording lengths of all the targeted video files. Using the total recording time TotalRecTime calculated above, the MFP 3001 can then calculate the number of frame images to be extracted from video files A, B, and C using Equation 3-4 below, where PickFrameNo is the total frame extraction number calculated in S30206; and PickFrameNo_A, PickFrameNo_B, and PickFrameNo_C are extraction numbers for frame images in the respective video files A, B, and C.

$$\text{PickFrameNo}\_A = [\text{TotalFrameNo} \times (\text{Time}\_A / \text{TotalRecTime})]$$

$$\text{PickFrameNo}\_B = [\text{TotalFrameNo} \times (\text{Time}\_B / \text{TotalRecTime})]$$

$$\text{PickFrameNo}\_C = [\text{TotalFrameNo} \times (\text{Time}\_C / \text{TotalRecTime})] \quad \text{(Equation 3-4)}$$

Specifically, the CPU 11 sets the frame image extraction number for the targeted video file based on the total frame extraction number PickFrameNo calculated in S30206 according to Equation 3-4 described above, and a frame image reduction ratio set for the targeted video file. That is, the frame image extraction number for the video file is obtained by multiplying the total frame number by a ratio of the recording length of the video file to the total recording time.

In S30404 the CPU 11 determines whether the frame image extraction number set in S30403 is "0". If so (S30404: YES), in S30405 the CPU 11 sets the frame image extraction number to "1". If not (S30404: NO), the CPU 11 skips S30405 and advances to S30406. In S30406 the CPU 11 stores the frame image extraction number determined above in the frame extraction number storage area 204 shown in FIG. 4 in association with the file ID equivalent to the file counter. Hence, the frame image extraction number is set to a value of "1" or greater for a video file.

In S30407 the CPU 11 increments the file counter by "1" and in S30408 determines whether the file counter is greater than or equal to the total number of process files. The CPU 11 repeats the process described above from S30402 while the file counter is less than the total number of process files (S30408: NO), and ends the frame extraction number setting process when the file counter is greater than or equal to the total number of process files (S30408: YES).

As a result of the frame extraction number setting process in FIG. 33, the CPU 11 lays out a larger number of Video index images 21a in the image list 20 for video files having a longer recording length when executing the layout printing process (S13). Accordingly, the MFP 3001 can print a useful image list providing the user with a clearer view of video content, even when restricting the number of pages printed for the image list 20. In other words, the user can gain a more accurate understanding of the content of video files with a larger number of Video index images 21a laid out in the image list 20 for video files having a longer recording length, since these video files are likely to have a larger number of scenes. On the other hand, since fewer Video index images 21a are laid out in the image list 20 for video files having a shorter recording length, the total number of pages of the image list 20 can be prevented from exceeding the maximum printing page number set by the user.

Further, since the number of frame images to be extracted from each video file is set to a value of "1" or greater in the frame extraction number setting process of the third embodiment, the MFP 3001 includes at least one Video index image 21a in the image list 20 for each video file when executing the layout printing process (S13). Therefore, the MFP 3001 avoids totally omitting any of the video files stored on the media card, even when restricting the number of pages of the image list 20 to be printed.

Figure 34:
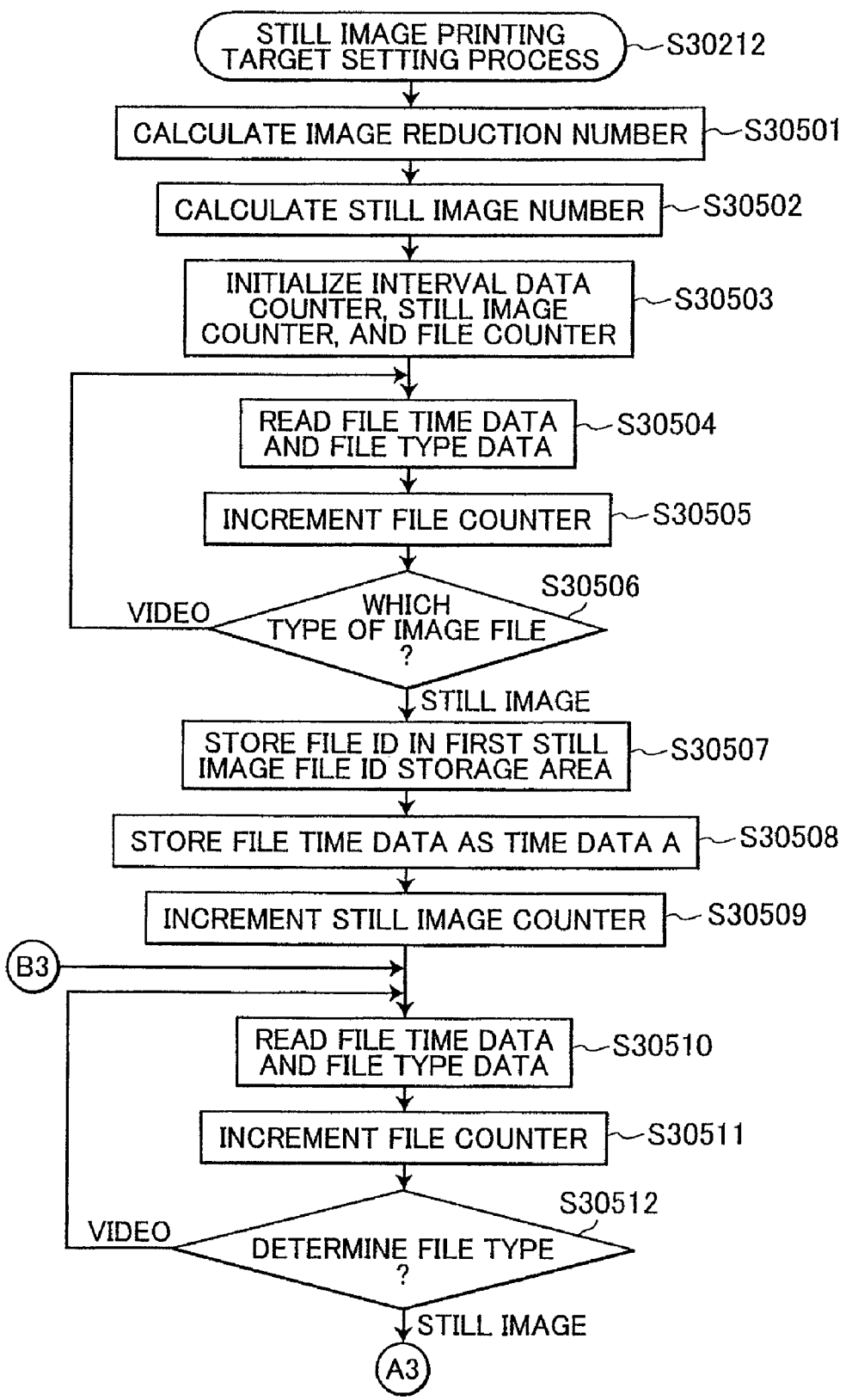
FIG. 34 is a flowchart illustrating a part of steps in a still image printing target setting process according to the third embodiment.

FIG. 34 is a flowchart illustrating steps in the still image printing target setting process of S30212. The CPU 11 executes the still image printing target setting process when determining in S30211 that the total number of process images indicating the sum of the total number of frame image extraction numbers set in the frame extraction number setting process of S30209 (see FIG. 33) and the total number of still image files is greater than the maximum layout number (S30211: YES).

In the following process, the CPU 11 excludes, from still images targeted for printing, the still image file having the oldest capture date and time between a pair of still image files having the smallest difference in capture date and time.

In S30501 at the beginning of the still image printing target setting process, the CPU 11 calculates (acquires) an image reduction number obtained by subtracting the maximum layout number from the total number of process images. In S30502 the CPU 11 calculates a still image number by subtracting the number of video files from the number of process files.

In S30503 the CPU 11 initializes an interval data counter, a still image counter, and a file counter to "0". Thereafter, the CPU 11 repeats a process to calculate capture time interval data and to store this data in the capture time interval data storage area 604 of the capture interval storage area 13y shown in FIG. 29. The interval data counter and the still image counter are stored in the counter storage area 13m shown in FIG. 25.

In S30504 the CPU 11 reads the file time data and file type data associated with the file ID equivalent to the file counter from the file time data storage area 208 and the file type storage area 203 of the file data storage area 13h.

In S30505 the CPU 11 increments the file counter by "1" and in S30506 determines the file type read in S30504. If the file is a video file (S30506: video), the CPU 11 returns to S30504 and repeats the above process.

However, if the file is a still image file (S30506: still image), in S30507 the CPU 11 stores the file ID equivalent to the file counter in the first still image file ID storage area 602 shown in FIG. 29 corresponding to the interval control number equivalent to the interval data counter.

In S30508 the CPU 11 stores the file time data read in S30504 as time data A and in S30509 increments the still image counter by "1". In S30510 the CPU 11 reads the file time data and the file type data corresponding to the file ID equivalent to the file counter from the file time data storage area 208 and the file type storage area 203 of the file data storage area 13h.

In S30511 the CPU 11 increments the file counter by "1" and in S30512 determines the file type of the image read in S30510. If the file type is a video file (S30512: video), the CPU 11 returns to S30510 and repeats the above process.

Figure 35:
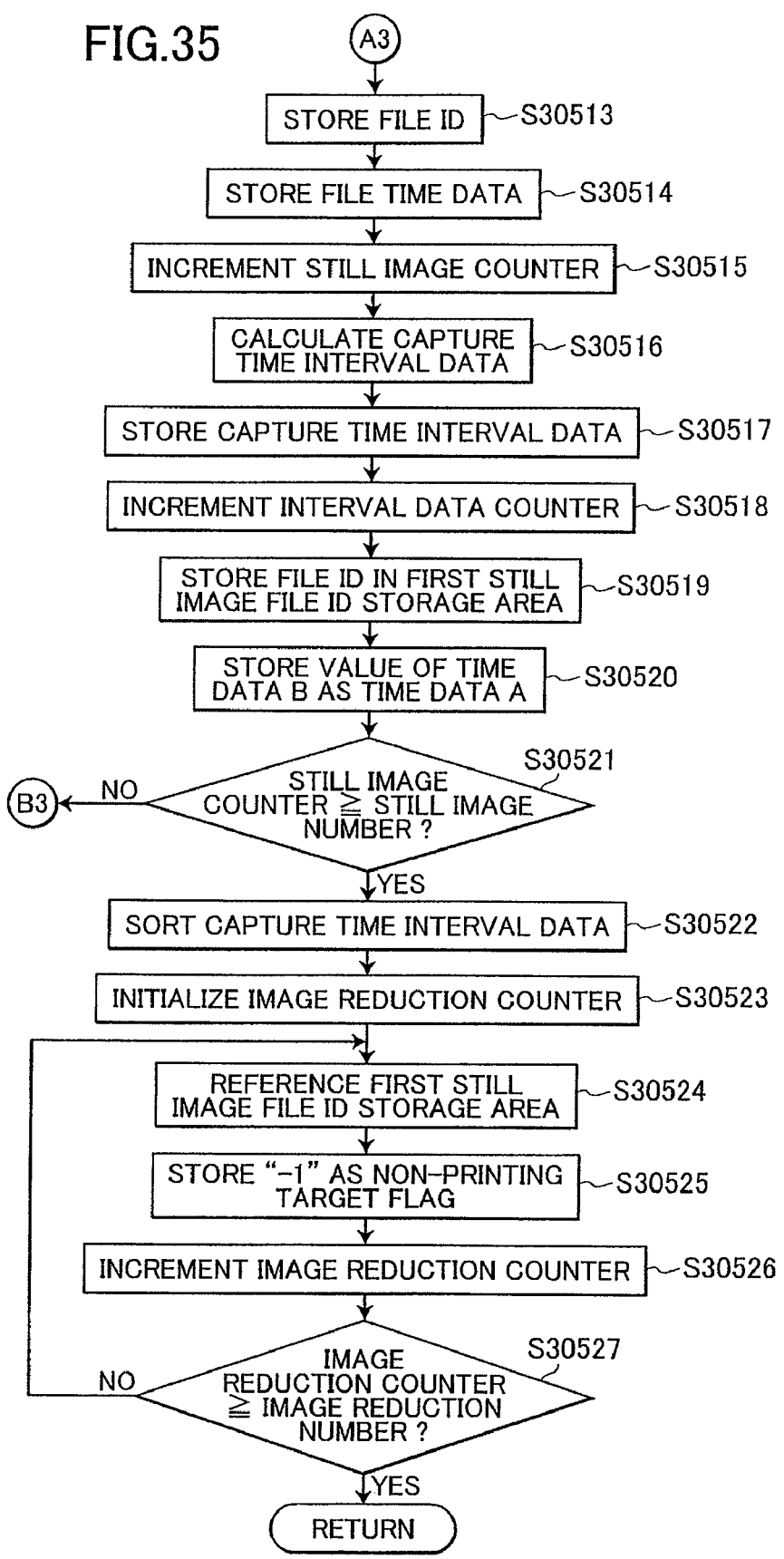
FIG. 35 is a flowchart illustrating a remaining part of steps in the still image printing target setting process shown in FIG. 34.

While repeating the above process, the CPU 11 advances to S30513 shown in FIG. 35 when determining that the file type is a still image (S30512: still image).

FIG. 35 is a flowchart illustrating steps in a continuation of the still image printing target setting process of FIG. 34. In S30513 of FIG. 35 the CPU 11 stores the file ID equivalent to the file counter decremented by "1" in the second still image file ID storage area 603 shown in FIG. 29 in association with the interval control number equivalent to the interval data counter. In S30514 the CPU 11 stores the file time data read in S30510 as time data B and in S30515 increments the still image counter by "1".

In S30516 the CPU 11 calculates the capture time interval data by subtracting the time data B from the time data A. Here, the capture time interval data indicates the difference in capture date and time between the still image file identified by the file ID stored in the first still Image file ID storage area 602 and the still image file identified by the file ID stored in the second still image file ID storage area 603.

In S30517 the CPU 11 stores the capture time interval data calculated in S30516 in the capture time interval data storage area 604 corresponding to the interval control number equivalent to the interval data counter. In S30518 the CPU 11 increments the interval data counter by "1".

In S30519 the CPU 11 stores the file ID equivalent to the file counter in the first still image file ID storage area 602 shown in FIG. 29 associated with the interval control number equivalent to the interval data counter. In S30520 the CPU 11 stores the value of time data B as the time data A.

In S30521 the CPU 11 determines whether the still image counter is greater than or equal to the still image number calculated in S30502. If the still image counter is less than the still image number (S30521: NO), the CPU 11 returns to S30510 of FIG. 34 and repeats the above process.

When the CPU 11 determines that the still image counter is greater than or equal to the still image number after repeating the above process (S30521: YES), in S30522 the CPU 11 sorts the capture time interval data in the capture interval storage area 13y in order of smallest value.

In S30523 the CPU 11 initializes an image reduction counter to "0". The image reduction counter is stored in the counter storage area 13m. In S30524 the CPU 11 references the first still image file ID storage area 602 shown in FIG. 29 and reads the file ID corresponding to the interval control number equivalent to the image reduction counter. In S30525 the CPU 11 stores "−1" in the adjunctive file data storage area 209 shown in FIG. 4 in association with this file ID as a non-printing target flag.

In other words, the CPU 11 analyzes pairs of still image files having the shortest difference in capture date and time and excludes the still image file having the oldest capture date and time as a printing target in the layout printing process described later.

The above process is performed for the following reason. It is conceivable that the existence of a pair of still image files having a short difference between capture dates and times indicates that the second still image was taken within a short time after the first image because a failure occurred when capturing the first image. Therefore, by excluding the first still image file from the printing process, the MFP 3001 of the third embodiment avoids including index images in the image list 20 for failed still image files.

In S30526 the CPU 11 increments the image reduction counter by "1" and in S30527 determines whether the image reduction counter is greater than or equal to the image reduction number calculated in S30501. The CPU 11 repeats the process from S30524 described above while the image reduction counter is less than the image reduction number (S30527: NO).

Hence, the CPU 11 repeats the process of reading a file ID stored in the first still image file ID storage area 602 in the order of shortest interval time data and excluding the still image file identified by the file ID from printing a number of times equivalent to the image reduction number.

Since a number of still image files equivalent to the image reduction number are excluded from printing through the above process, the MFP 3001 can maintain the total number of pages printed for the image list 20 within the preset maximum printing page number, even when a large number of still image files exists.

When the CPU 11 determines in S30527 that the image reduction counter is greater than or equal to the image reduction number after repeatedly performing the above process (S30527: YES), the CPU 11 ends the still image printing target setting process.

Through the still image printing target setting process (S30212) according to the third embodiment, the MFP 3001 sets still image files to be printed so that the outputted image list falls within the maximum printing page number set by the user. Next, the MFP 3001 executes the layout data setting process to determine a layout order for the index images 21*a* and 21*b*.

In S13 the CPU 11 executes the layout printing process that is the same with the layout printing process according to the first embodiment (FIGS. 14 and 15). By performing the process, in the third embodiment, the MFP 3001 extracts frame image data from video files stored on the media card for frame images of a number determined in the frame extraction number setting process of S30209 (see FIG. 33) and extracts still image files to which a printing target flag was added in the still image printing target setting process of S30212 (see FIG. 34).

The MFP 3001 according to the third embodiment extracts frame image data and still image files corresponding to index images within the maximum layout number and outputs an image list 20 with the index images 21*a* and 21*b* laid out therein based on the extracted frame image data and still image files. Accordingly, the MFP 3001 can keep the number of pages printed for the image list 20 within a user specified upper limit (maximum printing page number), even when a large number of image files are stored on the media card.

Further, since the MFP 3001 outputs an image list 20 having still image index images 21*b* based on still image files and Video index images 21*a* based on frame image data, the MFP 3001 can provided the user with an image list 20 that is easy to browse, even when the media card holds a combination of still image files and video files.

<Modification of Third Embodiment>

Next, the MFP 3001 according to a modification of the third embodiment will be described with reference to FIGS. 36 through 38. In the third embodiment described above, the MFP 3001 determined which still image files to exclude from printing based on capture time intervals. However, the MFP 3001 according to the modification of the third embodiment acquires dynamic range data representing a dynamic range for each still image file and determines still image files to exclude from printing based on this dynamic range data.

In the modification of the third embodiment, the external structure and electrical configuration of the MFP 3001 are identical to that in the MFP 3001 according to the third embodiment. Therefore, in the following description, only aspects differing from the third embodiment will be described, wherein like parts and components are designated with the same reference numerals to avoid duplicating description.

FIG. 36 conceptually illustrates the content of the dynamic range data storage area 13*z*. The dynamic range data storage area 13*z* is provided in the RAM 13 shown in FIG. 25 in place of the capture interval storage area 13*y* provided in the third embodiment. As shown in FIG. 36, the dynamic range data storage area 13*z* includes a dynamic range control number storage area 701, a still image file ID storage area 702, and a dynamic range data storage area 703.

The dynamic range control number storage area 701 stores a dynamic range control number, and the still image file ID storage area 702 stores a file ID. Dynamic range data for a still image file identified by the file ID stored in the still image file ID storage area 702 is stored in the dynamic range data storage area 703. The dynamic range data is managed by the dynamic range control number. As will be described later, data in the dynamic range data storage area 13*z* is sorted according to the dynamic range data, but FIG. 36 shows the data prior to sorting.

Dynamic range data in the third embodiment indicates the distribution of color brightness in an image corresponding to a still image file, where a larger dynamic range value indicates that the image has a wider range from dark colors to bright colors. A method of calculating this dynamic range will be described later in greater detail.

Figure 37:
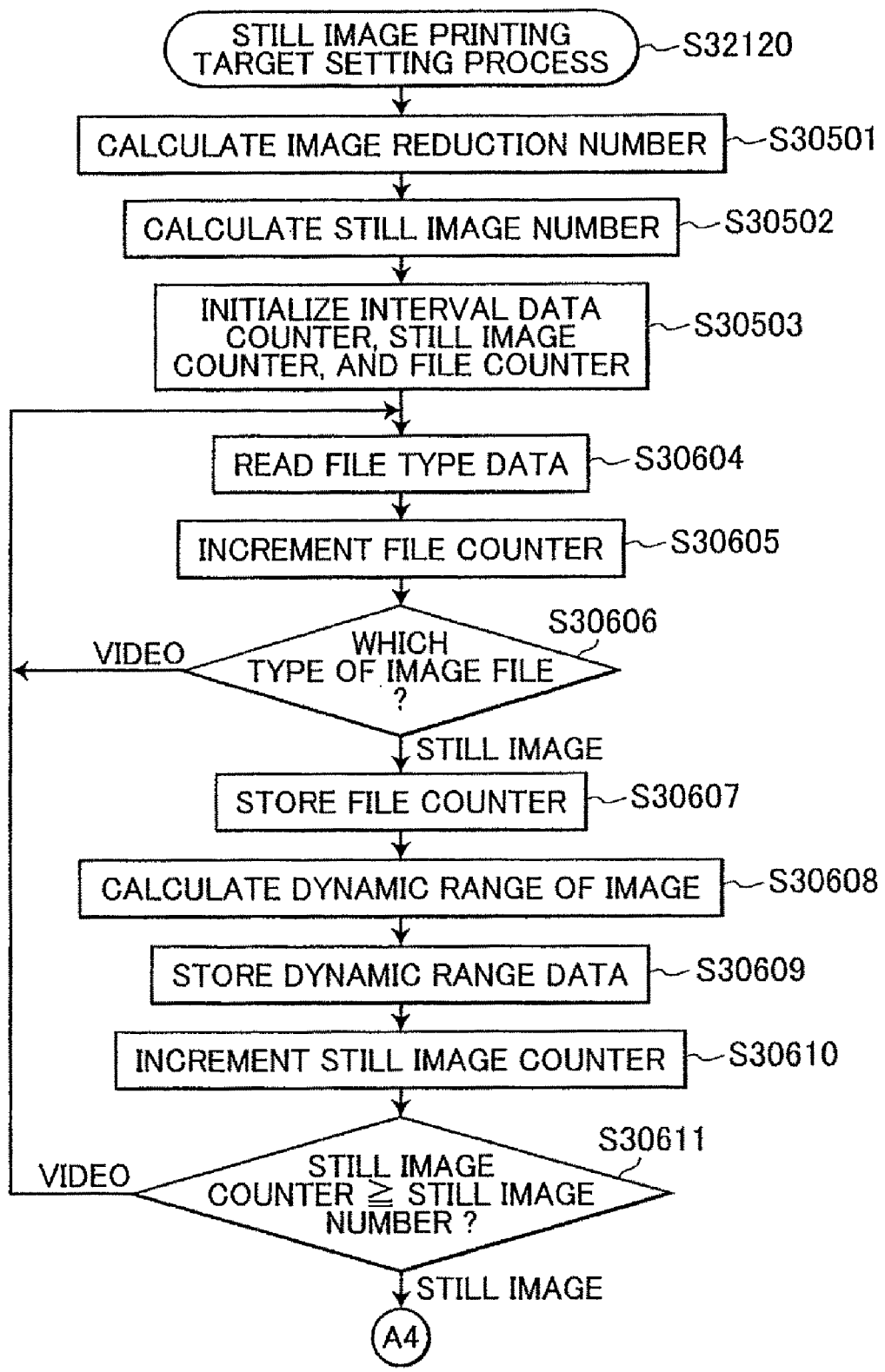
FIG. 37 is a flowchart illustrating a part of steps in a still image printing target setting process according to the modification of the third embodiment.
Figure 38:
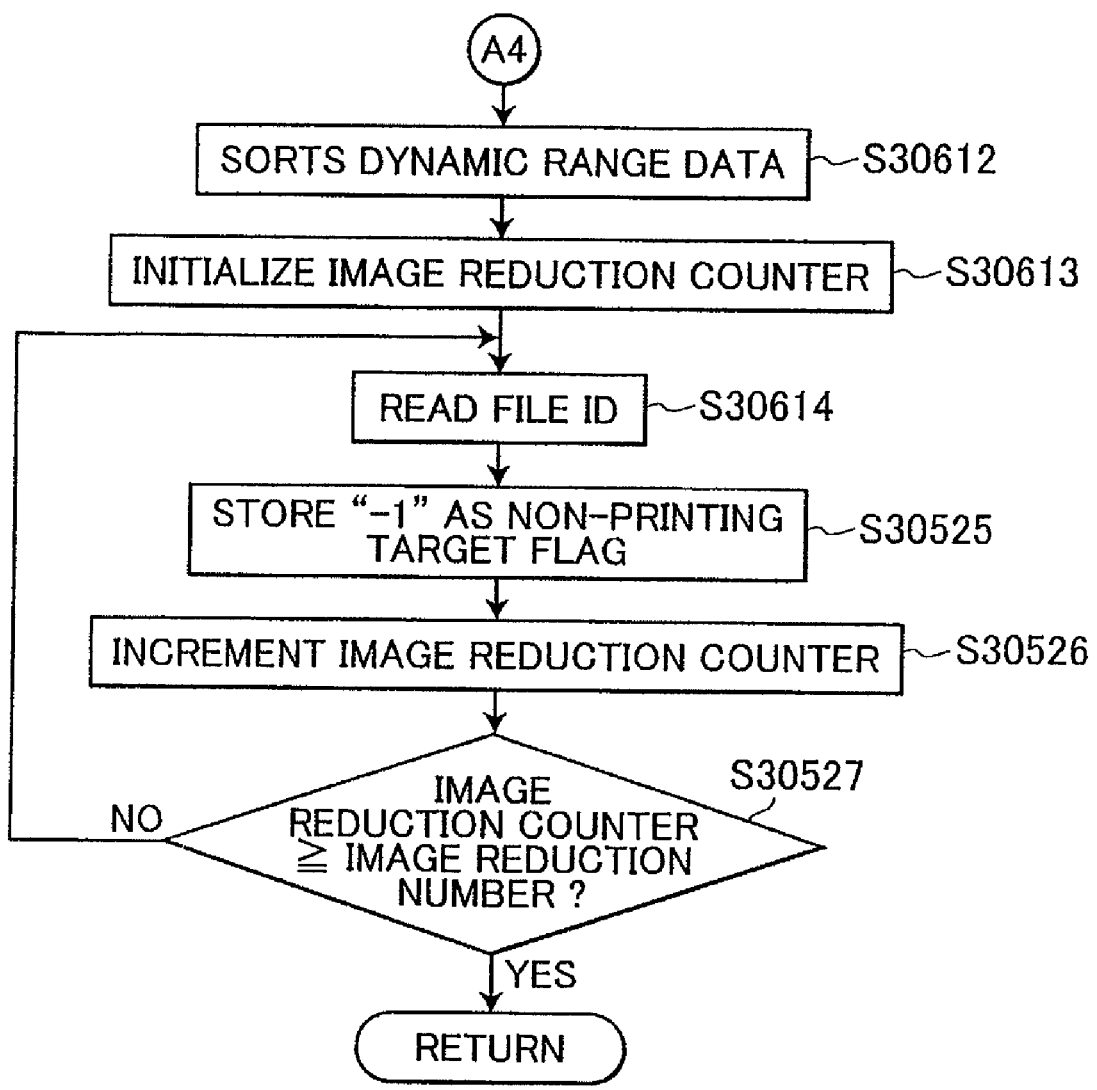
FIG. 38 is a flowchart illustrating a remaining part of steps in a still image printing target setting process according to the modification of the third embodiment.

FIGS. 37 and 38 are flowcharts illustrating steps in the still image printing target setting process of S32120 executed on the MFP 3001 according to the modification of the third embodiment. The still image printing target setting process of S32120 is executed in place of the process of S30212 described for the MFP 3001 of the third embodiment, wherein identical steps in the processes are designated with the same step numbers to avoid duplicating description.

As in the process of S30212 according to the third embodiment, the still image printing target setting process shown in FIGS. 37 and 38 is performed to exclude some of the still image files stored on the media card from those targeted for printing.

In S30604 of the still image printing target setting process according to the third embodiment, the CPU 11 reads file type data corresponding to the file ID equivalent to the file counter from the file type storage area 203.

In S30605 the CPU 11 increments the file counter by "1" and in S30606 determines the file type of the image file read in S30604. If the image file is a video file (S30606: video), the CPU 11 returns to S30604 and repeats the above process.

However, if the image file is a still image file (S30606: still image), in S30607 the CPU 11 stores the current file counter in the still image file ID storage area 702 shown in FIG. 36 in association with the dynamic range control number equivalent to the still image counter.

In S30608 the CPU 11 calculates the dynamic range of the image from the still image file corresponding to the file ID.

Here, a method of calculating the dynamic range will be described. In this method, the CPU 11 performs a decoding process on the still image file corresponding to the file ID to obtain values in the YCrCb color space for each pixel in the image.

In S30608 the CPU 11 calculates a histogram for the image from the decoded still image file. Specifically, the CPU 11 converts the values for each pixel to values in the RGB color space and calculates the frequency of occurrence of all colors in all pixels.

The CPU 11 then calculates a dynamic range from this histogram. More specifically, the CPU 11 searches for the smallest i that satisfies condition 1 below in order from pixel value "0", where PN is the total number of pixels in the decoded still image file, and Fi is the frequency of pixel values set to i.

(Condition 1)

$$\sum_{i=0}^{255} Fi \geq \frac{25}{1000} PN \quad \text{(Equation 3-1)}$$

The CPU 11 similarly searches for the largest j that satisfies condition 3-2 below in order from pixel value 255.

(Condition 2)

$$\sum_{j=0}^{255} Fj \leq \frac{975}{1000} PN \quad \text{(Equation 3-2)}$$

After determining the values i and j, the CPU 11 calculates the dynamic range data D from the following equation.

$$D = j - i$$

After finding the dynamic range data D for each RGB color in this way, in S30608 the CPU 11 calculates the total dynamic range data D for all colors as the dynamic range data of the extracted frame image data. In S30609 the CPU 11 stores this dynamic range data in the dynamic range data storage area 703 in association with the dynamic range control number equivalent to the still image counter value.

In the third embodiment, the sum of dynamic range values for each RGB color is treated as the dynamic range of the image data. However, the MFP 3001 may be configured to execute the steps hereafter based on the dynamic range of each color independently.

In S30610 the CPU 11 increments the still image counter by "1". In S30611 the CPU 11 determines whether the value of the still image counter is greater than or equal to the still image number calculated in S30502. If no (S30611: NO), the CPU 11 returns to S30604 and repeats the above process. Accordingly, the CPU 11 acquires dynamic range data representing the dynamic range of each still image file on the media card.

Once the CPU 11 determines that the value of the still image counter is greater than or equal to the still image number after repeatedly performing the above process (S30611: YES), the CPU 11 advances to S30612 of FIG. 250.

FIG. 250 is a flowchart illustrating steps in a continuation of the still image printing target setting process of FIG. 37. In S30612 of FIG. 250 the CPU 11 sorts the dynamic range data in the dynamic range data storage area 13z shown in FIG. 36 in order of smallest value. In other words, the CPU 11 resets file IDs so that files are arranged in order of smallest distribution of color brightness. In S30613 the CPU 11 initializes the image reduction counter to "0".

In S30614 the CPU 11 reads the file ID stored in the still image file ID storage area 702 shown in FIG. 36 associated with the dynamic range control number equivalent to the image reduction counter. In S30525 the CPU 11 stores "−1" in the adjunctive file data storage area 209 shown in FIG. 4 in association with this file ID as a non-printing target flag.

In S30526 the CPU 11 increments the image reduction counter by "1" and repeats the process from S30614 described above until the image reduction counter is greater than or equal to the image reduction number calculated in S30501. When the CPU 11 determines in S30527 that the image reduction counter is greater than or equal to the image reduction number after repeatedly performing the above process (S30527: YES), the CPU 11 ends the still image printing target setting process.

Through the still image printing target setting process (S32120) according to the modification of the second embodiment, the MFP 3001 excludes still image files from those targeted for printing by a number equivalent to the image reduction number beginning from the still image file having the smallest dynamic range and continuing in order of dynamic range represented by the dynamic range data.

Since still image files having a low dynamic range are more likely to indicate files in which failure occurred during image capture, by excluding still image files having the lowest dynamic range from those targeted for printing, the MFP 3001 can provide the user with useful index images 21a and 21b laid out in an image list 20 with a limited number of pages.

<Other Modifications of Third Embodiment>

In the third embodiment described above, the MFP 3001 sets still image files to be excluded from those targeted for extraction based on the difference in capture date and time among the still image files or the dynamic range data for the still image files. However, still image files to be excluded from those targeted for extraction may be set according to another condition. For example, the MFP 3001 may be provided with out-of-focus data acquiring means for acquiring data indicating the degree in which an image is out-of-focus for each still image corresponding to a still image file. Based on the data acquired by the out-of-focus data acquiring means, the MFP 3001 may give priority to excluding still image files corresponding to images that are out-of-focus to a high degree from those targeted for extraction.

In the third embodiment described above, the MFP 3001 sets the number of frame images to be extracted in order that frame image data for a larger number of frame images is extracted from video files having a longer recording length. However, the number of frame images to be extracted may be set according to another condition.

For example, the MFP 3001 may be provided with scene change data acquiring means for acquiring scene change data indicating the number of scene changes in each video file stored on the media card. Based on the scene change data acquired by the scene change data acquiring means, the MFP 3001 may set the number of frame images to be extracted from each video file stored on the media card so that frame image data for a larger number of frame images is extracted from video files having a greater number of scene changes.

For example, the MFP 3001 may calculate the amount that colors (pixel values) change between frame images and may determine that a scene change has occurred when this amount of change exceeds a threshold value. In this way, the MFP 3001 can acquire scene change data indicating the number of scene changes in a single video file.

While the invention has been described in detail with reference to the above embodiments thereof, it would be apparent to those skilled in the art that various changes and modifications may be made therein without departing from the spirit of the invention.

For example, while the image list 20 is printed on recording paper in the embodiments, the invention may also be applied to a case in which the image list 20 is displayed on the LCD 5 or another display unit.

The present invention may also be applied to a personal computer, for example, whereby the image list 20 is displayed on the monitor of the personal computer or is printed out on a printer through control by the personal computer.

In the embodiments described above, both the video files and the still image files are generated through digital photography, but the present invention may be applied to video files and still image files generated according to another method. In this case, the device may set the layout order of the index images 21 based on a condition other than the capture date and time, such as the file creation date and time indicating the date and time that the file was created or the modified date and time of the file.

Further, while still image files and video files are combined on the media card in the embodiments described above, the invention may also be applied to a case in which only video files are stored on the media card.

Further, while image data stored on a writable media card is the target of processing in the embodiments, the invention may also be applied when targeting image data stored in internal memory of the MFP 1.

In the embodiments described above, the layout order is set based on the capture date and time, but this order may be set according to another condition, such as a dynamic range of color brightness, an average brightness, the presence of faces in the image, or the number or size of the faces.

What is claimed is:

1. An image processor accessible to a storage medium storing a set of image data corresponding to an image, comprising:
    a storing unit that stores a selecting condition;
    an image determining unit that determines whether the image corresponding to the set of the image data satisfies the selecting condition; and
    an output unit that outputs an image list including either one of the image that is determined to satisfy the selecting condition by the image determining unit and a resized image resized from the image that is determined to satisfy the selecting condition by the image determining unit,
    wherein the set of image data includes a set of moving image data including a plurality of sets of frame image data corresponding to a plurality of frame images,
    the image processor further comprising an extracting unit that extracts a set of frame image data from the plurality of sets of frame image data included in the set of moving image data,
    wherein the image determining unit determines whether the frame image corresponding to the extracted set of frame image data satisfies the selecting condition, and
    wherein the image list includes either one of the frame image determined to satisfy the selecting condition by the image determining unit and a resized frame image resized from the frame image determined to satisfy the selecting condition by the image determining unit.

2. The image processor according to claim 1, wherein the set of image data further includes a set of still image data corresponding to a still image,
    wherein the image determining unit determines whether the still image corresponding to the set of still image data satisfies the selecting condition,
    wherein the image list further includes either one of the still image determined to satisfy the selecting condition by the image determining unit and a resized still image resized from the still image determined to satisfy the selecting condition by the image determining unit.

3. The image processor according to claim 2, further comprising a color detecting unit that detects a color in the frame image and a color in the still image,
    wherein the image determining unit determines whether the frame image and the still image satisfy the selecting condition based on a result of the detection by the color detecting unit.

4. The image processor according to claim 2, further comprising:
    a classifying unit that classifies the set of image data into one of groups based on a characteristic of the set of image data; and
    a group determining unit that determines a primary group into which the classifying unit classifies a largest number worth of sets of image data,
    wherein the selecting condition is determined based on a characteristic of the set of image data in the primary group.

5. The image processor according to claim 4, wherein the classifying unit includes:
    a moving image data classifying unit that classifies the set of moving image data into the groups based on the characteristic of the set of moving image data,
    a still image data classifying unit that classifies the set of still image data into the groups based on the characteristic of the set of still image data,
    wherein the group determining unit acquires a total number of the sets of moving image data and the sets of still image data belonging to a group and determines a group corresponding to a largest total number of the sets of moving image data and the sets of still image data, as the primary group.

6. The image processor according to claim 5, wherein the moving image data classifying unit further comprises:
    a frame image classifying unit that classifies each of frame images extracted from the set of moving image data into one of groups based on a characteristic,
    wherein the classifying unit specifies a group into which the frame image classifying unit classifies a largest number worth of sets of frame images extracted from the set of moving image data and classifies the set of moving image data into the specified group.

7. The image processor according to claim 4, wherein the classifying unit classifies the set of image data into one of a first group when the image generated from the set of image data has a human image and a second group when the image generated from the set of image data has a landscape image.

8. The image processor according to claim 1, further comprising a human image detecting unit that detects a human image included in the frame image corresponding to the set of frame image data,
    wherein the image determining unit determines whether the frame image satisfies the selecting condition based on a result of the detection by the human image detecting unit.

9. The image processor according to claim 8, wherein the selecting condition requires an image to include a human image,
    wherein the determining unit determines that the frame image satisfies the selecting condition when the frame image includes a human image.

10. The image processor according to claim 8, wherein the human image detecting unit counts a number of human images included in each frame image,
    wherein the determining unit determines that the frame image satisfies the selecting condition when sorting the frame images in a descending order with respect to the number of human images included in each frame image indicates that the frame image is in an order higher than a prescribed order among the frame images rearranged according to the sorting.

11. The image processor according to claim 8, wherein the human image detecting unit detects an area of the human image included in each frame image,
    wherein the determining unit determines that the frame image satisfies the selecting condition when sorting the frame images in a descending order with respect to the area of human image included in each frame image indicates that the frame image is in an order higher than a prescribed order among the frame images rearranged according to the sorting.

12. The image processor according to claim 8, wherein the selecting condition requires an image to include a landscape image,
    wherein the determining unit determines that the frame image satisfies the selecting condition when the frame image does not include a human image.

13. The image processor according to claim 1, wherein the extracting unit extracts sets of frame image data from the plurality of sets of frame image data included in the set of moving image data in a prescribed frame interval.

14. An image processor accessible to a storage medium storing at least one set of moving image data each including a plurality of sets of frame image data corresponding to a plurality of frame images, each set of moving image data corresponding to a moving image, the image processor comprising:
- an extraction frame number determining unit that determines an extraction frame number for each of the at least one set of moving image data;
- an extracting unit that extracts, as a set of candidate image, the extraction frame number worth of set of frame image data from the plurality of sets of frame image data included in one of the at least one set of moving image data; and
- an output unit that outputs an image list including either one of a frame image corresponding to a set of candidate image data and a resized frame image resized from the frame image corresponding to the set of candidate image data, as an index image.

15. The image processor according to claim 14, wherein the storage medium further stores a set of still image data corresponding to a still image,
- wherein the image list further includes either one of the still image and a resized still image resized from the still image, as an index image.

16. The image processor according to claim 15, further comprising a layout order determining unit that determines a layout order of index images according to a predetermined criterion,
- wherein the output unit outputs the image list arranging the index images in the layout order.

17. The image processor according to claim 16, further comprising a time data acquiring unit acquires a capture time data from each of the set of still image data and the plurality of sets of frame image data, the capture time data indicating a time at which each of the still image and the plurality of the frame images was captured, and
- wherein the layout order is determined according to the capture date and time data.

18. The image processor according to claim 15, further comprising an index number determining unit that determines a number of index images with respect to the still image and the resized still image included in the image list,
- wherein the extraction frame number is determined based on the number of index images with respect to the still image and the resized still image.

19. The image processor according to claim 14, wherein the longer a length of recording time of the at least one set of moving image data is, the larger the extraction frame number of the at least one set of moving image data is.

20. The image processor according to claim 14, further comprising a scene change detecting unit that detects a scene change in the moving image corresponding to the set of moving image data,
- wherein, as a frequency of detection of a scene change of the at least one set of moving image data increases, the extraction frame number of the at least one set of moving image data becomes greater.

21. The image processor according to claim 20, wherein the extracting unit extracts at least one set of frame image data corresponding to each scene in the moving image corresponding to the set of moving image data.

22. The image processor according to claim 14, wherein, as a total number of sets of frame images in the set of moving image becomes greater, the extraction frame number of the at least one set of moving image data becomes greater.

23. The image processor according to claim 14, further comprising:
- a storing unit that stores a page layout number indicating a number of index images in a page of the image list;
- a setting unit that sets a maximum page number indicating a maximum number of pages of the image list; and
- a maximum layout number acquiring unit that acquires a maximum layout number based on the page layout number and the maximum page number,
- wherein the extraction frame number determining unit determines the extraction frame number based on the maximum layout number for each of the at least one set of moving image data.

24. The image processor according to claim 23, further comprising a recording length acquiring unit that acquires a length of recording time for each of the at least one set of moving image data,
- wherein, as the length of recording time of each of the at least one set of moving image data increases, the extraction frame number of the each of the at least one set of moving image data becomes greater.

25. The image processor according to claim 24, wherein the storage medium further includes at least one set of still image data each corresponding to a still image,
- wherein the extracting unit sets each of the at least one set of still image as a set of candidate image data,
- wherein the image list further includes a still image corresponding to a set of candidate image data, or a resized still image resized from the still image corresponding to the set of still image data.

26. The image processor according to claim 25, further comprising a time data acquiring unit acquires a capture time data from each of the at least one set of still image data and the at least one set of frame image data, the capture time data indicating a time at which each of the still image and the plurality of the frame images was captured,
- wherein the extracting unit sets each of the at least one set of still image data, as a set of candidate image data,
- wherein an excluding unit that specifies two sets of still image data whose capture times are adjacent each other among the at least one set of still image data, and that exclude, from the plurality of sets of candidate image data, one of the two sets of still image data whose capture time is earlier than a capture time of a remaining one of the two sets of still image data.

27. The image processor according to claim 25, further comprising:
- a dynamic range acquiring unit that acquires dynamic range data for each of the at least one set of still image data, dynamic range data indicating a dynamic range of each of the at least one set of still image, and
- an excluding unit that excludes, from the plurality of sets of candidate image data, a set of still image data whose dynamic range is narrowest among the dynamic ranges of the remaining sets of still image data.

28. The image processor according to claim 25, further comprising:
- a subtracting unit that obtains an excluding number by subtracting the maximum layout number from a number of sets of candidate image data, wherein the excluding unit excludes, from the sets of candidate image data, the excluding number worth of sets of still image data.

29. The image processor according to claim 23, further comprising a scene change detecting unit that detects a scene change in the moving image,
   wherein, as a frequency of detection of a scene change of the at least one set of moving image data increases, the extraction frame number of the at least one set of moving image data becomes greater.

30. The image processor according to claim 23,
   wherein the extraction frame number is larger than 0 for each of the at least one set of moving image data.

* * * * *